United States Patent
Snider et al.

(10) Patent No.: US 9,539,883 B2
(45) Date of Patent: Jan. 10, 2017

(54) WINDOW WITH SHADE

(71) Applicant: MAGNA MIRRORS OF AMERICA, INC., Holland, MI (US)

(72) Inventors: Darin J. Snider, Holland, MI (US); Norman B. Warren, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/414,148

(22) PCT Filed: Jun. 26, 2013

(86) PCT No.: PCT/US2013/047873
§ 371 (c)(1),
(2) Date: Jan. 12, 2015

(87) PCT Pub. No.: WO2014/011395
PCT Pub. Date: Jan. 16, 2014

(65) Prior Publication Data
US 2015/0224856 A1    Aug. 13, 2015

Related U.S. Application Data

(63) Continuation-in-part of application No. 14/125,403, filed as application No. PCT/US2012/043729 on Jun.
(Continued)

(51) Int. Cl.
*B60J 1/20* (2006.01)
*B60J 7/00* (2006.01)
(Continued)

(52) U.S. Cl.
CPC .............. *B60J 1/2019* (2013.01); *B60J 7/0015* (2013.01); *B60J 3/0286* (2013.01); *B62D 25/06* (2013.01)

(58) Field of Classification Search
CPC ....... B60J 1/2019; B60J 7/0015; B60J 3/0286; B62D 25/06
(Continued)

(56) References Cited

U.S. PATENT DOCUMENTS 1,703,395 A    2/1929  House
3,989,357 A    11/1976 Kalt
(Continued)

FOREIGN PATENT DOCUMENTS

WO    WO2011/133830    10/2011
WO    WO2012177995     12/2012

OTHER PUBLICATIONS

International Search Report and Written Opinion dated Nov. 12, 2013 for corresponding PCT application No. PCT/US2013/047873.
(Continued)

*Primary Examiner* — Joseph D. Pape
*Assistant Examiner* — Dana Ivey
(74) *Attorney, Agent, or Firm* — Gardner, Linn, Burkhart & Flory, LLP

(57) ABSTRACT

A window assembly includes an outer window panel, an inner window panel, a conductive layer disposed at an inner surface of the inner window panel, a spacer element, and a roller shade disposed within an interpane cavity established between the inner and outer window panels by the spacer element. The roller shade has an end fixedly attached at an anchor stop along a perimeter portion of the spacer element. A dielectric layer is disposed between the roller shade and the conductive layer. The roller shade is electrically deployable to coil and uncoil between a coiled light transmitting condition and an at least partially uncoiled light attenuating condition. The roller shade is electrically operable via applying a voltage at the transparent conductive layer and at the anchor stop to uncoil the roller shade from the coiled light
(Continued)

transmitting condition to the at least partially uncoiled light attenuating condition.

20 Claims, 33 Drawing Sheets

Related U.S. Application Data

22, 2012, now abandoned, and a continuation-in-part of application No. 13/642,908, filed as application No. PCT/US2011/033515 on Apr. 22, 2011, now Pat. No. 8,827,347.

(60) Provisional application No. 61/823,645, filed on May 15, 2013, provisional application No. 61/805,319, filed on Mar. 26, 2013, provisional application No. 61/772,017, filed on Mar. 4, 2013, provisional application No. 61/760,368, filed on Feb. 4, 2013, provisional application No. 61/725,216, filed on Nov. 12, 2012, provisional application No. 61/697,037, filed on Sep. 5, 2012, provisional application No. 61/676,404, filed on Jul. 27, 2012, provisional application No. 61/671,399, filed on Jul. 13, 2012, provisional application No. 61/658,126, filed on Jun. 11, 2012, provisional application No. 61/653,100, filed on May 30, 2012, provisional application No. 61/646,556, filed on May 14, 2012, provisional application No. 61/643,573, filed on May 7, 2012, provisional application No. 61/614,881, filed on Mar. 23, 2012, provisional application No. 61/593,963, filed on Feb. 2, 2012, provisional application No. 61/554,016, filed on Nov. 1, 2011, provisional application No. 61/500,899, filed on Jun. 24, 2011, provisional application No. 61/447,994, filed on Mar. 1, 2011, provisional application No. 61/327,181, filed on Apr. 23, 2010.

(51) Int. Cl.
    *B62D 25/06* (2006.01)
    *B60J 3/02* (2006.01)

(58) Field of Classification Search
    USPC .................. 296/146.15, 97.8, 214, 215, 210
    See application file for complete search history.

(56) References Cited

U.S. PATENT DOCUMENTS

| | | |
|---|---|---|
| 4,105,294 A | 8/1978 | Peck |
| 4,248,501 A | 2/1981 | Simpson |
| 4,266,339 A | 5/1981 | Kalt |
| 4,336,536 A | 6/1982 | Kalt et al. |
| 4,364,214 A | 12/1982 | Morgan et al. |
| 4,364,595 A | 12/1982 | Morgan et al. |
| 4,383,255 A | 5/1983 | Grandjean et al. |
| 4,468,663 A | 8/1984 | Kalt |
| 4,597,636 A | 7/1986 | Hoshikawa |
| 4,707,570 A | 11/1987 | Ide et al. |
| 4,747,670 A | 5/1988 | Devio et al. |
| 4,788,089 A | 11/1988 | Skipper |
| 4,799,768 A | 1/1989 | Gahan |
| 4,891,635 A | 1/1990 | Hata |
| 4,915,486 A | 4/1990 | Hansen |
| 4,931,782 A | 6/1990 | Jackson |
| 4,978,952 A | 12/1990 | Irwin |
| 5,066,112 A | 11/1991 | Lynam et al. |
| 5,151,816 A | 9/1992 | Varaprasad et al. |
| 5,231,559 A | 7/1993 | Kalt et al. |
| 5,233,459 A | 8/1993 | Bozler et al. |
| 5,233,461 A | 8/1993 | Dornan et al. |
| 5,239,405 A | 8/1993 | Varaprasad et al. |
| 5,239,406 A | 8/1993 | Lynam |
| 5,406,305 A | 4/1995 | Shimomura et al. |
| 5,472,643 A | 12/1995 | Varaprasad et al. |
| 5,519,565 A | 5/1996 | Kalt et al. |
| 5,605,370 A | 2/1997 | Ruiz |
| 5,638,084 A | 6/1997 | Kalt |
| 5,668,663 A | 9/1997 | Varaprasad et al. |
| 5,724,187 A | 3/1998 | Varaprasad et al. |
| 5,828,432 A | 10/1998 | Shashidhar et al. |
| 5,853,895 A | 12/1998 | Lewno |
| 5,917,431 A | 6/1999 | Sanada et al. |
| 5,919,397 A | 7/1999 | Ichihashi et al. |
| 6,039,390 A | 3/2000 | Agrawal et al. |
| 6,057,814 A | 5/2000 | Kalt |
| 6,086,133 A | 7/2000 | Alonso |
| 6,107,941 A | 8/2000 | Jones |
| 6,144,359 A | 11/2000 | Grave |
| 6,220,650 B1 | 4/2001 | Davis et al. |
| 6,288,824 B1 | 9/2001 | Kastalsky |
| 6,299,235 B1 | 10/2001 | Davis et al. |
| 6,299,255 B1 | 10/2001 | Pichon |
| 6,317,108 B1 | 11/2001 | Kalt |
| 6,394,529 B2 | 5/2002 | Davis et al. |
| 6,420,036 B1 | 7/2002 | Varaprasad et al. |
| 6,493,128 B1 | 12/2002 | Agrawal et al. |
| 6,513,864 B2 | 2/2003 | Böhm et al. |
| 6,520,239 B2 | 2/2003 | Schlecht et al. |
| 6,528,782 B1 | 3/2003 | Zhang et al. |
| 6,572,176 B2 | 6/2003 | Davis et al. |
| 6,606,185 B2 | 8/2003 | Saxe |
| 6,669,267 B1 | 12/2003 | Lynam et al. |
| 6,692,646 B2 | 2/2004 | Kalt et al. |
| 6,729,674 B2 | 5/2004 | Davis et al. |
| 6,771,237 B1 | 8/2004 | Kalt |
| 6,804,040 B2 | 10/2004 | Malvino et al. |
| 6,897,786 B1 | 5/2005 | Kalt et al. |
| 6,897,997 B2 | 5/2005 | Malvino |
| 6,899,380 B2 | 5/2005 | Kralik et al. |
| 6,900,923 B2 | 5/2005 | Chakrapani et al. |
| 6,936,193 B2 | 8/2005 | Saxe et al. |
| 6,987,602 B2 | 1/2006 | Saxe |
| 7,083,226 B2 | 8/2006 | Schoenauer et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,361,252 B2 | 4/2008 | Slovak et al. |
| 7,367,614 B2 | 5/2008 | Uehara et al. |
| 7,387,329 B2 | 6/2008 | Mollick et al. |
| 7,417,785 B2 | 8/2008 | Malvino |
| 7,530,630 B2 | 5/2009 | Jugl et al. |
| 7,626,749 B2 | 12/2009 | Baur et al. |
| 7,645,977 B2 | 1/2010 | Schlam et al. |
| 7,705,826 B2 | 4/2010 | Kalt et al. |
| 7,730,668 B2 | 6/2010 | Dankert et al. |
| 7,791,788 B2 | 9/2010 | Slovak et al. |
| 7,847,033 B2 | 12/2010 | Chakrapani et al. |
| 7,967,362 B2 | 6/2011 | Glaser |
| 8,035,075 B2 | 10/2011 | Schlam et al. |
| 8,134,112 B2 | 3/2012 | Schlam et al. |
| 8,881,458 B2 | 11/2014 | Snider et al. |
| 2006/0082192 A1 | 4/2006 | Dubay et al. |
| 2008/0106124 A1 | 5/2008 | Snider |
| 2008/0115428 A1* | 5/2008 | Schlam ............... E06B 9/24 52/173.1 |
| 2008/0190571 A1 | 8/2008 | Wimmer |
| 2011/0030276 A1 | 2/2011 | Smith et al. |
| 2013/0038093 A1 | 2/2013 | Snider |
| 2013/0076057 A1* | 3/2013 | Hagen ............... B60J 3/0286 296/96.14 |
| 2014/0097636 A1 | 4/2014 | Snider et al. |

OTHER PUBLICATIONS

"Teonex PEN Film for Electrical Insulation", Nov. 30, 2011, retrieved from the internet on Oct. 29, 2013 at: https://web.archive.

(56) References Cited

OTHER PUBLICATIONS org/web/20111130184105/http://www.pleo.com/dupont/xm020.htm.

* cited by examiner

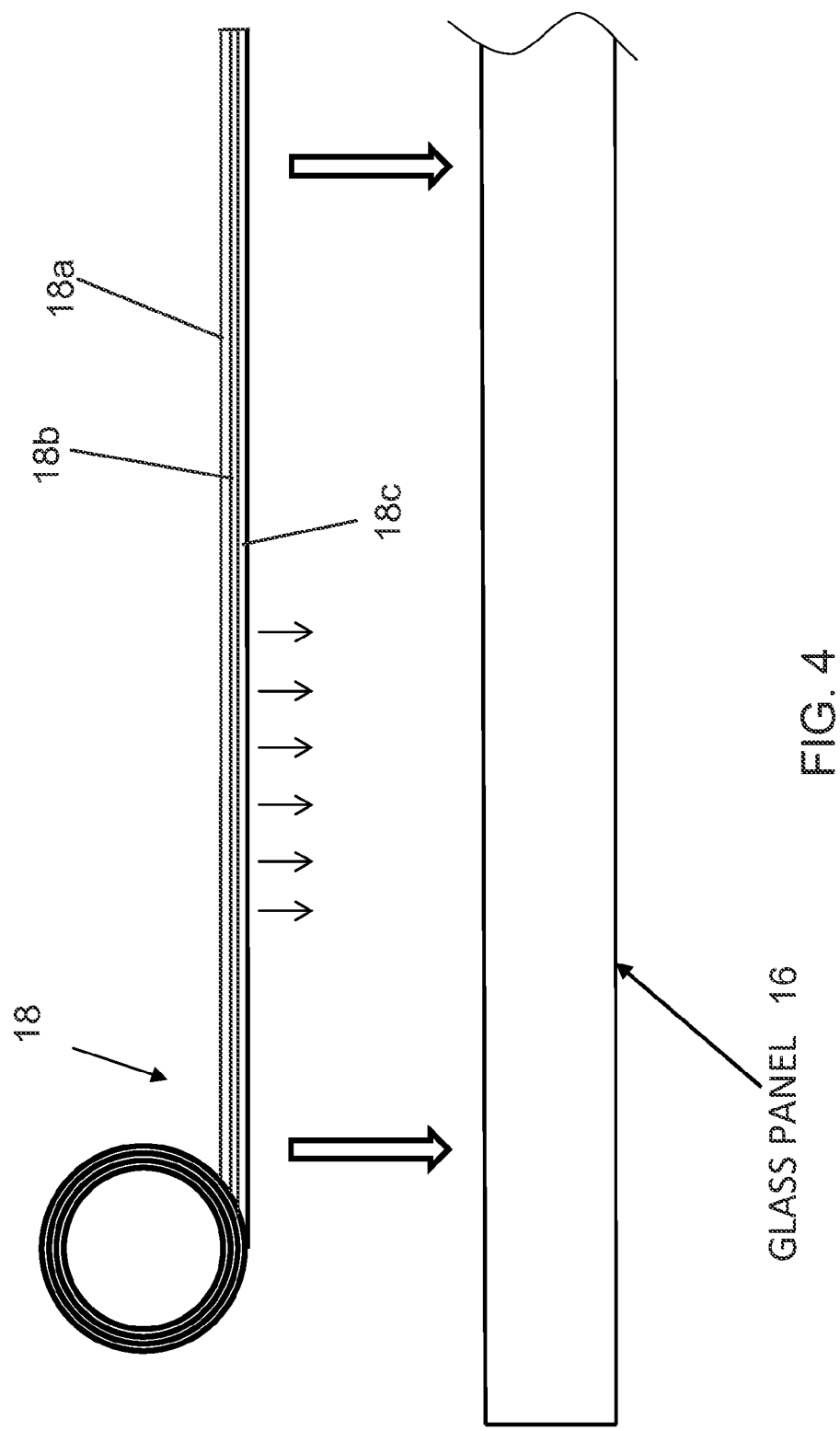

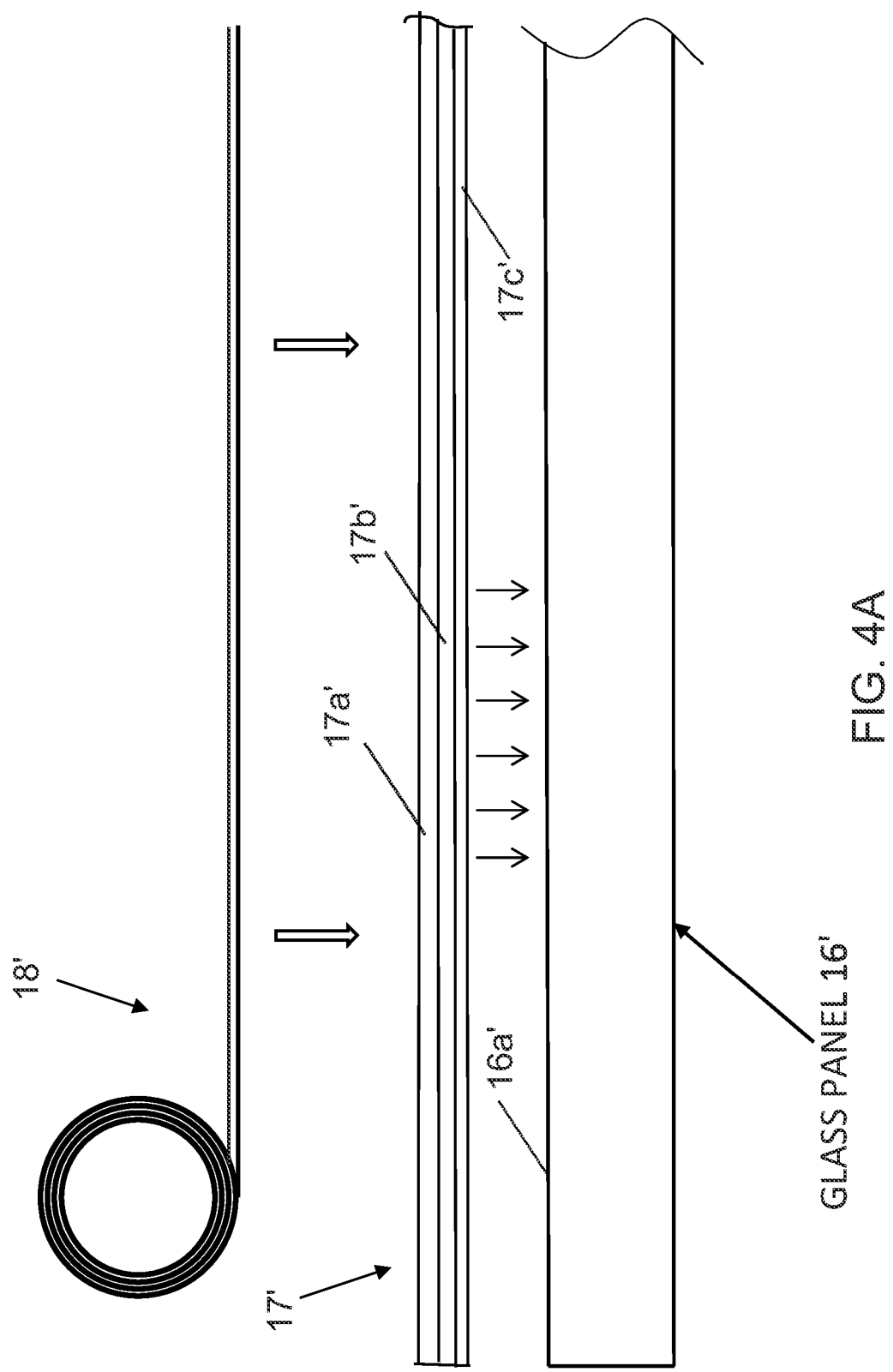

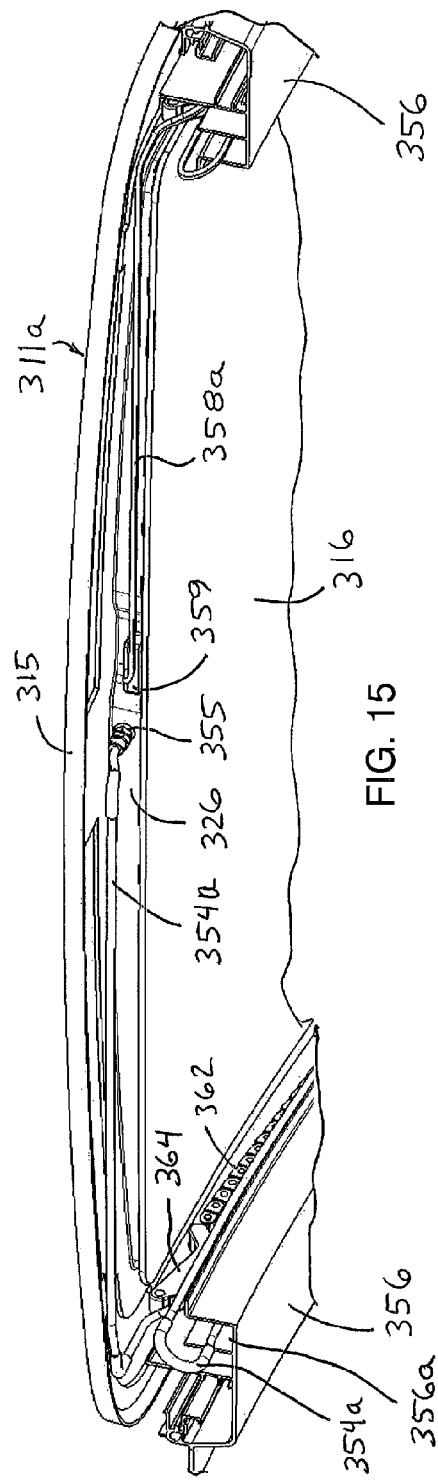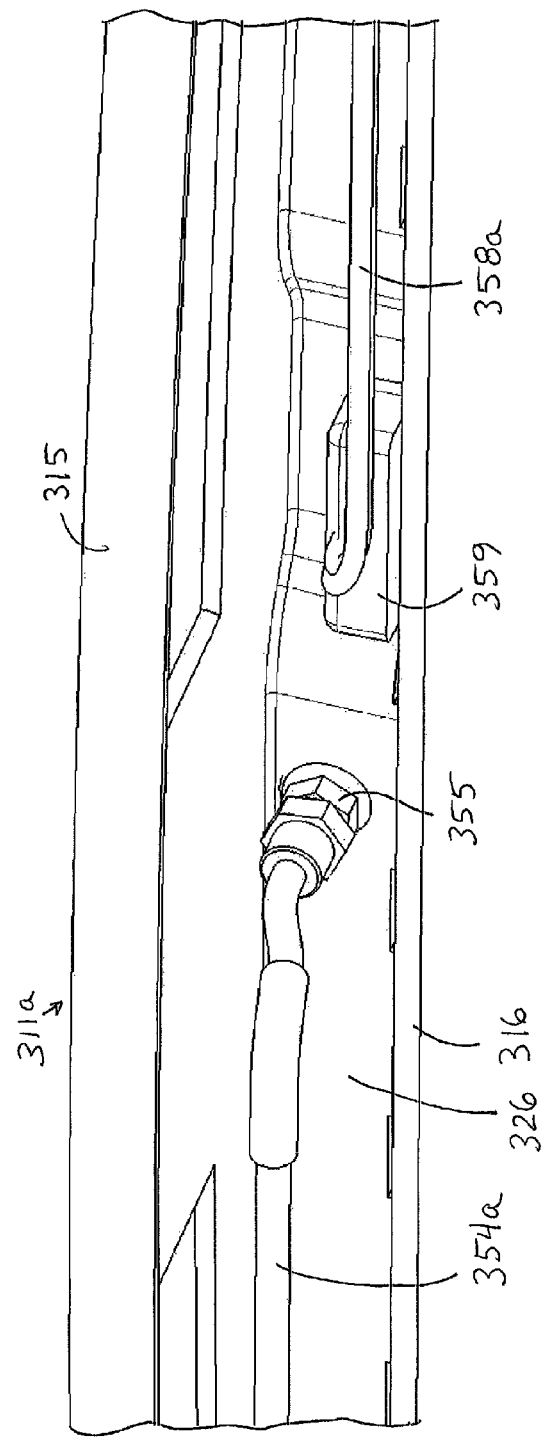

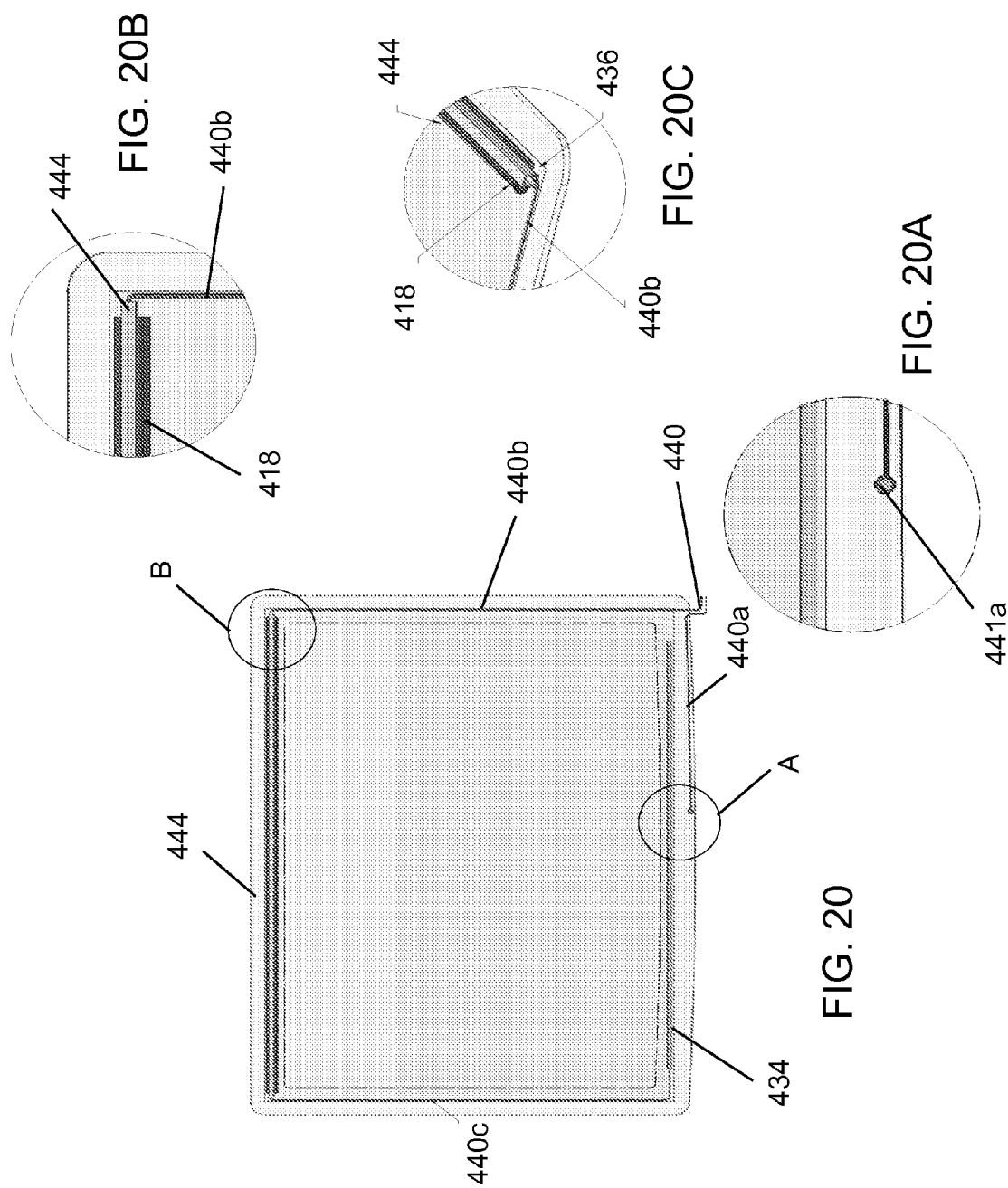

GLASS/ ITO View

ITO GLASS/ DIELECTRIC/ BUTTONS View

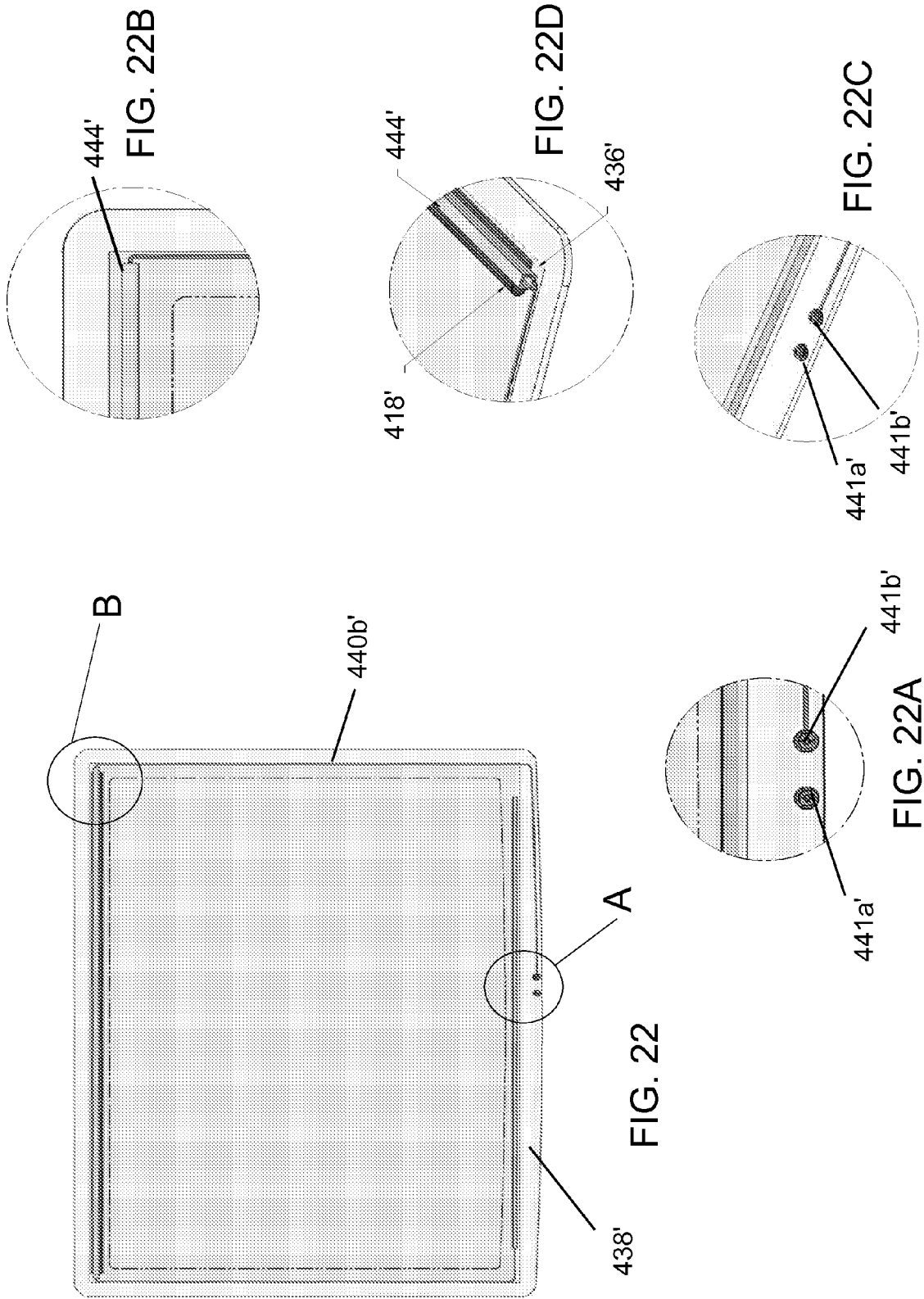

GLASS/ ITO View

DIELECTRIC/ SILVER TRACE View

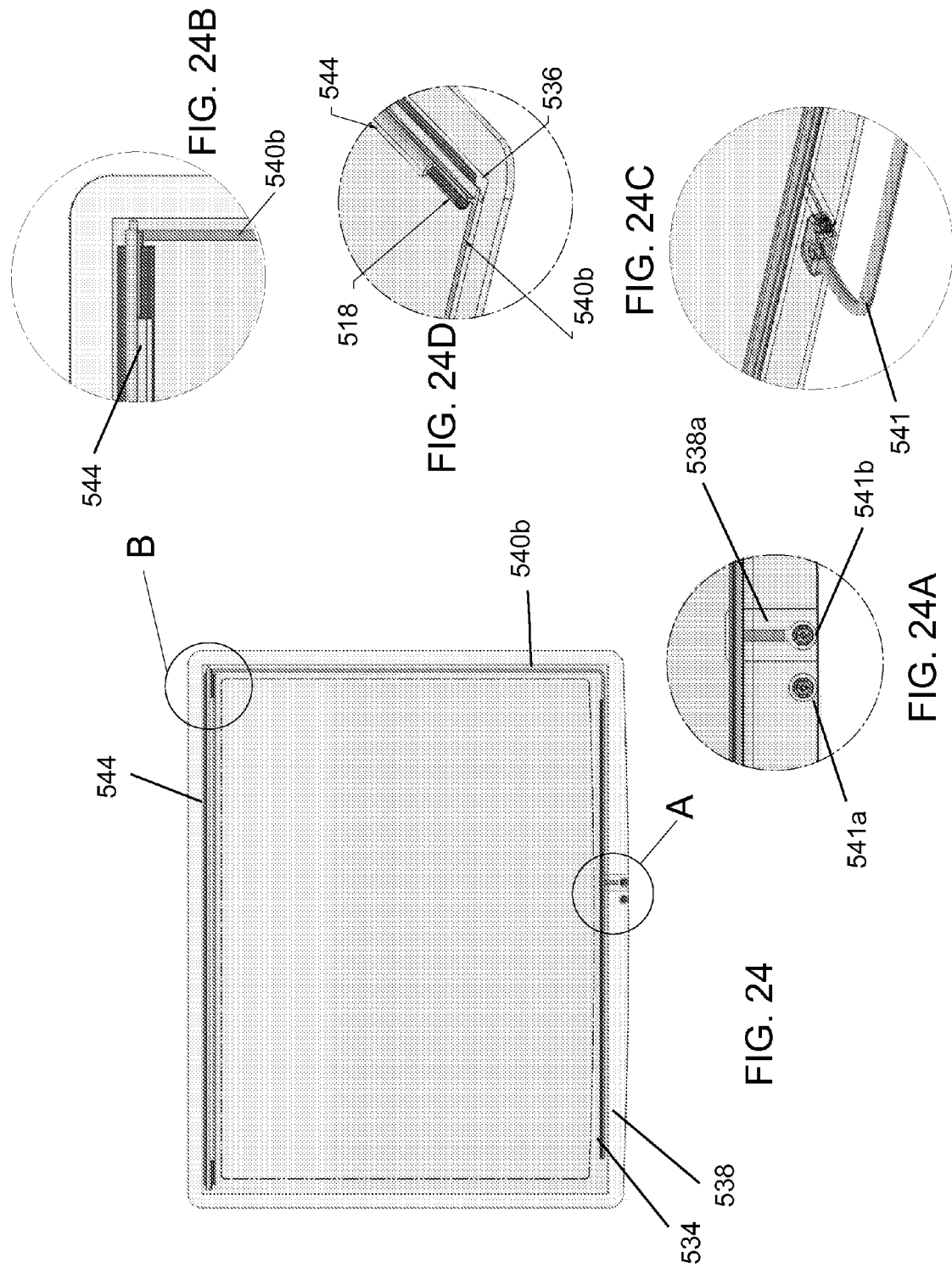

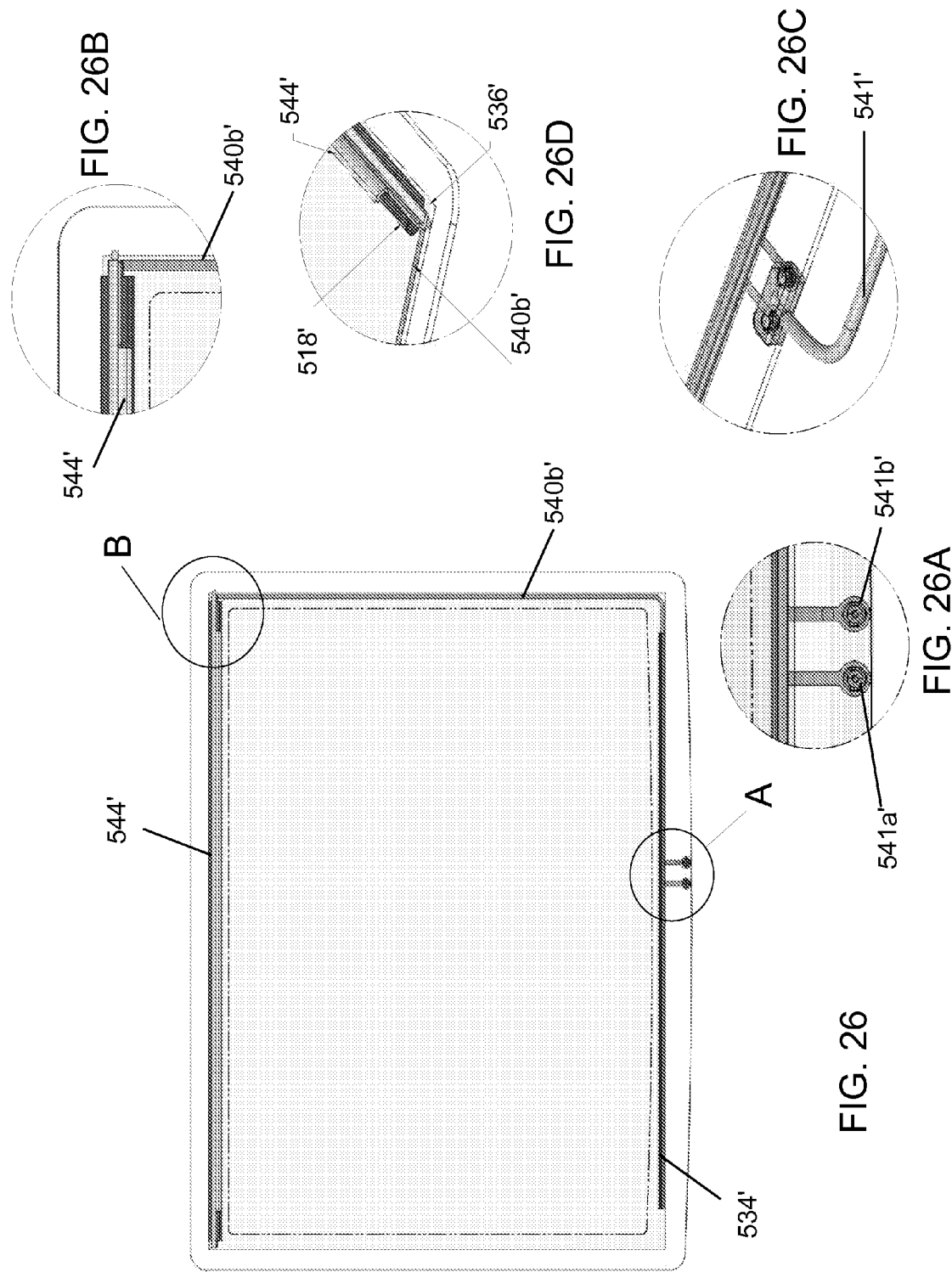

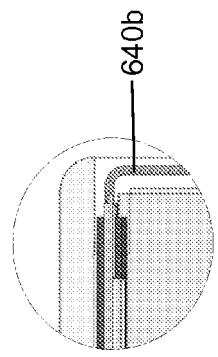
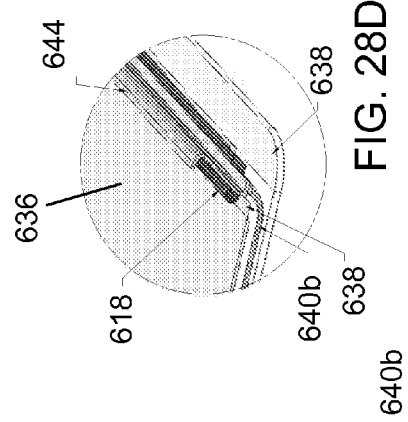
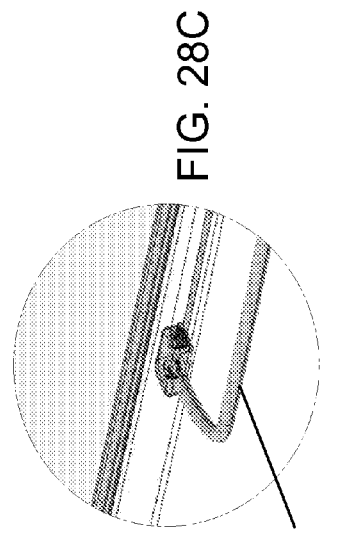
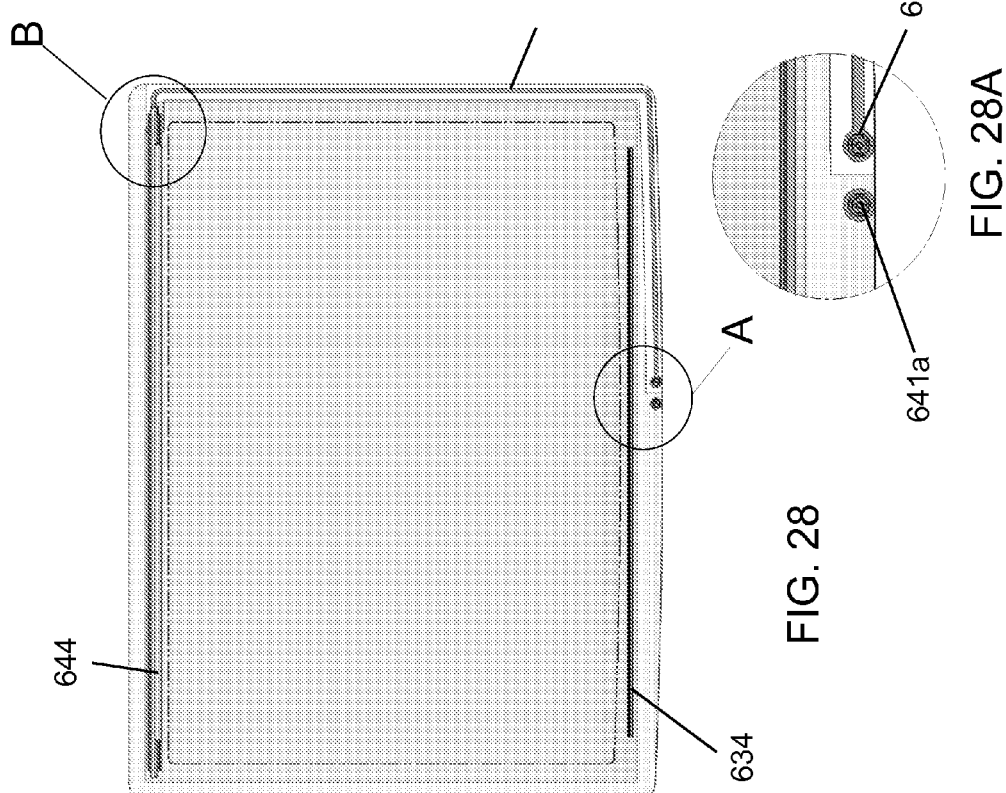
FIG. 28
FIG. 28A
FIG. 28B
FIG. 28C
FIG. 28D

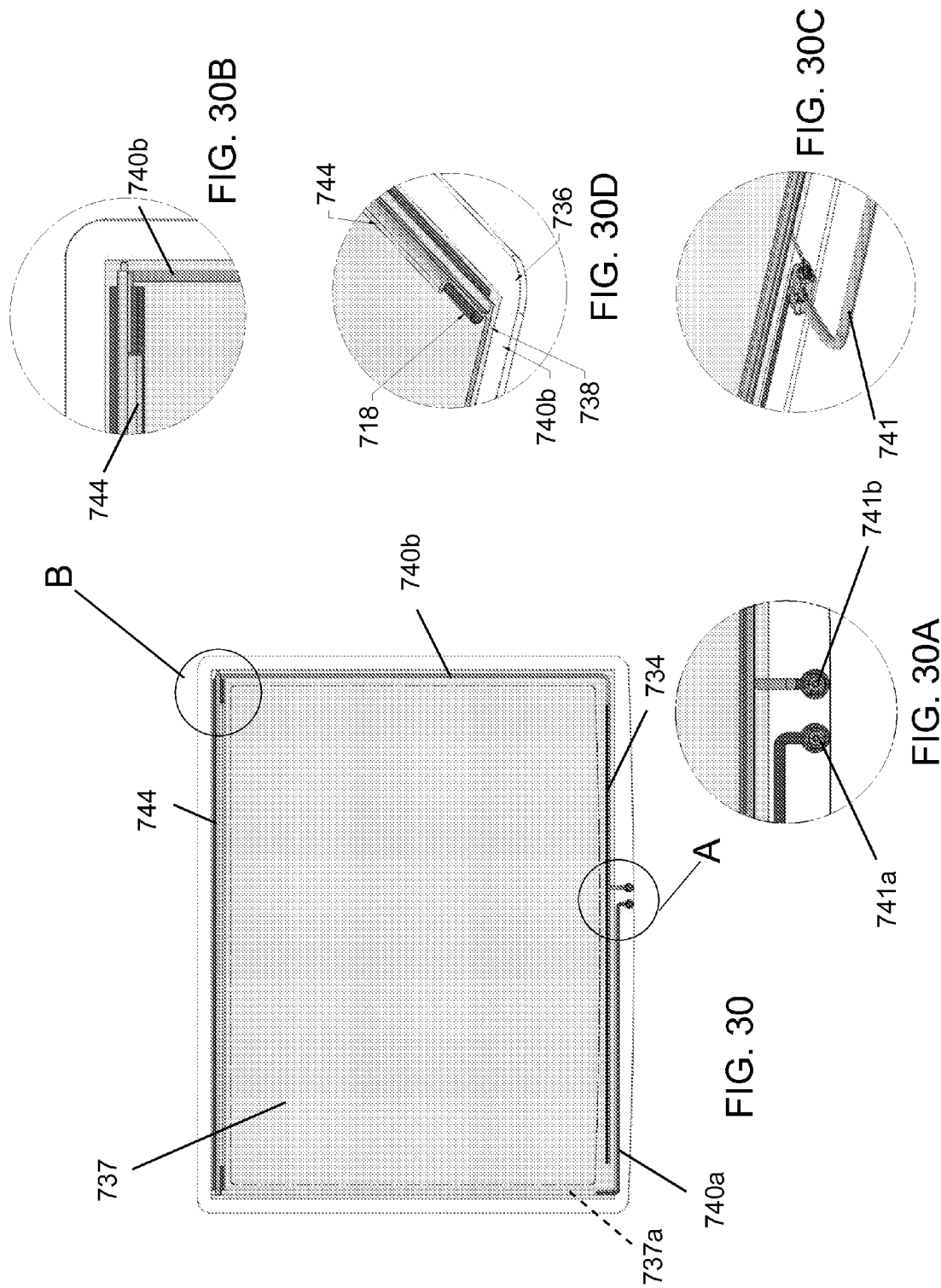

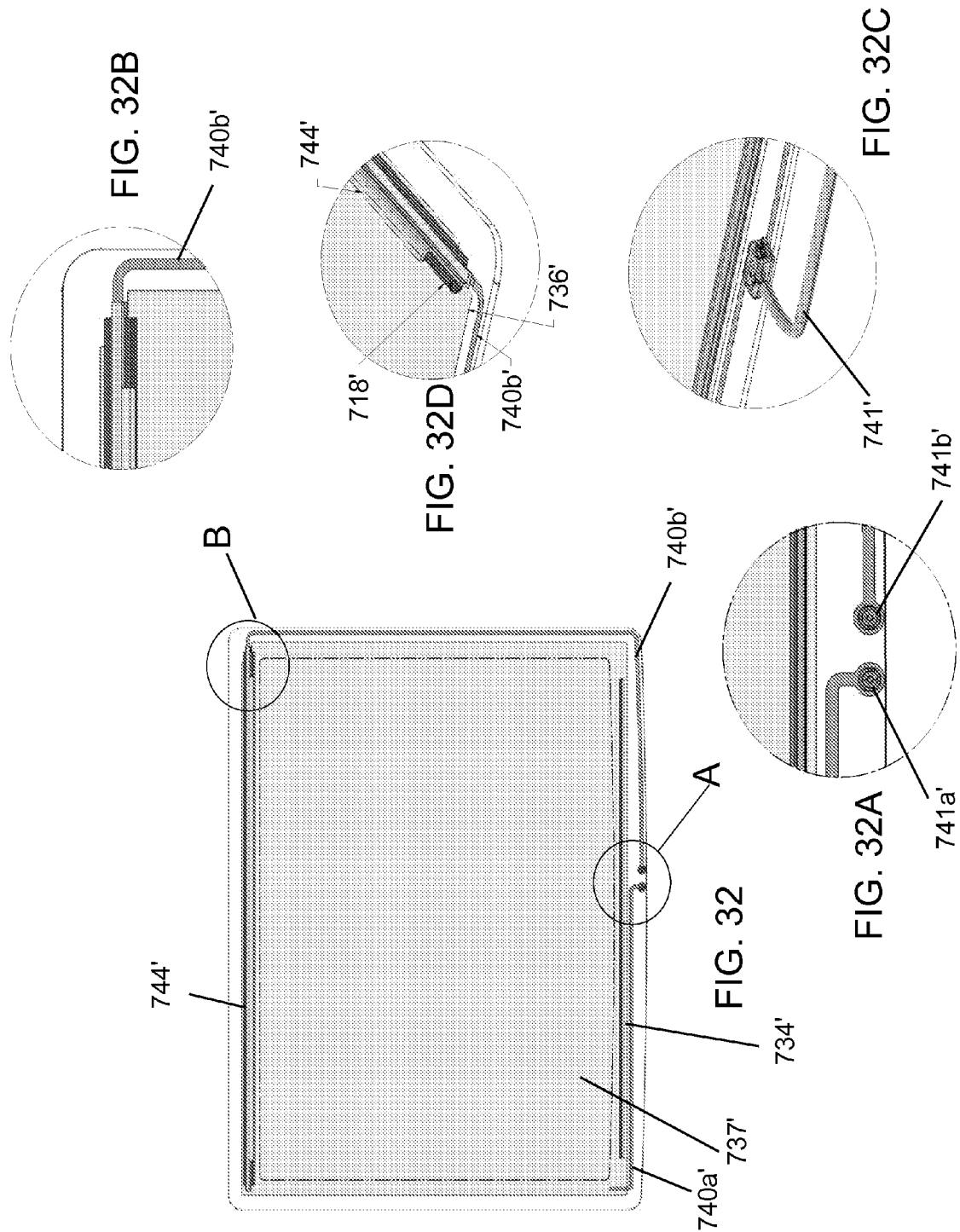

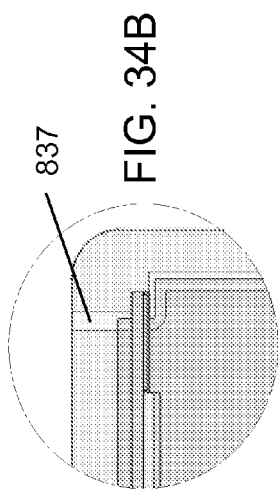
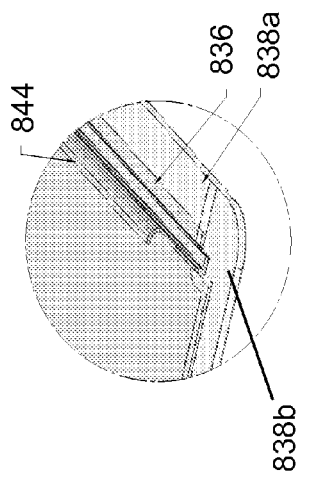
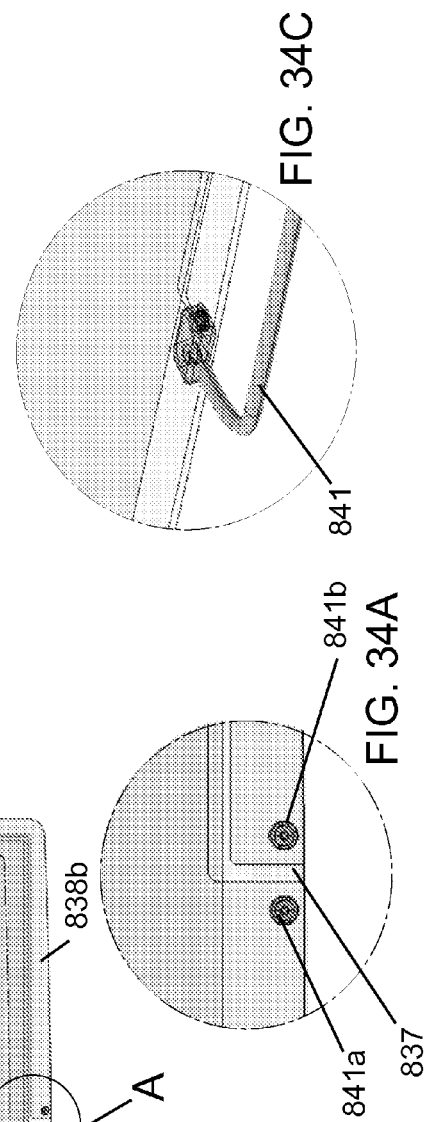
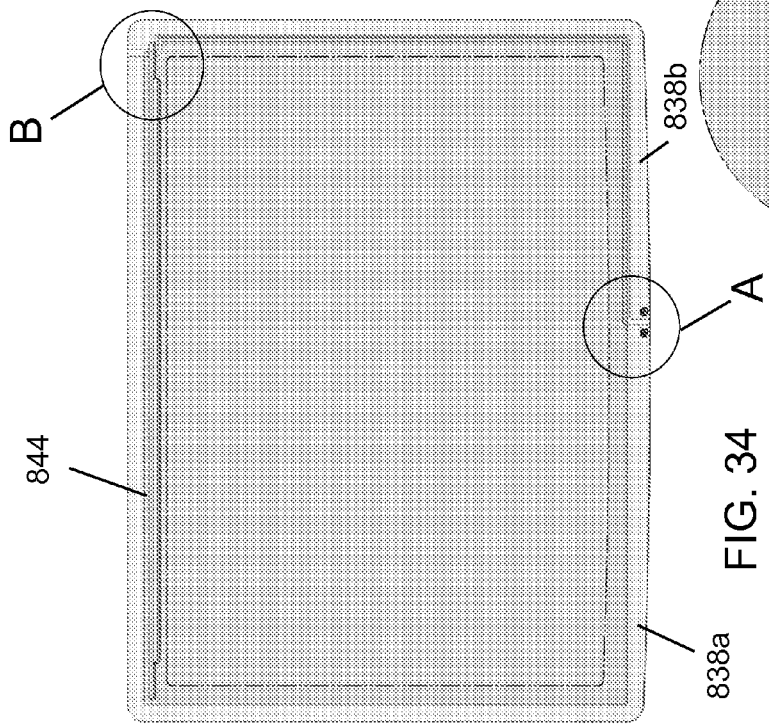

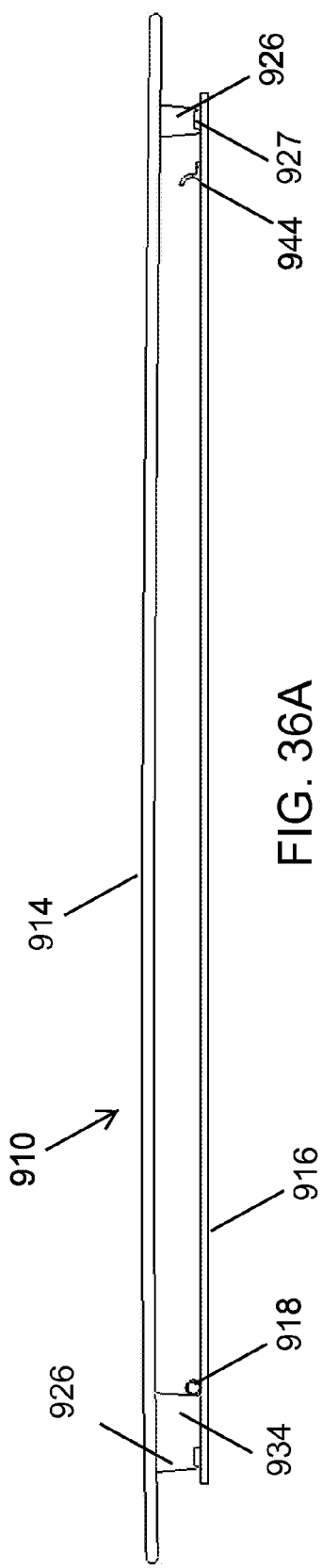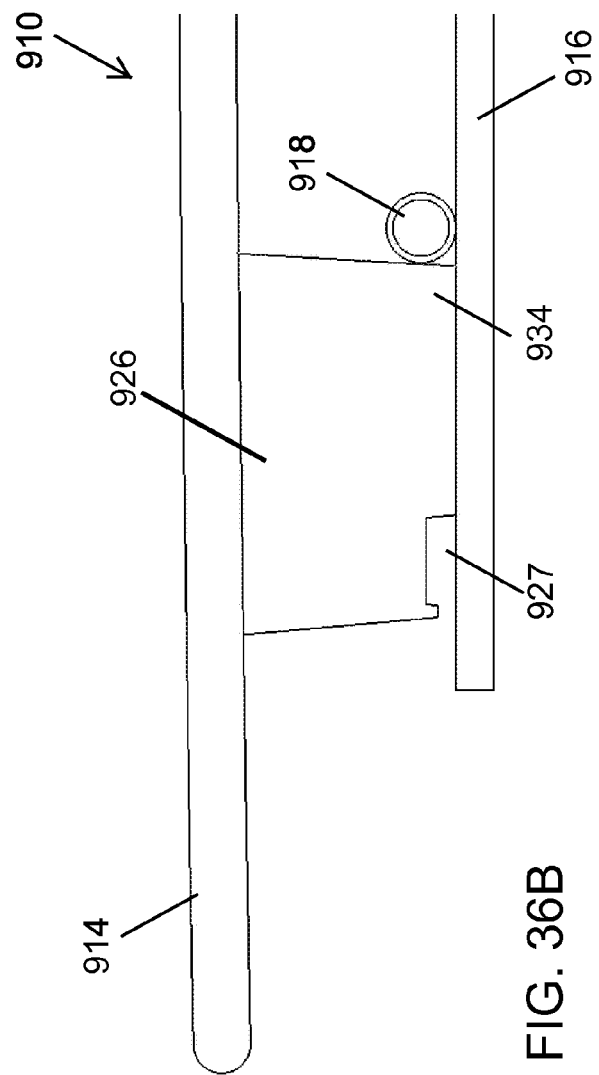

WINDOW WITH SHADE

CROSS REFERENCE TO RELATED APPLICATIONS

The present application is a 371 national stage filing of PCT Application No. PCT/US2013/047873, filed Jun. 26, 2013, which claims priority of U.S. provisional applications, Ser. No. 61/823,645, filed May 15, 2013; Ser. No. 61/805,319, filed Mar. 19, 2013; Ser. No. 61/772,017, filed Mar. 4, 2013; Ser. No. 61/760,368, filed Feb. 4, 2013; Ser. No. 61/725,216, filed Nov. 12, 2012; Ser. No. 61/697,037 , filed Sep. 5, 2012 ; Ser. No. 61/676,404, filed Jul. 27, 2012; and Ser. No. 61/671,399 , filed Jul. 13, 2012, which are all hereby incorporated herein by reference in their entireties. The present application is a continuation-in-part of U.S. patent application Ser. No. 14/125,403, filed Dec. 11, 2013 which is a 371 national stage filing of PCT Application No. PCT/US2012/043729, filed Jun. 22, 2012 and published Dec. 27, 2012 as International Publication No. WO 2012/177995, which claims the filing benefit of U.S. provisional applications, Ser. No. 61/658,126, filed Jun. 11, 2012; Ser. No. 61/653,100, filed May 30, 2012; Ser. No. 61/646,556, filed May 14, 2012; Ser. No. 61/643,573, filed May 7, 2012; Ser. No. 61/614,881, filed Mar. 23, 2012; Ser. No. 61/593,963, filed Feb. 2, 2012; Ser. No. 61/554,016, filed Nov. 1, 2011; and Ser. No. 61/500,899 , filed Jun. 24, 2011 , which are all hereby incorporated herein by reference in their entireties, and U.S. patent application Ser. No. 14/125,403 is a continuation-in-part of U.S. patent application Ser. No. 13/642,908, filed Oct. 23, 2012 , now U.S. Pat. No. 8,827,347 , which is a 371 national stage filing of PCT Application No. PCT/US 2011/033515 , filed Apr. 22, 2011 and published Oct. 27, 2011 as International Publication No. WO 2011/133830, which claims the filing benefit of U.S. provisional Applications, Ser. No. 61/447,994, filed Mar. 1, 2011, and Ser. No. 61/327,181, filed Apr. 23, 2010, which are all hereby incorporated herein by reference in their entireties.

FIELD OF THE INVENTION

The present invention relates to a window assembly and, more particularly, a window assembly that includes a shade.

BACKGROUND OF THE INVENTION

It is known to provide a window assembly, such as for a vehicle, that includes a shade that is movable between an open position and a closed or shading position. Examples of such shades are described in U.S. Pat. Nos. 7,645,977; 6,520,239; 7,083,226; 6,899,380; 6,513,864; and 6,520,239, which are hereby incorporated herein by reference in their entireties.

SUMMARY OF THE INVENTION

The present invention provides a window assembly that provides for shading of the window panel having a pair of spaced apart glass or plastic window panels. The outer window panel may be oversized relative to the inner window panel and may have cross-dimensions that are greater than the inner window panel so as to have perimeter overhang regions at least partially around the window assembly, which may provide enhanced mounting means for mounting the window assembly to a vehicle and may provide an enhanced appearance of the window assembly to a person viewing the window assembly from exterior of the vehicle. The curvatures and contours of the inner and outer window panels may be different and the spacing between the window panels may vary, so as to provide a desired curvature or contour for each window panel relative to the respective vehicle surface at which they are disposed. The shading means or shading element may comprise a coilable shading element or sheet (such as a tightly coiled conductive film, such as, for example, a metalized polymeric film or the like) that is disposed in a cavity between an inner window panel and an outer window panel and that dims or darkens the window assembly via uncoiling of the shading element.

According to an aspect of the present invention, a window assembly (such as, for example, for a sunroof or moonroof type window of a vehicle or for other vehicular or non-vehicular applications) includes an outer window panel, an inner window panel and a spacer element disposed between the inner and outer window panels to establish an interpane cavity between the inner and outer window panels. A roller shade or shade element is disposed in the cavity and is electrically deployable via electrostatic action to coil and uncoil between a coiled light transmitting condition, where the roller shade functions to substantially allow light transmission through the window assembly, and an at least partially uncoiled light attenuating or light blocking condition, where the roller shade functions to at least partially attenuate or block light transmission through the window assembly. The spacer element comprises a circumferential frame or element and the roller shade may be attached to a support element or anchor, such as a generally rigid elongated support element. The spacer element is formed to provide a variable spacing between the panels and to seal against the panels, while allowing for electrical connection to the roller shade and optionally to a stop element at an opposite side of the window from the rolled up roller shade.

The shade element may comprise a conductive film (such as a flexible or coiled conductive film, such as a metalized polymeric film or the like) that is tightly coiled in its coiled state and that uncoils in response to a voltage applied thereto. The film may comprise a laminate material comprising a dielectric material or layer, a conductive material or layer and an ink or opaque material or layer. The conductive layer (such as a transparent conductive layer, such as a layer of indium tin oxide (ITO) or the like) is disposed at a lower portion of the dielectric layer (such as a capacitor grade dielectric film or a layer of Polyethylene Naphthalate (PEN) or the like) and the ink layer is disposed at the lower surface of the ITO layer, so as to cover the typically shiny or mirror like appearance of the PEN layer.

These and other objects, advantages, purposes and features of the present invention will become apparent upon review of the following specification in conjunction with the drawings.

BRIEF DESCRIPTION OF THE DRAWINGS

FIG. 4 is an exploded side elevation and sectional view of the film and lower window panel of a window assembly in accordance with the present invention;

FIG. 4A is an exploded side elevation and sectional view of the film and lower window panel of another window assembly in accordance with the present invention;

FIG. 15 is a perspective view of a portion of a movable window assembly of the present invention, showing routing of an air line and electrical wires for the window assembly;

FIG. 16 is an enlarged perspective view of the air line and wires of FIG. 15, shown at their entry location through the perimeter spacing element;

FIG. 20 is a plan view of a shade assembly with the lower or inner window panel of FIG. 19B, showing the conductive and dielectric layers at the window panel and the electrical connections of a wire to the conductive layer and to the coiled film;

FIG. 20A is an enlarged view of the area A in FIG. 20;

FIG. 20B is an enlarged view of the area B in FIG. 20;

FIG. 20C is an enlarged perspective view of the area shown in FIG. 20B;

FIG. 22 is a plan view of a shade assembly with the lower or inner window panel of FIG. 21B, showing the conductive and dielectric layers at the window panel and the electrical connections of another wire to the conductive layer and to the coiled film;

FIG. 22A is an enlarged view of the area A in FIG. 22;

FIG. 22B is an enlarged view of the area B in FIG. 22;

FIG. 22C is a perspective view of the area shown in FIG. 22A;

FIG. 22D is a perspective view of the area shown in FIG. 22B;

FIG. 24 is a plan view of a shade assembly with the lower or inner window panel of FIG. 23B, showing the conductive and dielectric layers at the window panel and the electrical connections of a wire harness to the conductive layer and to a conductive trace to the coiled film;

FIG. 24A is an enlarged view of the area A in FIG. 24;

FIG. 24B is an enlarged view of the area B in FIG. 24;

FIG. 24C is a perspective view of the area shown in FIG. 24A;

FIG. 24D is a perspective view of the area shown in FIG. 24B;

FIG. 26 is a plan view of a shade assembly with the lower or inner window panel of FIG. 25B, showing the conductive and dielectric layers at the window panel and the electrical connections of a wire harness to the conductive layer and to a conductive trace to the coiled film;

FIG. 26A is an enlarged view of the area A in FIG. 26;

FIG. 26B is an enlarged view of the area B in FIG. 26;

FIG. 26C is a perspective view of the area shown in FIG. 26A;

FIG. 26D is a perspective view of the area shown in FIG. 26B;

FIG. 28 is a plan view of a shade assembly with the lower or inner window panel of FIG. 27B, showing the conductive and dielectric layers at the window panel and the electrical connections of a wire harness to the conductive layer and to a conductive trace to the coiled film, with the conductive trace disposed on an uncoated portion of the glass surface that is etched after the coating process or that is masked during the coating process;

FIG. 28A is an enlarged view of the area A in FIG. 28;

FIG. 28B is an enlarged view of the area B in FIG. 28;

FIG. 28C is a perspective view of the area shown in FIG. 28A;

FIG. 28D is a perspective view of the area shown in FIG. 28B;

FIG. 30 is a plan view of a shade assembly with the lower or inner window panel of FIG. 29B, showing the conductive and dielectric layers at the window panel and the electrical connections of a wire harness to a conductive trace to the conductive layer at an underside of a dielectric laminate sheet and to another conductive trace to the coiled film, with the other conductive trace disposed on the dielectric layer;

FIG. 30A is an enlarged view of the area A in FIG. 30;

FIG. 30B is an enlarged view of the area B in FIG. 30;

FIG. 30C is a perspective view of the area shown in FIG. 30A;

FIG. 30D is a perspective view of the area shown in FIG. 30B;

FIG. 32 is a plan view of a shade assembly with the lower or inner window panel of FIG. 31B, showing the conductive and dielectric layers at the window panel and the electrical connections of a wire harness to a conductive trace to the conductive layer at an underside of a dielectric laminate and to another conductive trace to the coiled film, with the other conductive trace disposed on an uncoated portion of the glass surface;

FIG. 32A is an enlarged view of the area A in FIG. 32;

FIG. 32B is an enlarged view of the area B in FIG. 32;

FIG. 32C is a perspective view of the area shown in FIG. 32A;

FIG. 32D is a perspective view of the area shown in FIG. 32B;

FIG. 34 is a plan view of a shade assembly with the lower or inner window panel of FIG. 33B, showing the conductive and dielectric layers at the window panel and the electrical connections of a wire harness to a main portion of the conductive layer and to another portion of the conductive layer that is electrically isolated from the main portion of the conductive layer;

FIG. 34A is an enlarged view of the area A in FIG. 34;

FIG. 34B is an enlarged view of the area B in FIG. 34;

FIG. 34C is a perspective view of the area shown in FIG. 34A;

FIG. 34D is a perspective view of the area shown in FIG. 34B;

FIG. 36A is a sectional view of the lower or inner window panel taken along the line A-A in FIG. 36; and FIG. 36B is an enlarged sectional view of a portion of the sectional view of FIG. 36A.

DESCRIPTION OF THE PREFERRED EMBODIMENTS

Figure 1:
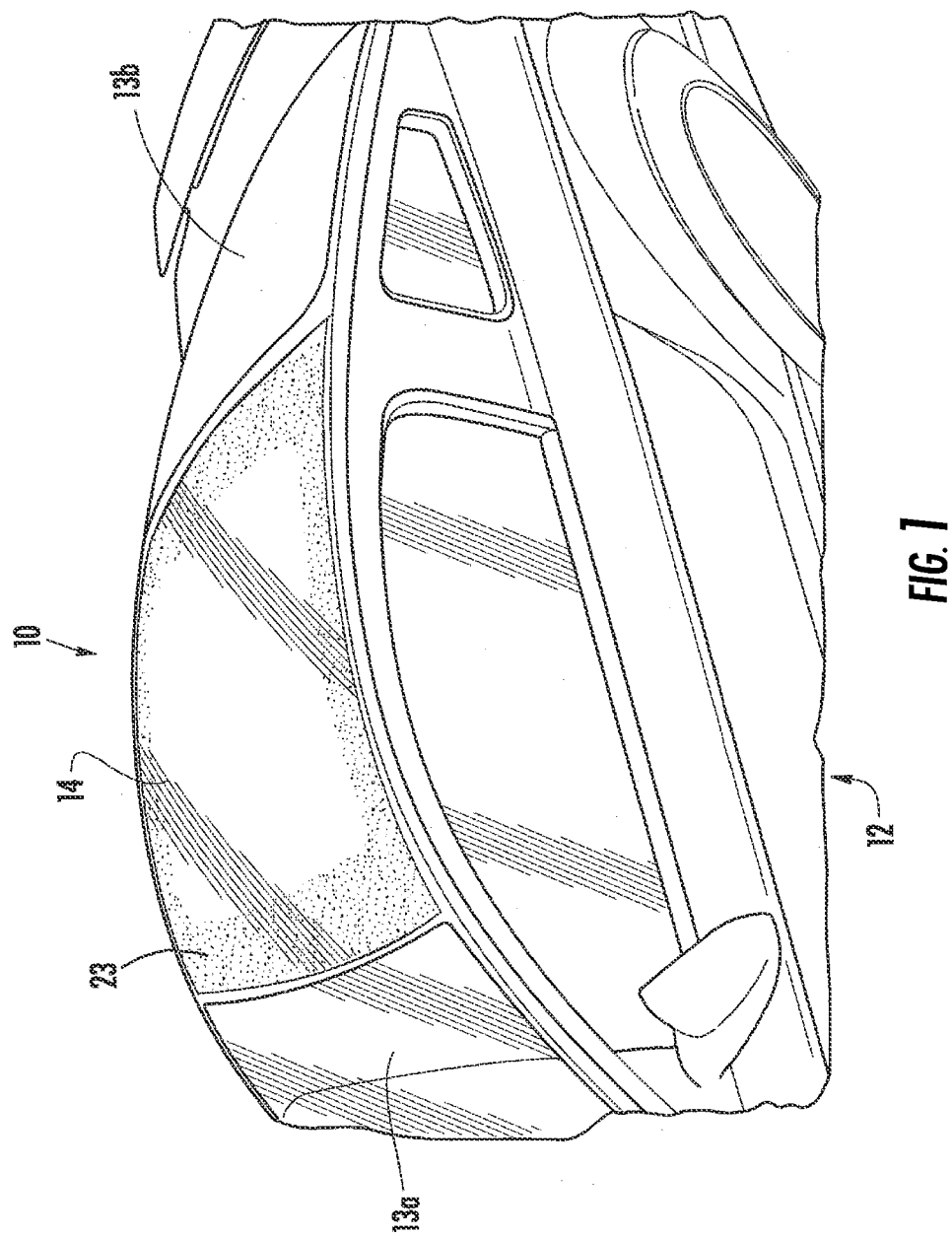
FIG. 1 is a perspective view of a portion of a vehicle having a window assembly in accordance with the present invention.

Referring now to the drawings and the illustrative embodiments depicted therein, a window assembly or module 10 (such as a sunroof or moonroof or the like or such as a side or rear window or the like) of a vehicle 12 includes an outer window panel 14 and an inner window panel 16 with a coiled shade element 18 disposed therebetween (FIGS. 1-5). In the illustrated embodiment, window assembly 10 comprises a roof module or roof window (such as a sunroof or moonroof or glass roof or the like) that is disposed between a front windshield 13a of vehicle 12 and a rear backlite or rear window 13b of vehicle 12 (such as at an opening in the roof of the vehicle or otherwise between the windshield and backlite of the vehicle, such as by utilizing aspects of the glass roof assembly described in U.S. patent application Ser. No. 11/933,699, filed Nov. 1, 2007 and published May 8, 2008 as U.S. Pat. Publication No. US-2008-0106124, which is hereby incorporated herein by reference in its entirety). The coiled shading element 18 is coiled or retracted to an open or non-shading position, and may uncoil or extend across the window assembly to a closed or shading position, such as in response to a user input or the like. The window module or window assembly 10 has an outer window panel 14 (or upper panel for the roof window application) that has greater cross dimensions than the inner panel 16 (or lower panel for the roof window application), and provides a uniform or flush outer panel at the exterior surface of the vehicle sheet metal and/or front windshield and rear backlite. The outer and inner window panels 14, 16 of window module or window assembly 10 may have different contours or curvatures (and thus define or establish a non-uniform spacing or cavity therebetween), and thus may provide enhanced matching or correspondence with the contours of the respective surfaces of the vehicle sheet metal and/or front windshield and rear backlite and of the interior or in-cabin roof liner or headliner. The window assembly may utilize aspects of the window assemblies described in International Publication Nos. WO 2012/177995 and/or WO 2011/133830, which are hereby incorporated herein by reference in their entireties.

Figure 2:
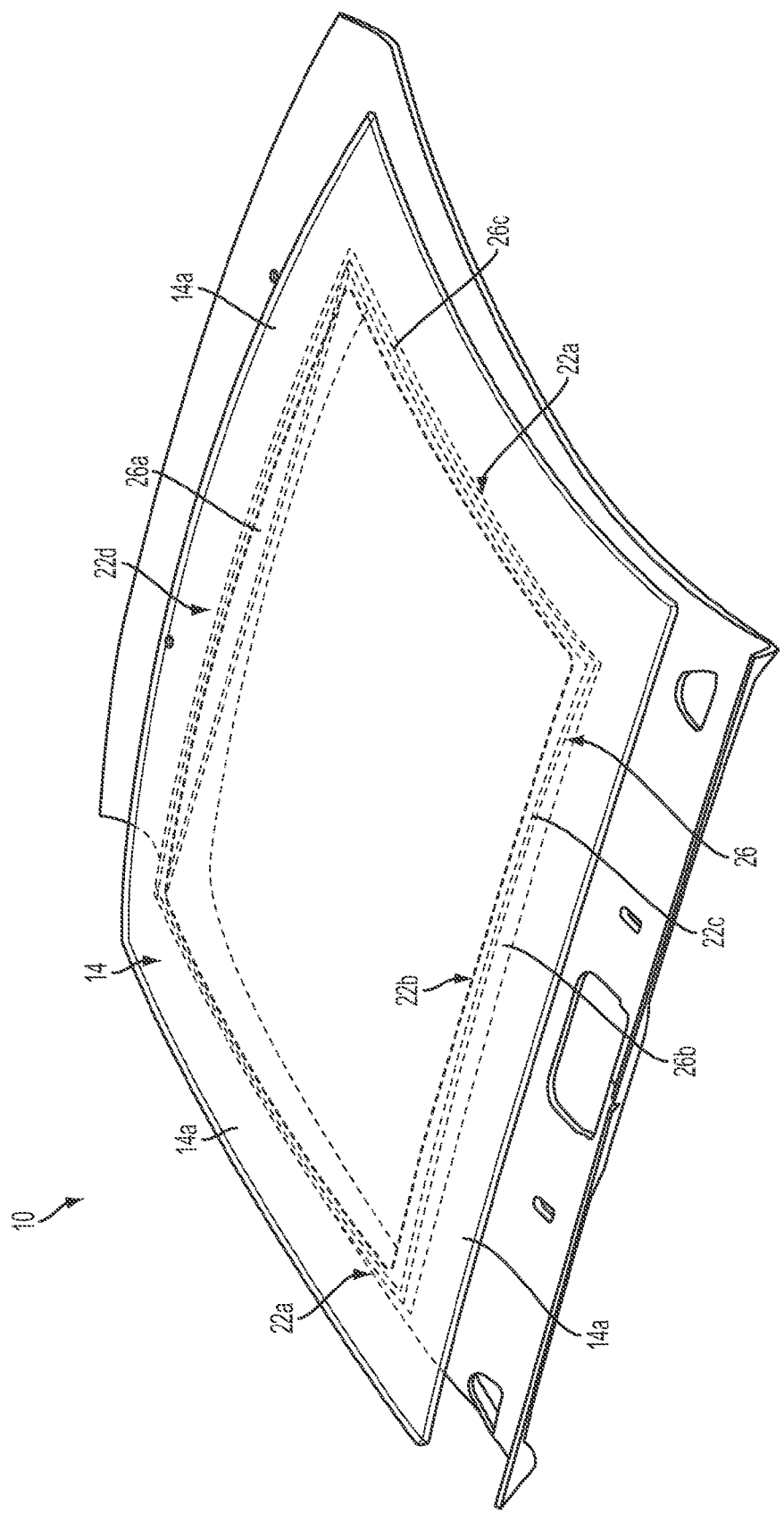
FIG. 2 is a perspective view of the window assembly of FIG. 1.
Figure 3:
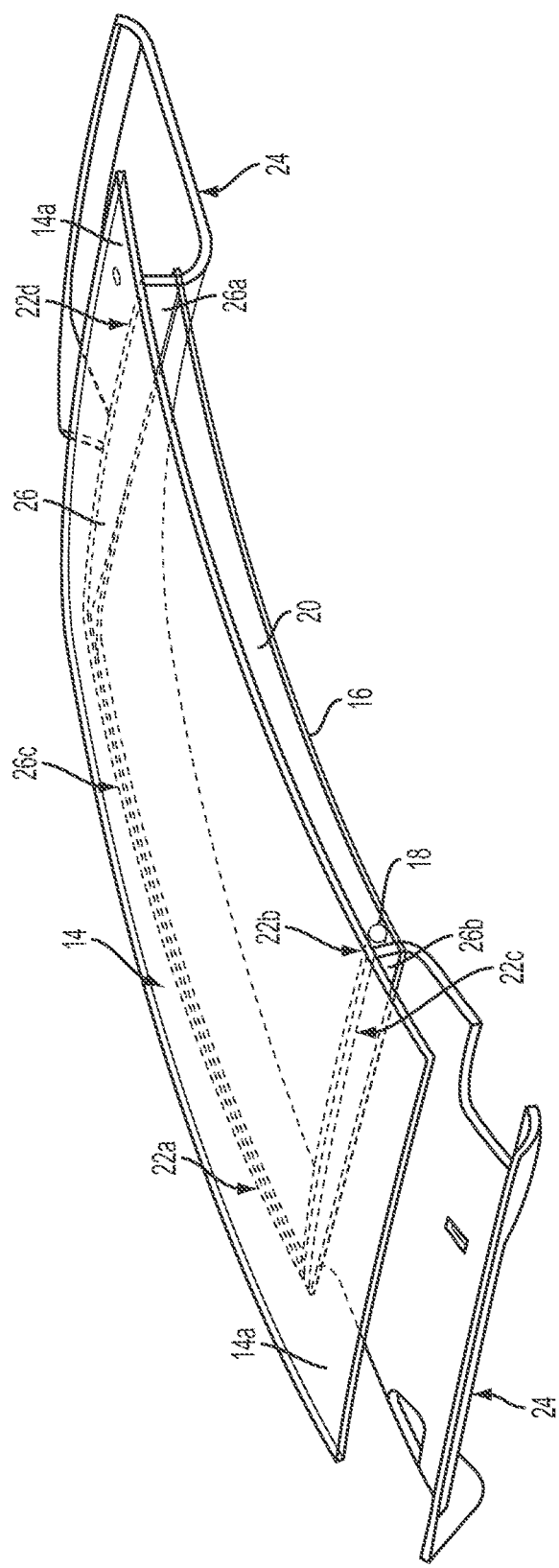
FIG. 3 is a perspective and partial sectional view of the window assembly of FIG. 2.

As shown in FIGS. 2 and 3, window panels 14, 16 are spaced apart to define an interpane cavity 20 therebetween, within which the shade element 18 is disposed. Window panels 14, 16 may comprise any suitable materials or panels, such as transparent glass panels, such as tempered glass panels or laminated glass panels or the like, and optionally may comprise glass panels with a low-'E'missivity coating or treatment, such as on a surface of the panel or panels that faces the cavity 20. The thickness or spacing dimension of the cavity 20 varies across the window assembly, such that the window panels 14, 16 may have different curvatures or profiles to conform with the inner roof or headliner contours and the outer roof or sheet metal contours, in order to provide an aesthetically pleasing appearance at the interior and exterior of the vehicle. In the illustrated embodiment, the side perimeter regions 22a of the window assembly 10 have a narrowed cavity thickness or depth, with the cavity thickness (or separation distance or gap between the window panels 14, 16) increasing towards its largest gap dimension at about the lateral center region 22b (between the side perimeter regions) of the window assembly. Thus, the shade element 18 is configured to be narrow enough or low profile enough to move along the side perimeter regions 22a (such as from the rear perimeter portion 22c towards the front perimeter portion 22d or vice versa) between its open and closed or shading positions. The profile of the window assembly may vary between the rear and front perimeter portions 22c, 22d, such that the cavity thickness increases towards its largest gap dimension at about the longitudinal center region (between the front and rear perimeter regions) of the window assembly. Clearly, other profiles may be envisioned that would have a varying gap between the panels with the largest gap dimension or dimensions at different locations between the front and rear perimeter portions and/or the side perimeter portions, while remaining within the spirit and scope of the present invention.

In the illustrated embodiment, and as shown in FIGS. 2 and 3, outer window panel 14 has larger cross-dimensions than inner window panel 16, such that the perimeter regions of outer window panel 14 extend beyond or overhang corresponding perimeter regions of inner window panel 16. The overhang regions may extend along one or more of the perimeter edges of the window assembly. The degree of overhang (or overhang dimension) of the outer window panel relative to the inner window panel may vary depending on the particular application (such as on the sheet metal opening of the vehicle and curvature of the vehicle body or roof and the headliner shape and contours) and desired mounting surfaces and appearances of the window assembly and vehicle. For example, for flatter or more planar window applications, a smaller or reduced overhang region or regions may be appropriate, but for applications with a greater curvature of the window panel or panels, a greater overhang dimension or dimensions may be appropriate. The overhanging perimeter regions 14a of outer window panel 14 (and a portion of the window panel inboard of the overhang regions) may have a darkened layer or hiding layer 23 (such as a ceramic frit layer or the like) established thereat (such as at an inner or lower surface of the outer window panel) to substantially hide or conceal or render covert the vehicle frame or sheet metal 24 at which the window assembly is mounted and the perimeter sealing and/or spacing element 26 and the coiled shading element 18 (when in its coiled or retracted state).

The window panels 14, 16 of window assembly are spaced apart and joined together via a sealing element or spacer element or spacing frame 26 that is disposed at and around the perimeter regions of the upper or cavity facing surface of the inner window panel 16. The outer window panel 14 is attached at spacing element 26, with the spacing element 26 engaging the cavity facing surface of the outer window panel 14 inboard of the perimeter edges of the outer window panel. Thus, the spacing element 26 functions to space the window panels 14, 16 apart from one another (to establish the interpane cavity 20) and to secure or join the window panels together to form the double pane window assembly 10.

The form or profile of the spacing elements and thus of the gap or interpane cavity may vary depending on the particular application and differences between the exterior surface contour or profile of the vehicle and the interior surface contour or profile of the vehicle. It is envisioned that the minimum gap must be at least large enough to receive the coiled shade element along the perimeter region at which the coiled shade element is located. The gap or spacing distal from or remote from that perimeter region may be reduced since it may only have to provide clearance for the shade film or element in its uncoiled or partially or mostly uncoiled state. For example, the gap or spacing dimensions of the interpane cavity may vary from a minimum of approximately 1 mm or thereabouts (or more or less) to a maximum of about 10 mm or thereabouts (or more or less), depending on the particular application of the window assembly. Optionally, it is envisioned that the window panels may have similar or the same curvatures or profiles such that the gap dimensions are substantially constant or uniform between the window panels, such as for applications where the outer surface of the vehicle is similar to or has a similar profile or contours as the inner surface or in-cabin surface of the vehicle at the location at which the window assembly is mounted.

As can be seen with reference to FIG. 1, the outer surface of the outer window panel 14 may be generally flush with the outer or exterior surface of the sheet metal and/or window panels and/or exterior trim panels or headers of the vehicle to provide a uniform or flush mounted roof window module or the like (such as a side window panel or windshield or backlite or the like). The lower surface of the outer window panel may be adhered or bonded to one or more flanges or attachment surfaces of the vehicle sheet metal or frame or structure, while the inner window panel may generally hang from the outer window panel (for vehicle roof applications) and may also be attached to or engaged with one or more interior trim elements within the vehicle cabin and along the ceiling of the vehicle cabin. As best shown in FIG. 3, the in-cabin surface of the inner window panel 16 may engage and/or be supported at the vehicle sheet metal 24 or other mounting structure to attach the window assembly at the vehicle. The window module may utilize aspects of the window modules described in U.S. patent application Ser. No. 11/933,699, filed Nov. 1, 2007, and published May 8, 2008 as U.S. Patent Publication No. US-2008-0106124, which is hereby incorporated herein by reference in its entirety.

Shade element 18 comprises a conductive shade element, such as an electro-polymeric or metalized polymeric shade element or film or the like, that has a thin rolled up or coiled conductive film, such as a metalized polymeric film or the like, that is responsive to electrostatic action, and that unrolls when a voltage is applied thereto, such as by utilizing aspects of the insulated glazing units described in U.S. Pat. No. 7,645,977 and/or International Publication Nos. WO 2012/177995 and/or WO 2011/133830, which are hereby incorporated herein by reference in their entireties. The coiled film is coiled or retracted to an open or non-shading position in the absence of a voltage applied thereto, and may at least partially uncoil or extend across the window assembly to a closed or shading position or partially shading position responsive to a voltage applied thereto.

Optionally, an end stop or roll stop or stop element (such as an electrically conductive element or strip, such as a metallic plate or bar or wire or element, such as an aluminum rectangular wire or element or the like, or such as a metal-coated plastic or polymeric element, or such as a conductive tape or coating applied at the spacing element or the like) may be disposed at an opposite side portion of the spacing element 26 and at and along a perimeter region of the window panel opposite from where the coiled conductive or metalized polymeric film is disposed. The electrically conductive roll stop or element may comprise any suitable electrically conductive material and may be flat and/or hollow or solid or the like, while remaining within the spirit and scope of the present invention. The roll stop is disposed at and along an opposite side of the perimeter seal from the exposed or non-coated strip or perimeter region of the window panel. The end stop or metallic wire limits or substantially precludes contact of the uncoiled end of the polymeric shade element or film with the dielectric surface of the panel to facilitate faster response times when the shade element is being retracted or recoiled towards its non-shading or coiled position. The end stop functions to help align the unrolled end of the film when it is fully unrolled or deployed and also discharges the unrolled film when the film contacts the end stop. The end stop may comprise a metallic material or other suitable material or suitable conductive material, and may be plastic coated or the like, such as coated with a low dissipation factor polymer, such as, for example, polypropylene, fluorinated ethylene propylene (FEP) or polytetrafluoroethylene (PTFE) or the like.

In the illustrated embodiment, the in-cavity surface of the inner or lower window panel is coated with a conductive coating or layer, such as a transparent conductive coating such as indium tin oxide (ITO) coating or layer or the like. The coiled film or shade element comprises a conductive film (such as a metalized polymeric film or the like) and has a conductive or metallic side of the film facing the coated surface of the window panel to which it is attached. The metalized polymeric film is coiled and disposed at the window panel with its metal side or surface at the outside diameter of the rolled or coiled film.

In the illustrated embodiment, and as shown in FIG. 4, the film 18 is disposed at the lower window panel 16 and the film comprises a laminated film with a dielectric layer 18a (such as a capacitor grade dielectric film or a Polyethylene Naphthalate (PEN) layer or the like), a conductive layer 18b (such as a transparent conductive layer, such as an ITO layer or the like) and an ink layer 18c. In the illustrated embodiment, the ink layer 18c is disposed at the transparent ITO layer 18b to cover or hide or conceal the typically shiny or mirror-like appearance of the PEN layer and reduce the reflectivity at the film and window panel. The ink layer may comprise any suitable or desired or selected color, depending on the particular application of the film and window assembly. The ink layer comprises a thin opaque or colored or tinted layer that may comprise a conductive material (whereby optionally the ITO layer may be obviated) or a thin non-conductive material (which is sufficiently thin to allow for operation of the shade when the shade is powered), while remaining within the spirit and scope of the present invention.

Optionally, the polymeric film may comprise other laminated materials or layers, and may have the ink layer disposed at the upper surface of the polymeric layer (the upper layer 18a in FIG. 4, but it could be the middle layer or even the lower layer of a selected laminate film), depending on the particular application of the shade and window assembly. For example, the transparent conductive layer may be disposed at the lower or lowermost surface of the dielectric film (and directly beneath the dielectric layer), and optionally the film may comprise a glass layer film lamination utilizing ultrathin flexible glass (such as for the dielectric layer) having a thickness of less than about 0.8 mm, preferably less than or equal to approximately 0.5 mm, and more preferably less than or equal to approximately 0.3 mm (such as by utilizing aspects of the glass laminates described in U.S. Pat. No. 7,420,756, which is hereby incorporated herein by reference in its entirety).

Optionally, the glass substrate of the lower or inner glass panel may have its inner surface (the surface at which the film is disposed) coated with a conductive layer (such as indium tin oxide or the like), which is then coated or covered with a dielectric layer or coating. Optionally, a laminate layer or sheet that comprises a dielectric layer and a conductive layer (such as ITO or the like) may be laminated or adhered at the inner or upper glass surface of the inner or lower glass panel. For example, and with reference to FIG. 4A, a laminate sheet 17' may be applied or adhered at the surface of the glass panel 16' at which the film or shade 18' is disposed. The laminate sheet 17' includes a dielectric layer or clear polymer layer 17a' and a conductive layer 17b' (such as ITO or the like or such as a metallic layer or thin film, such as a thin aluminum layer or the like) that may be laminated or otherwise joined or sandwiched together. A layer of adhesive 17c' is provided at the glass surface 16a' or at the laminate sheet 17' to adhere or laminate the conductive layer 17b' and the laminate sheet 17' at the glass surface of the glass panel 16'. For example, the laminate sheet 17' may be laminated onto the bare glass surface 16a' of the glass panel.

Thus, the dielectric layer or sheet or film may have the conductive layer deposited on its lower surface or underside, whereby the dielectric layer—conductive layer construction is adhered or laminated onto the glass panel to provide the conductive layer and dielectric layer at the glass panel. Before or after lamination of the sheet at the glass surface, the dielectric layer may be partially removed at electrical connection locations at or near a perimeter region of the glass panel to provide electrical contacts for electrically connecting to the conductive layer at the glass panel.

Optionally, and for any film construction, it is desirable to have the film coiled as tightly as possible to provide the desired performance of the film. It is also desirable to have the film be as thin as possible while still providing the desired or appropriate performance characteristics (voltage and force to unroll, dissipation and the like).

From testing, it has been found that the polymeric layer appears to have the most effect of all of the layers on the eventual coil diameter of the film. For example, the thinner the polymer layer, the tighter the roll that can be achieved, with the coil being processed by wrapping the film around a small mandrel (or not using a mandrel at all) and the film coiling onto itself when placed into the furnace. Smaller coils provide for smaller packaging, which is desirable when applying the shade and window assembly into a vehicle.

Optionally, and desirably, a mandrel may be used and the cut film or shade may be tightly wrapped or coiled onto the mandrel before the film is placed in a furnace (or otherwise shaped or cured). After the heating process, the coiled film is uncoiled and the end of the coil that has the mandrel (such as a ceramic mandrel or the like) disposed thereat is attached at the anchor stop or element to affix the fixed end of the film at the window panel. The mandrel may be removed after the heating process, or may be attached at the end of the shade film. Optionally, the mandrel may comprise a carbon fiber tubing or mandrel, or may comprise other suitable materials. The carbon fiber tubing or mandrel or the like may be attached at the end of the shade film and, after the film has been heated and uncoiled, the tubing or mandrel may be attached at the window panel to attach or affix the fixed end of the shade at the window panel without use or need of a separate anchor stop element or bar (such that the carbon fiber tubing or mandrel acts as the anchor stop element at the window panel).

When forming the tight coil of the shade film for heating, the mandrel is disposed at and/or attached at an end of the shade film, and before or after the shade film is heated to form or retain its tightly coiled form, the outer or free end of the heated coil is formed to have the fixed loop or coil thereat. After the coiled shade film has been heated, the film is uncoiled from the mandrel and coiled tightly around the fixed loop. Optionally, a second mandrel (such as a carbon fiber tubing or mandrel or the like) may be disposed at the fixed loop at the end of the shade film (the end that is disposed at or near the stop element when uncoiled) to assist in tightly coiling the film about the mandrel and fixed loop.

An exemplary film may include a 12 micron thick polymer layer or film (such as PEN or the like), or even a polymer layer having a thickness of less than about 12 microns, such as about 7 microns thick or thereabouts (or more or less depending on the particular application of the shade film. The conductive layer (such as an ITO layer or the like) has a thickness that is typically rated in its sheet resistance (ohms/square). Testing has been conducted with transparent conductive layers having a sheet resistance of about 200 ohms/square and about 100 ohms/square and about 60 ohms/square. The 60 ohms/square transparent conductive layer is thicker than the 100 or 200 ohms/square and has the highest resistance of the options that have been tested. Testing has shown that it may be more efficient to have a thicker ITO layer to keep the operation voltage of the assembled unit at reasonable levels. Optionally, it is envisioned that the transparent conductive layer may comprise a layer having a sheet resistance of less than about 60 ohms/square, such as around 30 ohms/square or less, such as around 10 ohms/square or thereabouts.

Optionally, one or both of the upper and lower window panels may be tinted or darkened. For example, the lower window panel of the window assembly may be tinted or darkened or rendered partially opaque or partially non-transmissive of visible light (and/or UV light). Such a tinted window panel may assist in heat reduction, light blockage and hiding of imperfections, and may also further reduce glare that may be caused by the mirror-like finish of the PEN film.

The inner surface of the lower or inner window panel (the surface along which the film is uncoiled) is coated with a transparent conductive coating or layer (such as a thin indium tin oxide (ITO) layer or the like, and a dielectric layer or coating is disposed over the conductive coating or layer. At least a portion of the transparent conductive layer is exposed at or near a perimeter region of the window panel and at least a portion of the dielectric layer extends to a perimeter region of the window panel, in order to provide for electrical connections to be made to the transparent conductive layer and to be made to the film (such as by extending or disposing a conductive connector over the dielectric layer at the perimeter region of the window panel to the anchor stop of the film), such as in a manner similar to the connections described in International Publication Nos. WO 2012/177995 and/or WO 2011/133830, which are hereby incorporated herein by reference in their entireties.

The dielectric layer (such as PET or the like) may be laminated onto the transparent conductive layer or coating on the glass surface, such as in a similar manner as described in International Publication Nos. WO 2012/177995 and/or WO 2011/133830, incorporated above. Optionally, the dielectric layer may be screen printed or spray coated or otherwise established on or over the transparent conductive layer at the glass surface.

Figure 5:
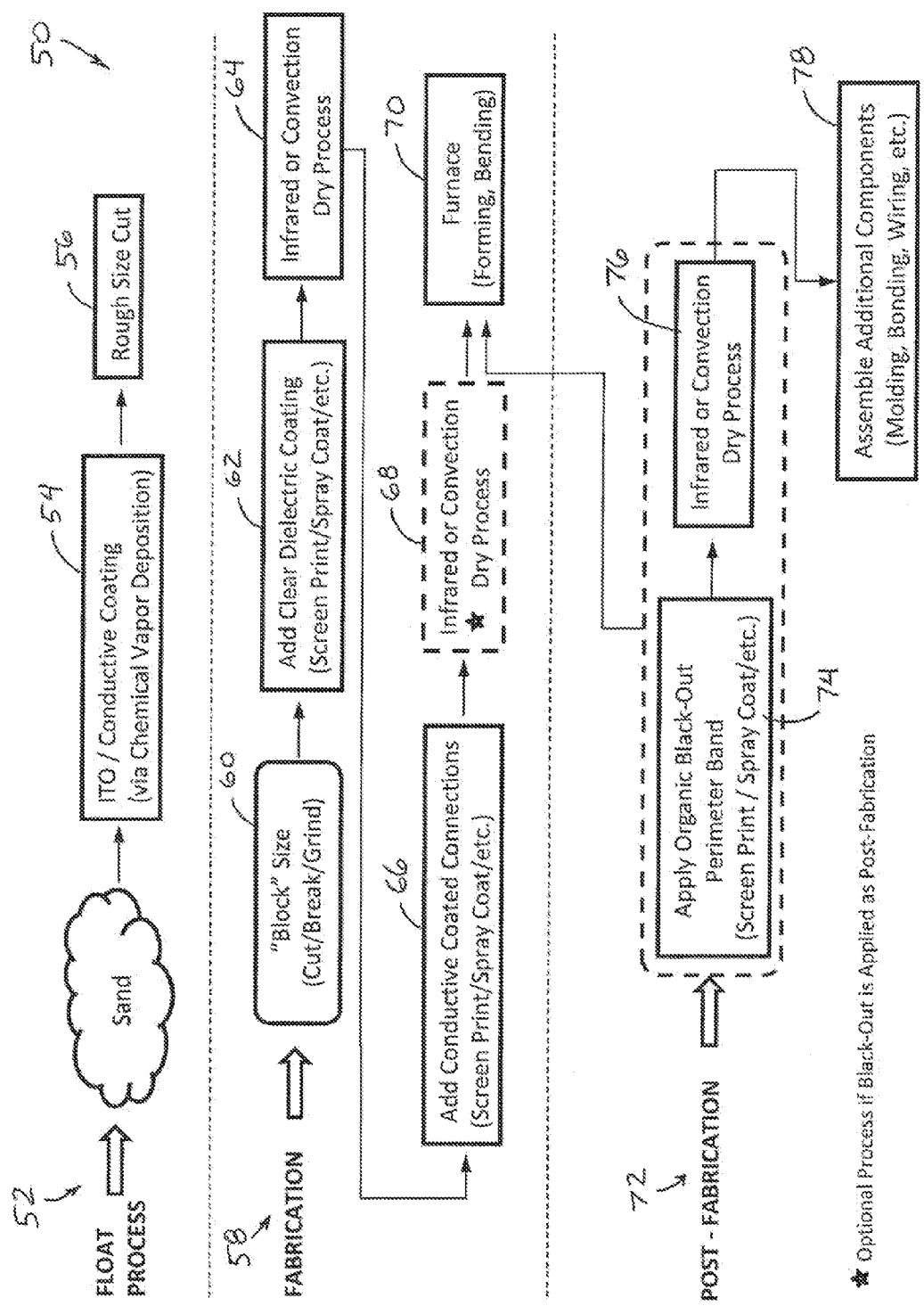
FIG. 5 is a glass panel fabrication process for fabricating and coating a glass panel that is suitable for a lower or inner panel of a window assembly in accordance with the present invention.

For example, and with reference to FIG. 5, a glass coating process 50 includes forming a glass sheet or panel via a known float process 52, which makes the glass and coats a surface of the glass with the transparent conductive coating or ITO at 54, such as via a chemical vapor deposition process or the like. The formed glass is then rough size cut at 56 to form a glass blank. A fabrication process 58 cuts and breaks and grinds the glass blank at 60 to achieve a flat or substantially planar piece of glass of correct size and shape and with a clean perimeter edge. A clear dielectric coating is then applied to the transparent conductive coating surface of the panel at 62, such as via screen printing or spray coating or the like. The clear dielectric coating is coated onto the surface, and the conductive coating surface may be masked to maintain at least a portion of the conductive coating exposed at or near the perimeter region of the glass panel to provide a connection location for electrical connection to the conductive coating that is disposed beneath the dielectric layer (for example, the dielectric may be coated and fused at the ITO layer except in a small connection pad or location of exposed ITO that is masked during the dielectric coating process). The dielectric coated panel may then be dried at 64 (such as via an infrared or convection dry process or the like) to fuse the clear dielectric coating to the transparent conductive coating at the glass surface.

The clear dielectric coating may comprise any suitable dielectric material, such as, for example, a Sol-gel material or a capacitor grade dielectric film or material or the like, that is deposited or coated onto the glass surface and/or transparent conductive coating at the glass surface and then dried or cured thereat. After the clear dielectric coating is cured at the panel, electrically conductive connections or traces may be established at 66, such as at an exposed portion of the transparent conductive coating (that was masked during the coating of the clear dielectric coating on the transparent conductive layer) and at an exposed perimeter portion of the clear dielectric coating. The electrically conductive connections or traces may be screen printed or spray coated or otherwise established at the respective coatings or layers at the glass panel.

Optionally, the glass panel may be cured or dried at 68 (such as via an infrared or convention drying process) to cure the electrical connections thereat. If an opaque or black-out or darkened or light absorbing or frit layer is applied during the fabrication process (such as to the inner or upper surface of the panel and over the dielectric layer), this drying step may be skipped. If the light absorbing layer is applied to the inner or upper surface of the panel and over the dielectric layer, the exposed ITO electrical connection pad or location would be masked during application of the light absorbing layer, so that a window is established through the light absorbing layer. The window would then be filled or coated with a dark coating or layer after electrical connection is made to the exposed ITO pad to fill in the window so that the electrical connection is not discernible to a person in the vehicle looking at the window assembly when the window assembly is normally mounted in the vehicle. The panel (with the electrically conductive connections and optionally with a light absorbing layer established thereat) is then heated and formed and bent at 70.

A post-fabrication process 72 may apply (at 74) an opaque or black-out or darkened or light absorbing or frit layer at the perimeter regions of the glass panel to hide or conceal or render covert the frame and anchor stop and end stop of the shade and window assembly from view by a person within the vehicle when the window assembly is mounted at the vehicle. If the light absorbing layer is established as a post-fabrication process (to either surface of the glass panel at the perimeter regions, such as to the lower or outer surface of the glass panel), the window panel is then again dried or cured at 76, such as via an infrared or convection drying process or the like to cure or fuse the light absorbing layer at the glass panel. The window panel is then assembled at 78 with its additional components, such as molding and bonding elements and wiring and the like.

The coiled film and/or its support structure or element may be fixtured and bonded along an inboard portion of the spacing element or frame 26. During operation of the roller shade, a voltage may be selectively applied (such as in response to a user input or control signal or the like) between the conductive roller shade and the conductive coating or layer at the glass surface during operation of the roller shade. For example, an electrical wire or lead may be connected to the conductive coating at the glass surface and another electrical wire may be connected to the roller shade (such as to the anchor element or bar at which the roller shade is attached), such that, when power is applied (and a voltage difference is generated between the roller shade and the conductive coating), the roller shade may unroll towards its closed or uncoiled state, and when power is stopped or no longer applied, the roller shade may be coiled or rolled up to its open or coiled state along the perimeter portion of the spacing element or frame.

Spacing element or frame 26 comprises a perimeter frame having perimeter portions 26a, 26b, 26c that encompass or surround and establish the interpane cavity between the window panels 14, 16. The spacing element or frame 26 is adhered to the lower or inner window panel 16 (which may include an opaque or substantially opaque coating or layer, such as a ceramic frit layer or the like disposed or established about its periphery where the spacing element is attached), such as via an adhesive bead or the like, with the spacing element 26 receiving or retaining the end stop at the lower window panel 16 and along its perimeter portion 26b opposite from its perimeter portion 26a where the roller shade 18 is disposed in its unrolled state. The roller shade 18 is attached at or mounted to a support or anchor element, which in turn is mounted at or received at and along portion 26a of spacing element 26, such that the roller shade is disposed at the inner surface of the lower window panel 16. The upper or outer window panel 14 is adhered or attached at the upper perimeter of the spacing element 26 via an adhesive bead or the like to assemble the window assembly and sandwich the spacing element 26 between the window panels 14, 16, with the roller shade disposed at the inner surface (facing the cavity) of the window panel 16.

The window assembly 10, when fully assembled, may be disposed at an opening in a vehicle and secured or mounted thereat or therein via any suitable mounting or attaching means. For example, the outer perimeter of the outer or upper window panel may be bonded or adhered to a metal frame or the like at the vehicle, or the window assembly may be attached to and/or supported by a separate frame that is attached to the vehicle. Optionally, the window assembly may include mounting hardware or the like that is attached to corresponding mounting structure or hardware at the vehicle to mount the window assembly at the vehicle.

Although shown and described as comprising a sunroof or moonroof for a vehicle, it is envisioned that the shaded window assembly of the present invention may be suitable for a variety of vehicular applications, such as side window applications and/or rear window or backlite applications and/or windshield applications. For example, an upper portion of a windshield may comprise the spaced apart window panels with a spacer element and roller shade as described above, with a perimeter trim panel or trim strip extending along the lower edge of the dual panel construction. Thus, the driver may selectively darken or shade the upper portion of the windshield (or optionally, the windshield portion may automatically darken responsive to one or more ambient light sensors or glare sensors at the vehicle) to limit glare or sunlight passing through the upper portion of the windshield, such as when driving towards the sunrise or sunset. Optionally, aspects of the window assembly of the present invention may also or otherwise be applied to a rear backlite of a vehicle (either shading the entire rear backlite or a portion of the rear backlite) or a side window of a vehicle or the like. For applications where the shade element unrolls to shade only a portion of the window or windshield, the dual pane construction may only be at that portion of the window or windshield, or the dual pane and spacing element construction may apply to the entire window or windshield, with the roller shade being controlled or limited or sized to unroll only to cover or shade or darken a selected portion of the window or windshield (such that the roller shade only partially unrolls over part of the window or windshield or such that the roller shade is cut or formed so that, when fully unrolled, it extends over or encompasses only a portion of the window or windshield). Other window configurations and roller shade constructions (such as by utilizing aspects of U.S. patent application Ser. No. 11/243,783, filed Oct. 5, 2005 and published Apr. 20, 2006 as U.S. Publication No. US-2006-0082192, which is hereby incorporated herein by reference in its entirety) may be implemented while remaining within the spirit and scope of the present invention.

Optionally, for example, the window assembly of the present invention may be configured for use in other applications, such as non-vehicular applications, such as residential windows (such as house windows, including exterior and interior windows, and/or storm doors and the like), commercial windows (such as general building windows, skyscraper windows, and/or the like), aerospace windows (such as airplane windows and/or the like), appliance windows (such as for refrigerator doors, washing machine lids, clothes dryer doors, wine cooler doors, and/or the like), interior windows (such as for office partitions, room dividing panels, bathroom glass, light lenses and/or the like) and/or any other transportation vehicle windows (such as, for example, windows for trains, buses, RVs, tractors, heavy equipment and/or the like), while remaining within the spirit and scope of the present invention. The present invention thus provides a shaded window that may be suitable for use in a variety of applications that are suitable for or that require some type of dimming or blackout or shading.

When uncoiled, the film provides a desired degree of shading at the window assembly, and may provide shading in any suitable color, depending on the particular application of the window assembly. For example, the film or films may be painted or inked or screen printed or coated with a dark or black coating to provide a dark or black colored shading of the window assembly, or the film or films may be painted or inked or screen printed or coated with any other colored coating or layer or the like to provide the desired appearance of the shaded window assembly. Optionally, for example, the film or films may be colored or tinted or patterned (such as with a vehicle manufacturer logo or any desirable or suitable pattern or icon or image or the like) to match the interior or exterior color scheme or trim scheme of the particular vehicle or vehicle manufacturer, or the film or films may be colored or tinted to match a selected color scheme as selected by the vehicle manufacturer or the vehicle owner or the like, such as by utilizing aspects of the mirror assemblies described in U.S. Pat. Nos. 7,289,037; 7,626,749; and/or U.S. Pat. No. 7,255,451, which are hereby incorporated herein by reference in their entireties.

Optionally, the film may have a reflective layer or reflective property, so as to reflect light and/or UV radiation away from the window and away from the interior cabin of the vehicle. Optionally, the film may comprise polarization properties and may darken when it encounters UV radiation (or the film may automatically extend or close or cover the window panel when a threshold degree of UV radiation is detected or sensed at the window assembly, such as via a controller that, responsive to a detection of a threshold level of UV radiation, energizes the shade to extend or deploy or uncoil the film).

Optionally, the film may be formed without an ink layer. For example, the film material or substrate may be already colored or darkened, such as by having a pigmentation additive added to the film substrate so the film substrate itself is formed at the desired or selected color and opaqueness. Such an additive may obviate the need for the inking process and may provide a more durable film (because, with the pigmentation additive as part of the film material itself, there is a reduced chance of scratching or marring an inked surface at the surface of the shade film). Optionally, an ultraviolet (UV) or infrared (IR) pigmentation may be added to the film substrate or may be disposed at the surface of the film to provide a desired UV/IR protection or filter at the shade film.

The film or films may provide any desired or appropriate degree of shading and thus may function to block or attenuate a desired or appropriate percentage of light incident at the window assembly. For example, the film may block or attenuate at least about forty percent of the visible light incident at the window assembly, and preferably may block or attenuate at least about sixty percent of the visible light incident at the window assembly, more preferably at least about eighty percent of the visible light incident at the window assembly (or the film may block or attenuate less than about forty percent of the visible light incident at the window assembly), and it is envisioned that the film may block up to about one hundred percent of the visible light incident at the window assembly (so as to provide a generally or substantially opaque or non-light-transmissive window or sunroof), depending on the particular application of the window assembly and desired shading of the window when the shading element is deployed. The degree of light transmissivity or light attenuation of the film or shade element may be varied by varying the thickness of the ink layer or coating on the polymeric film roll or by including a metallic coating or light absorbing layer or light reflecting layer at the polymeric film roll or the like.

The coiled film or shading element (or elements) is coiled or retracted to an open or non-shading position in the absence of a voltage applied thereto, and may uncoil or extend across the window assembly to a closed or shading position responsive to a voltage applied thereto. The voltage may be selectively applied via actuation of a user input or the like within the vehicle (such as a button or switch in the cabin of the vehicle, such as at an interior rearview mirror assembly of the vehicle) or the voltage may be automatically applied in response to a sensor or control (such as a control that actuates the shading element to shade the window responsive to a temperature sensor determining that the in-cabin temperature or external temperature has reached a threshold level or the like). The control unit or user input and power source may be attached to electrical connectors of a wire harness or leads of the finished window module or assembly, such as via a quick-connect plug and socket type connection or the like. The shading element may be operable via any suitable powering means. For example, the shading element may operate at about 530 VDC or thereabouts (or more or less) with a parasitic draw of about 150 to about 160 microamps or thereabouts (or more or less). The voltage may vary depending on the film roll and tightness of the film roll when coiled in its retracted state.

The window assembly may comprise any suitable frame or sealing element or structure that establishes a substantially sealed interpane cavity in which the shading element is disposed. Optionally, the window assembly may include a breathing or pressure regulating element or device or feature, which allows the interpane cavity pressure to be regulated or controlled. For example, the pressure regulating feature may comprise a bladder or pump element that may allow for air to escape the interpane cavity to maintain the pressure generally constant, such as when the temperature of the window assembly increases (and the pressure in the cavity increases). Likewise, the pressure regulating feature may allow for air to enter the interpane cavity when the temperature of the window assembly decreases (resulting in a decrease or partial vacuum in the interpane cavity pressure).

Optionally, the window assembly may include one or more sensors for detecting or determining a window or glass status. For example, the window assembly may include a glass breakage sensor (for determining if one or both of the glass panels breaks or cracks) and/or a humidity sensor (for determining the humidity within the interpane cavity of the window assembly) and/or a temperature sensor (for determining the temperature within the interpane cavity of the window assembly) and/or the like. The window assembly may include one or more individual sensors at one or both of the window panels or the window assembly may include a single sensor device that provides multiple sensing functions. The sensor or sensors may be disposed at the glass panel via any suitable means (such as an adhesive or bonding material or the like) and may be wired and electrically connected to a wiring harness at the window assembly when the window assembly is mounted at a vehicle.

Figure 6:
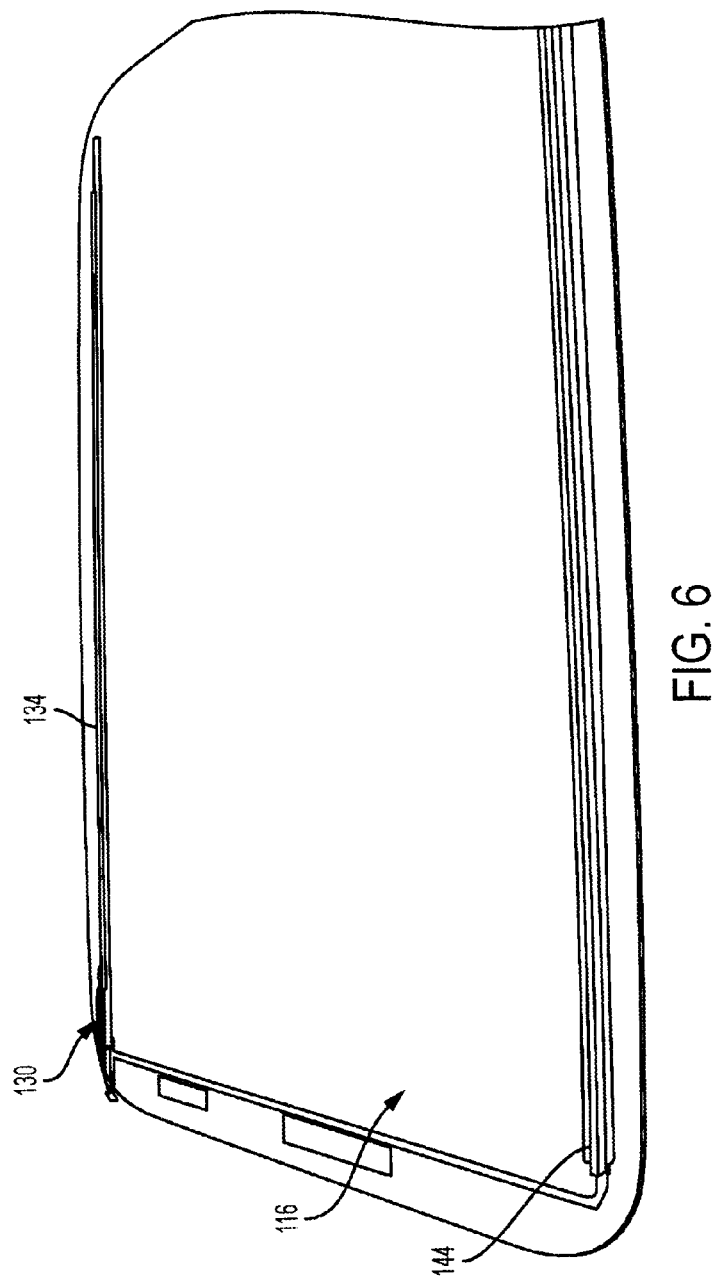
FIG. 6 is a perspective view of a window panel of the window assembly of the present invention, shown with a sensor disposed thereat.
Figure 7:
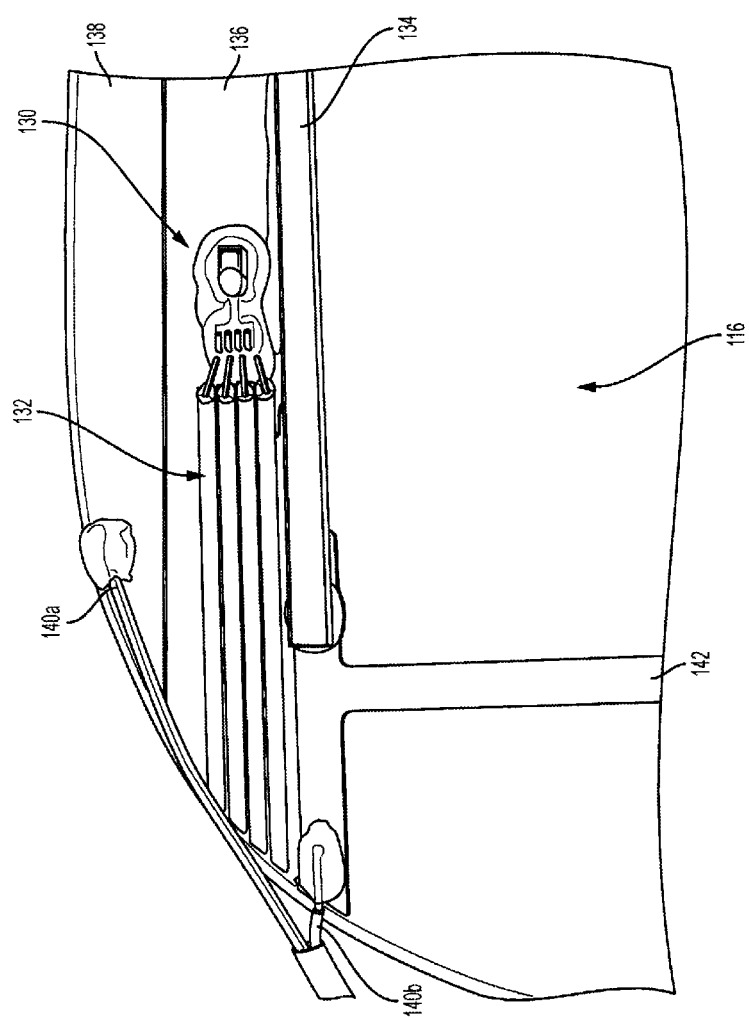
FIG. 7 is an enlarged view of the window panel and sensor of FIG. 6.
Figure 8:
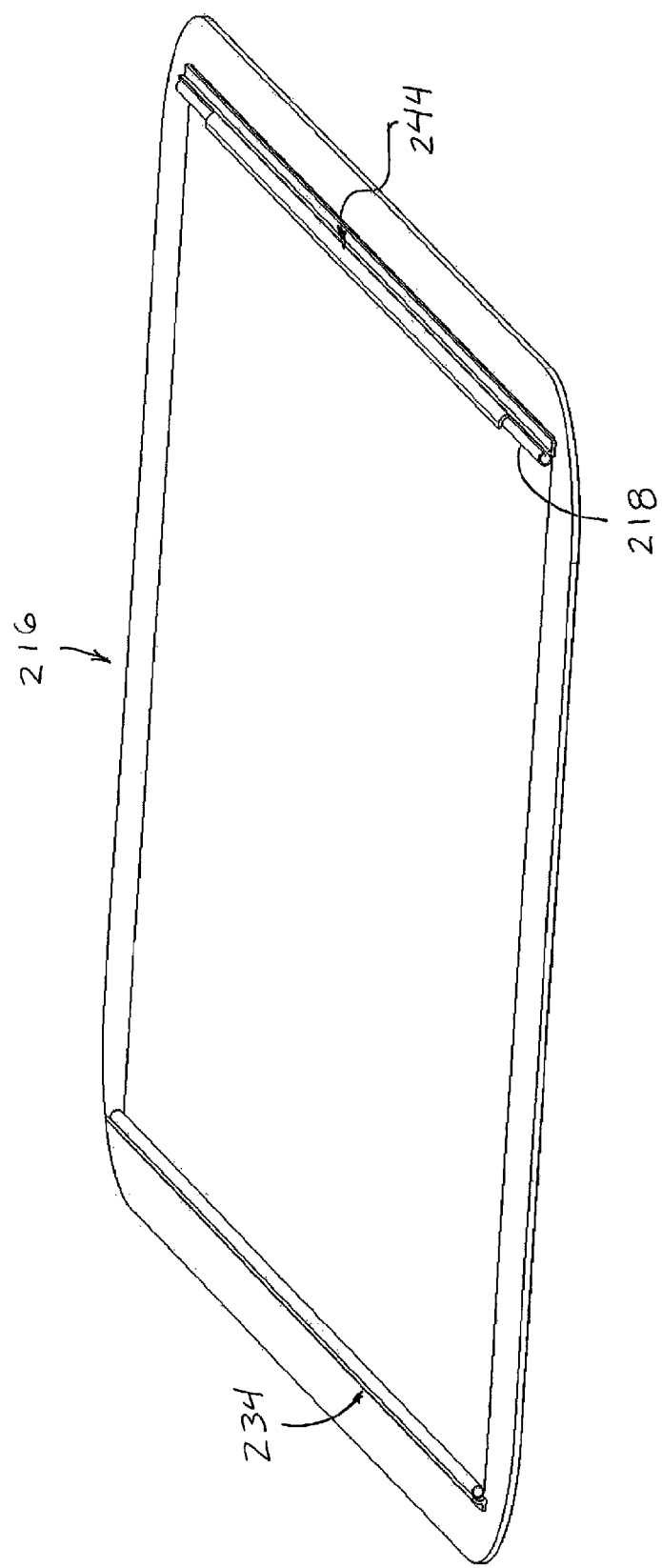
FIG. 8 is a perspective view of a window panel of another window assembly of the present invention, shown with a curved anchor bar and stop bar.

Optionally, and such as shown in FIGS. 6 and 7, a window panel 116 of a window assembly of the present invention (such as an inner or lower window panel as shown or such as an outer or upper window panel) includes a sensor device 130 established at the inner surface of the window panel. In the illustrated embodiment, the sensor device 130 comprises or provides a plurality of sensing functions (such as a glass breakage sensing function, a humidity sensing function and/or a temperature sensing function), with a plurality of electrically conductive traces or elements 132 (FIG. 7) that are established or disposed between the sensor device 130 and a perimeter region of the window panel (where electrically conductive wires or elements may be connected thereto for electrically connecting the sensor device to a control or power source, such as when the window assembly is installed at a vehicle). As shown in FIG. 7, the sensor device may comprise a single combination sensor device that provides multiple sensing functions (such as, for example, temperature and humidity sensing) via sensing circuitry of the single sensor device. Optionally, however, a plurality of separate individual sensors or sensing elements may be provided that each provide a respective sensing function and are separately wired or electrically connected to a particular electrical connector or common connector when the window assembly is mounted at the vehicle. By providing a single combination sensor, the number of electrically conductive traces may be reduced by providing a common ground trace for the sensors.

As can be seen in FIG. 7, the sensor device 130 may be disposed at or near the end stop element 134 and at the dielectric layer 136 that is disposed on or over a substantial portion of the conductive layer 138 (and the sensor device may be disposed anywhere at the glass panel, but preferably at the dielectric layer to allow for screen printing the electrically conductive traces at the glass panel). The traces 132 (shown in FIG. 7 as four traces for the sensing elements or functions and with at least one trace for grounding the sensor device) are screen printed on the dielectric layer to a perimeter region of the window panel, where they can be electrically connected to a suitable electrical connector or wiring or the like. As also shown in FIG. 7, a wire 140*a* is electrically connected (such as via solder or the like) at the transparent conductive layer 138, while another wire 140*b* is electrically connected (such as via solder or the like) to an electrically conductive trace or busbar 142 established on the dielectric layer 136 and between the perimeter region of the glass panel and the end stop 134 and the base or anchor 144 (where the coiled film is anchored or attached) to provide electrical current and power to the transparent conductive layer and the anchor and end stops for operation of the shade element and the window assembly in accordance with the present invention. Other means for electrically connecting a wire or wire harness or electrical connector to the conductive layer and the coiled film may be implemented, such as discussed below with respect to FIGS. 19A-34D, while remaining within the spirit and scope of the present invention.

Optionally, the lower window panel of the window assembly may have one or more charge dissipating strips (such as multiple small or micro strips) disposed along the panel and between the roll stop and the anchor bar (and such as by utilizing aspects of the window assemblies described in International Publication No. WO 2012/177995, which is hereby incorporated herein by reference in its entirety). The charge dissipating strips may comprise any suitable charge dissipating material, and may comprise a transparent charge dissipating material disposed as one or more layers or strips across the window panel. For example, the charge dissipating strips may be screen printed at and over and along the dielectric layer in a desired size and pattern. The width of the strips and the spacing between the strips may be selected depending on the particular application of the window panel and the desired degree of dissipation and/or conductivity provided by the strips. Optionally, the charge dissipating strips may be disposed at and along an outer or peripheral portion of the window panel, such as along the frame portion of the window assembly, whereby the strips may or may not be transparent, since they may be disposed at a location that is not readily viewable by a person viewing the window assembly from inside or outside of the vehicle. The charge dissipating material or strips function to assist in stored charge reduction or elimination, such as in a similar manner as discussed above.

Optionally, it is envisioned that a plurality of very small strips or micro strips of an electrically conductive material may be established at or in and along the dielectric layer at the window panel and between the anchor stop and the end stop. Such micro strips provide channels or raceways or busbars to channel out the residual charges left at the dielectric layer and thus provide a path or paths for the charge to dissipate (whereby the residual charge dissipates to the conductive strips and flows along the strips to the end stop and/or anchor stop and away from the dielectric material). It is envisioned that such micro strips or charge dissipating strips, if established to be sufficiently electrically conductive, may obviate the need for the jumper wire between the anchor stop and the end stop.

Optionally, the dissipation strips may run along or across the window panel (such as between the anchor stop and end stop) or may run across the window panel generally parallel to the anchor stop and end stop. Optionally, the dissipation strips may run at an angle across the window panel, and the window assembly may be operable to switch or selectively connect the dissipation strips to ground. For example, the window assembly may be operable to power the dissipation strips to cycle or extend or uncoil the shade, and then may ground the dissipation strips to dissipate unwanted stored charge.

The anchor stop and/or the end stop may comprise any suitable shape or form for engagement with the roller shade when it is coiled/retraced or uncoiled/extended. Optionally, for example, the anchor stop and/or end stop may comprise curved receiving shapes for at least partially receiving the roller shade therein. For example, and with reference to FIGS. 8-12, a window assembly or module (such as a sunroof or moonroof or the like or such as a side or rear window or the like) of a vehicle includes an outer window panel and an inner window panel 216 with a coiled shade element 218 disposed therebetween. As shown in FIGS. 8-12, the roller shade is extended or uncoiled between a curved or arcuate shaped anchor stop 244 and a curved or arcuate shaped end stop 234. Although shown with the roller shade coiled at both the end stop and the anchor stop, the coiled shade element would, in use, be at either the end stop or the anchor stop, but not both, and is merely shown at both stops in FIG. 8 for brevity.

Figure 10:
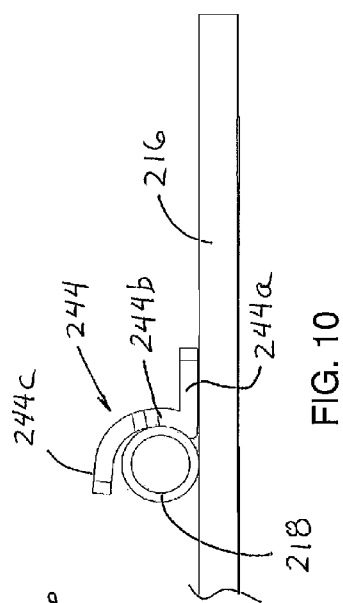
FIG. 10 is a side elevation of the anchor bar of FIG. 9.
Figure 9:
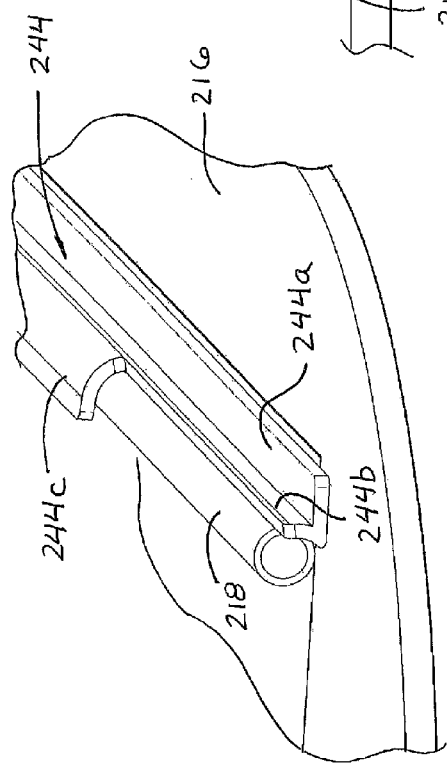
FIG. 9 is an enlarged perspective view of the anchor bar of the window panel of FIG. 8.

As best shown in FIGS. 9 and 10, the anchor stop 244 has a mounting base or base portion 244*a* and an arcuate receiving portion 244*b* that is shaped to receive the coiled roller shade 218 at least partially therein. The curved or arcuate shaped receiving portion 244*b* of the anchor stop 244 allows the shade coil to seat properly against the anchor stop when retracted, and to provide enhanced or maximum contact between the coiled shade and the anchor stop, and to limit or substantially preclude deformation during cycling of the roller shade. As best seen in FIG. 10, at least a portion 244*c* of the receiving portion 244*b* of the anchor stop extends over the coiled roller shade to provide a cover portion over top of the coil at least partially across the coiled shade element. The cover portion 244*c* of the anchor stop aids in seating the coiled shade element and also limits or substantially precludes the coil from dropping too far away from the glass inner panel 216 when or if the window assembly is flipped over, such as during manufacture and assembly of the window assembly or during shipment of the window assembly.

Figure 12:
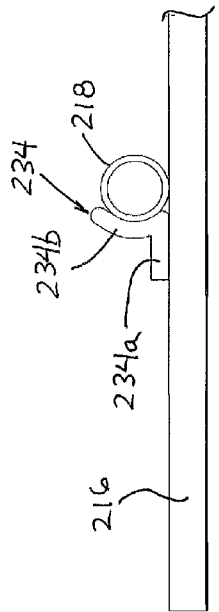
FIG. 12 is a side elevation of the anchor bar of FIG. 11.
Figure 11:
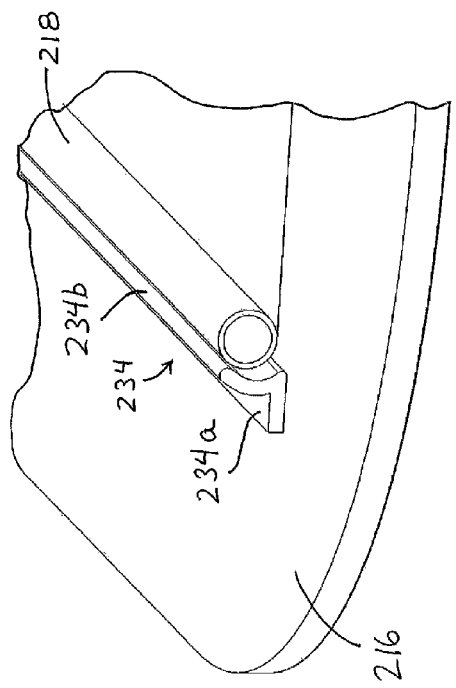
FIG. 11 is an enlarged perspective view of the stop bar of the window panel of FIG. 8.

Similarly, and as best shown in FIGS. 11 and 12, the end stop 234 has a mounting base or base portion 234*a* and an arcuate receiving portion 234*b* that is shaped to receive the substantially uncoiled roller shade 218 at least partially therein (with the uncoiled or extended roller shade having at least one coil of film material even when fully uncoiled). The curved or arcuate shaped receiving portion 234*b* of the end stop 234 allows the uncoiled shade element to seat properly against the end stop when extended, and to provide enhanced or maximum contact between the uncoiled shade and the end stop, and to limit or substantially preclude deformation during cycling of the roller shade.

Thus, the window assembly may provide enhanced seating of the roller shade against the anchor stop when retracted and against the end stop when extended. The radius of curvature of the anchor stop receiving portion may be formed (at least at its lower portion) to substantially match the radius of curvature of the coiled shade element to enhance contact of the roller shade element at the anchor stop when in its fully retracted state, with the cover portion having a slightly greater radius of curvature to provide clearance between the cover portion and the shade element when the shade element is received at the anchor stop, such as shown in FIG. 10. The radius of curvature of the end stop receiving portion may be formed to substantially match the radius of curvature of the uncoiled shade element to enhance contact of the roller shade element at the end stop when in its fully extended state.

Optionally, although described above as an electro-polymeric shade element, it is envisioned that the interpane cavity shading element may comprise any other suitable type of shade element that may be disposed in the cavity or sandwiched between the window panels. For example, the shade element or shading means may include other suitable shading means, such as electro-optic shading means, such as for example, liquid crystal shading devices or electrochromic shading devices and/or suspended particle devices (SPD) or an organic light emitting diode (OLED) element, or the like. In order to facilitate use of such shading means, the window assembly may provide a substantially constant or uniform gap between the inner and outer window panels (while still providing a complex curved outer panel). For example, the outer or upper window panel may be formed or molded with a complex curved outer surface and a non-complex curved inner surface (or an insert may be formed or molded to conform with a complex curved inner surface of the outer panel while providing a non-complex curved inner surface), such that the inner surface of the outer panel (or the inner surface of the insert element) is generally parallel with the inner surface of the inner panel. Optionally, for example, a window assembly may provide an outer window panel with a complex curved outer surface and a non-complex curved inner surface, whereby the inner surface of the outer window panel (which may be generally planar or may be curved in one direction to generally correspond the curvature of the inner surface of the inner window panel) may be generally parallel to the inner surface of the inner window panel, with a laminate or film type of shade sandwiched between the opposing, generally parallel surfaces.

Thus, the present invention provides for a window assembly with an outer window panel having a curved outer surface of one shape or form and an inner window panel having a curved or flat inner surface of a different shape or form. Thus, the window assembly may have upper and lower window panels with different shapes or forms or curvatures, while providing a shade feature at or between the window panels, such that an outer surface of the window assembly may have one curvature or shape and an inner surface of the window assembly may have another curvature or shape. A spacer element may be implemented to provide a desired or appropriate or selected spacing or gap between the window panels. The curvatures or shapes and/or gaps are selected based on the particular application of the window assembly. Although shown and described as having a complex curvature at the outer window panel (such as at the outer surface of the outer or upper window panel) and a non-complex curvature at the inner window panel (such as at the inner surface of the inner or lower window panel), the outer window panel may have a non-complex curvature that is different than the non-complex curvature of the inner window panel and/or the inner window panel may comprise a generally planar or flat window panel, while remaining within the spirit and scope of the present invention.

The glass window panels may be bonded or secured to frame or header portions of the vehicle and the frame and/or header portions may be bonded or secured to the vehicle sheet metal via any suitable bonding material or adhesive, such as a butyl seal and/or a urethane or the like, such as via curing of a bonding or an adhesive material and utilizing bonding processes of the types described in U.S. Pat. Nos. 6,298,606; 6,128,860; 5,966,874; 5,704,173; and/or 5,551,197, which are hereby incorporated herein by reference in their entireties. For example, the window panels may be bonded to a header or the vehicle sheet metal by an adhesive, such as a urethane adhesive, including a one part or two part urethane adhesive, an epoxy adhesive, an acrylic adhesive, a polyvinylbutyral adhesive, a silicone adhesive, or the like. Reference is made to U.S. Pat. Nos. 4,364,214; 4,364,595; 6,299,255; and 6,220,650, which are hereby incorporated herein by reference in their entireties, for examples of suitable adhesives. Optionally, and desirably, the outer glass window panel may include a frit layer at the perimeter regions that is substantially opaque (such as a dark color or black) and, therefore, provides a concealing function and may further facilitate the adhesion or bonding of the panel to the vehicle.

Optionally, the shadable window assembly, such as a sunroof or the like, may be openable and closable via moving the window panel between an opened position and a closed position. In such an application, electrical connection is made to the shading element to selectively power the shading element to shade or tint the window panel as desired. Optionally, the electrical connection may only be made when the window panel is closed, whereby the moving of the window panel to its closed position makes the electrical connection (such as between electrical contacts or terminals at a portion of the window panel and at the frame or supporting structure at the vehicle). Optionally, the electrical connection may be maintained throughout the range of movement of the window panel, so that electrical powering or control of the shading element may be provided irrespective of the position or degree of opening/closing of the window panel. Such continuous electrical connection may be made via any suitable means, such as via a flexible wire or cable or a pigtail wire or cable (such as a coiled wire similar to what is known to be used in telephone cords and the like) or sliding electrical contacts or the like (and such electrical connections may utilize aspects of the window assemblies described in U.S. Pat. No. 8,402,695 and/or International Publication No. WO 2012/037190, which are hereby incorporated herein by reference in their entireties). For example, a flexible or foldable or coiled or spooled wire or cable may have an end attached to electrical terminals at the vehicle (such as to electrically connect to a vehicle wiring harness) and another end attached to electrical terminals at the window panel (such as to electrically connect to the shading element or device). The wire or cable may extend or unfold or uncoil as the window panel is moved towards its opened or closed position and may retract or fold or coil as the window panel is moved towards its closed or opened position.

Optionally, and as discussed above, the window assembly of the present invention may include a breathing or pressure regulating element or device or feature, which allows the interpane cavity pressure to be regulated or controlled. For example, and with reference to FIGS. 13 and 14, the window assembly may include a pressure regulating feature 350, which, in the illustrated embodiment, comprises a bladder element 352 that may allow for air to escape the interpane cavity (via an air hose or tube or line 354 that provides air flow between the interpane cavity and the bladder element) to maintain the pressure generally constant, such as when the temperature of the window assembly increases (and the pressure in the cavity increases). Likewise, the pressure regulating feature 350 may allow for air to enter the interpane cavity when the temperature of the window assembly decreases (resulting in a decrease or partial vacuum in the interpane cavity pressure).

In the illustrated embodiment, the window assembly 310 comprises a dual panel sunroof window assembly having a first or front movable window assembly 311*a* and a second or rear fixed window assembly 311*b*. The front movable window assembly 311*a* is movable along a rail or frame 356, while the rear fixed movable window assembly 311*b* is fixedly or non-movably mounted at the frame 356. In the illustrated embodiment, each of the window assemblies 311*a*, 311*b* comprises an inner glass panel 316 and an outer glass panel 314 spaced apart via a spacing element 326, and with a roller shade element or film disposed therein, such as in a similar manner as described above. A perimeter frame or encapsulation 315 may be disposed or established around the perimeter edge region of the upper or outer panel 314 (and the encapsulation and/or the window assembly may include trim elements and/or reinforcement elements and/or the like, such as at or around or proximate to the upper or outer glass window panel).

Figure 13:
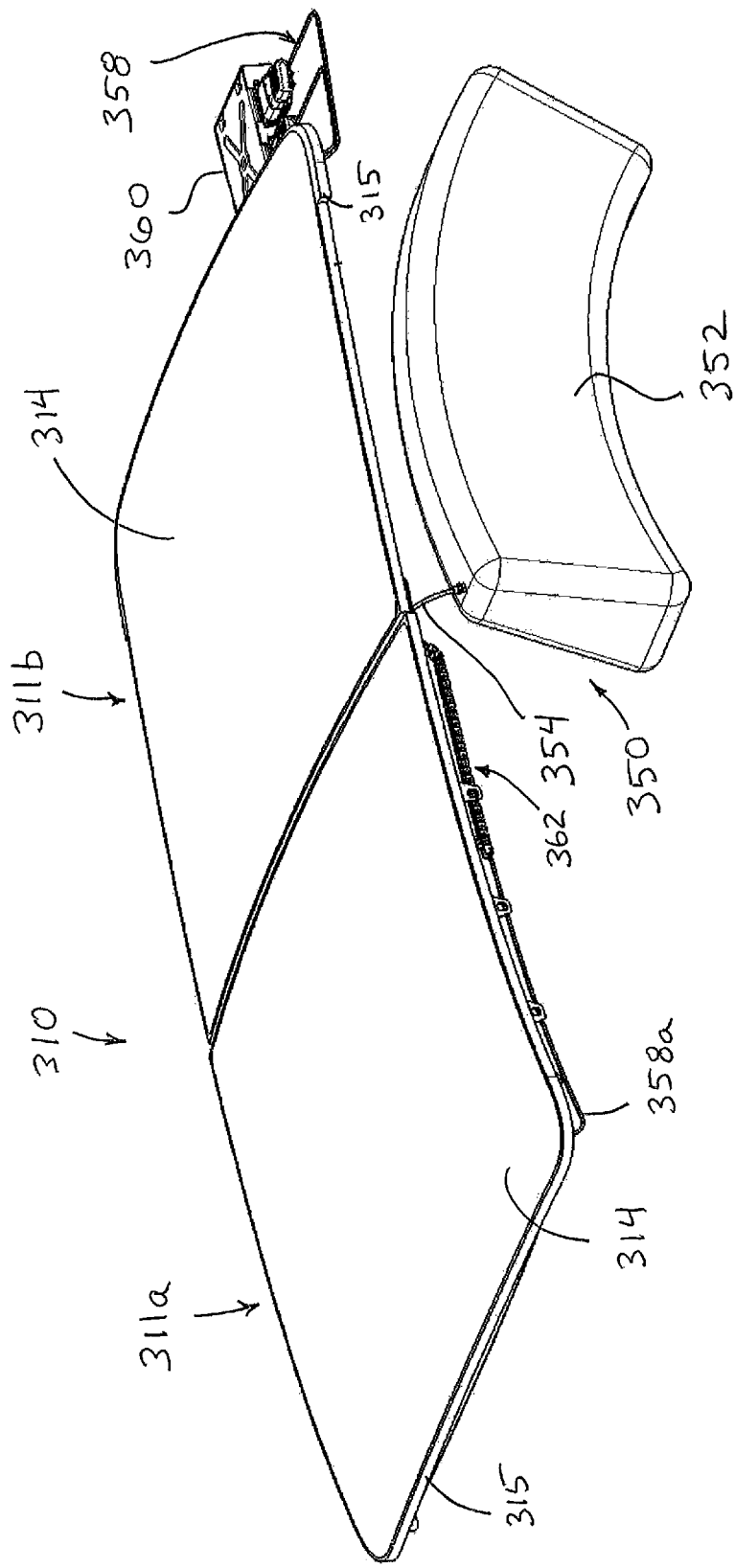
FIGS. 13 and 14 are perspective view of another window assembly of the present invention, shown with a bladder element for controlling pressure in the interpane cavity of the window assembly in accordance with the present invention.
Figure 14:
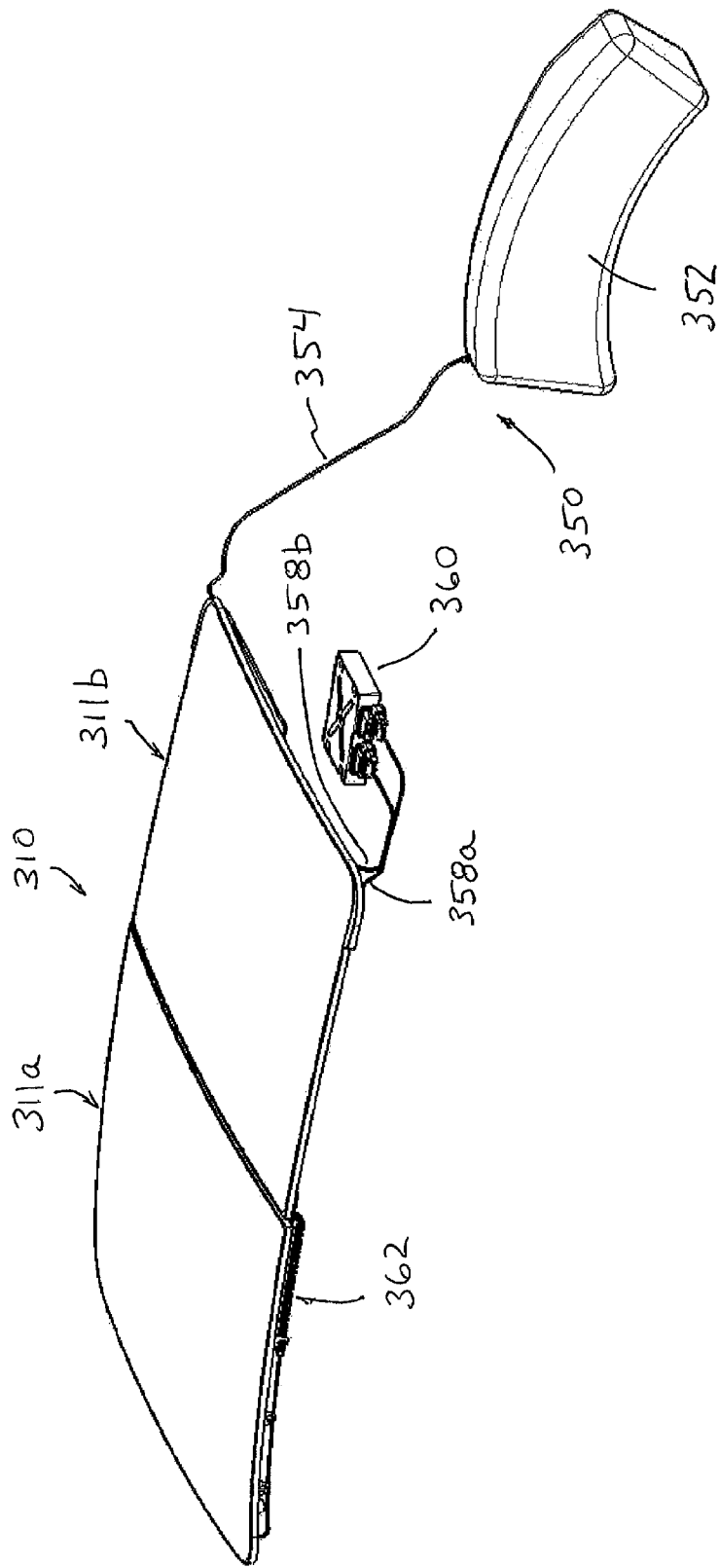

The bladder element 352 controls pressure in between the upper glass panel 314 and the lower glass panel 316. An air hose 354 routes between an aperture or opening or port at the spacing element 326 (see FIGS. 15 and 16) and a port or aperture of the bladder element 352. In the illustrated embodiment, electrical wiring 358 also routes between a terminal established at the glass panel 316 and outboard of the spacing element (or optionally an aperture or opening or port or terminal at the spacing element 326) and an electrical controller 360 or the like. The bladder element may comprise any suitable sized or shaped bladder element or pressure regulating element. For example, and such as shown in FIGS. 13 and 14, the bladder element 352 may comprise a large arcuate-shaped hollow element having an inner air or gas cavity. The bladder element 352 may be sized and shaped such that, when the window assembly 310 is mounted at a vehicle, the bladder element may fit in any suitable location, such as at the vehicle headliner or at a vehicle side wheel well or in the vehicle trunk space and/or the like. The particular size and shape of the bladder element 352 (and of the air hose or line 354) may vary depending on the particular application of the window assembly and the available space in the vehicle at which the window assembly is to be installed.

As shown in FIGS. 13 and 14, each window assembly 311*a*, 311*b* is part of a dual window sunroof 310 or the like, with the first window assembly 311*a* being movable along a track or frame 356 to allow for opening and closing of the window, and a second window assembly 311*b* being fixedly mounted at the frame of the sunroof. In the illustrated embodiment, each of the individual window assemblies 311*a*, 311*b* comprises or includes a roller shade film of the types described herein, and the interpane cavity of both windows may be vented or have the internal cavity pressure regulated via a respective air hose or line that is connected to the common bladder element (or joined with or interconnected with a common air line 354 that is connected to the common bladder element 352), so that the two window cavities are regulated together (or optionally each of the first and second window assemblies may have a separate pressure regulating feature or device or system). The controller 360 may provide individual electrical control of the respective shades via respective wires 358*a*, 358*b* and may be responsive to respective user inputs or the like to control the shade of the first or movable window assembly 311*a* separate from the shade of the second or fixed window assembly 311*b*.

Because the bladder element 352 may be disposed at one end of the overall window assembly 310, such as at the rear or fixed window 311*b* end of the window assembly, the air hose 354*a* and electrical wiring 358*a* for the movable window assembly 311*a* are routed along the side regions of the window assembly 310 and to an opposite or front end region of the movable window assembly 311*a*. Thus, the wiring and hose are routed in a manner that allows for controlled flexing of the wiring and air line or hose during movement of the movable window assembly 311*a* between its opened and closed positions.

In the illustrated embodiment, and as best shown in FIGS. 15-18, the routing of the wire 358*a* and hose 354*a* is designed into or incorporated into a respective track mechanism 362 for the front movable sunroof or window 310. Such a track mechanism allows for flexing of the mechanism (and the hose or wiring routed therealong) in one direction (such as vertical flexing) while substantially not allowing for flexing in other directions (such as lateral flexing or the like). As best shown in FIGS. 15 and 16, the front window air hose 354*a* is attached at a port 355 established through the spacing element 326 of movable window assembly 311*a* and routed along the spacing element 326 to the flexible track mechanism 362 at one side of the window assembly 310 (such as at the passenger side of the window assembly when the window assembly is normally mounted at a vehicle). The electrical wiring 358*a* is attached at a connector 359 that connects to a terminal or terminals established at or proximate a perimeter region of the window panel 316 and outboard of the spacing element 326, and the wiring 358*a* is routed along the spacing element to the flexible track mechanism 362 at the other side of the window assembly 310 (such as at the driver side of the window assembly when the window assembly is normally mounted at a vehicle). Optionally, both the wiring 358*a* and the air hose 354*a* may be routed along the same side of the window assembly via a common flexible track mechanism, while remaining within the spirit and scope of the present invention.

Figure 17:
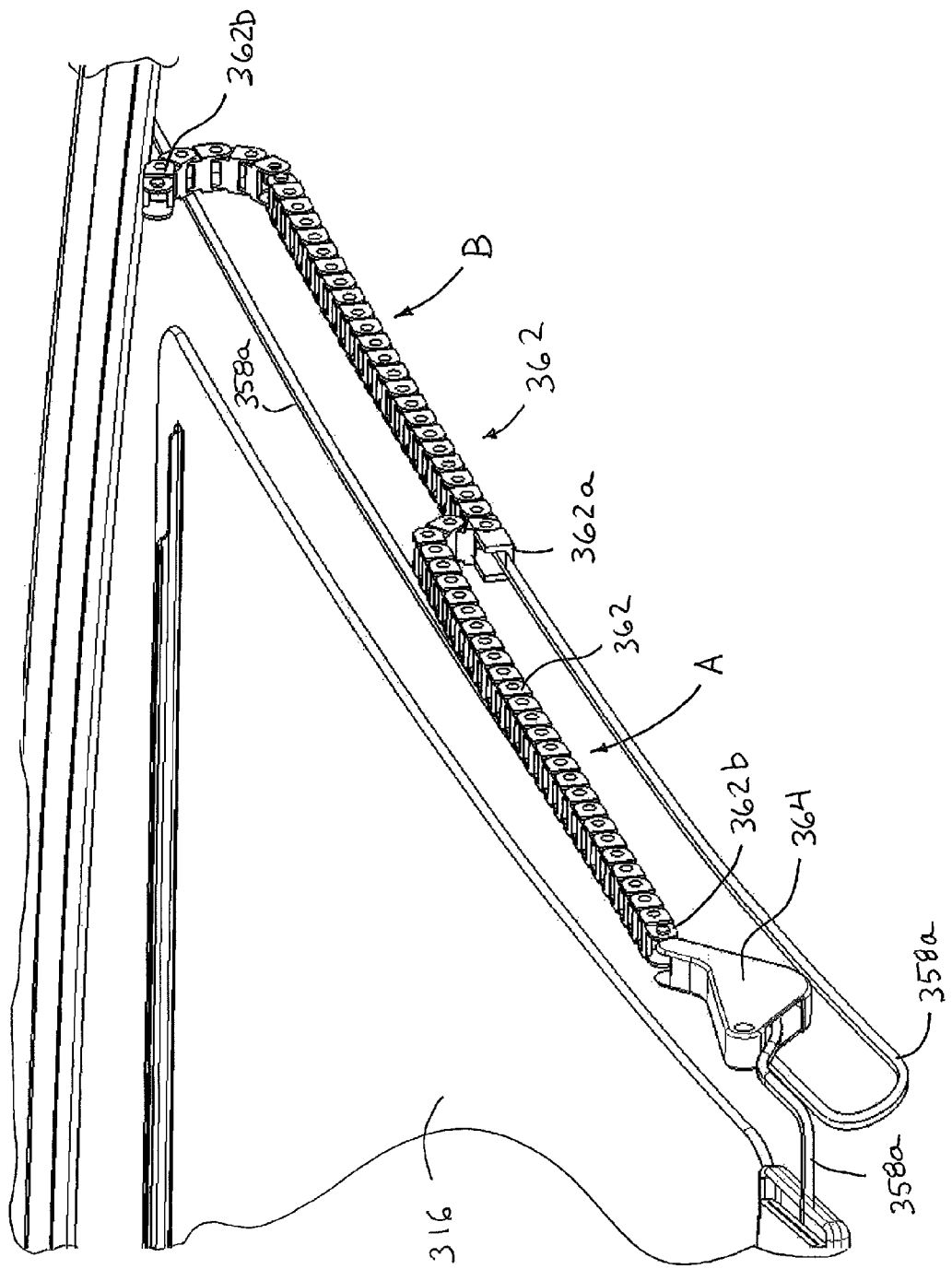
FIGS. 17 and 18 are perspective views of the routing of the air line and electrical wires of the window assembly of FIG. 15, shown with the upper panel and spacing element removed for clarity.
Figure 18:
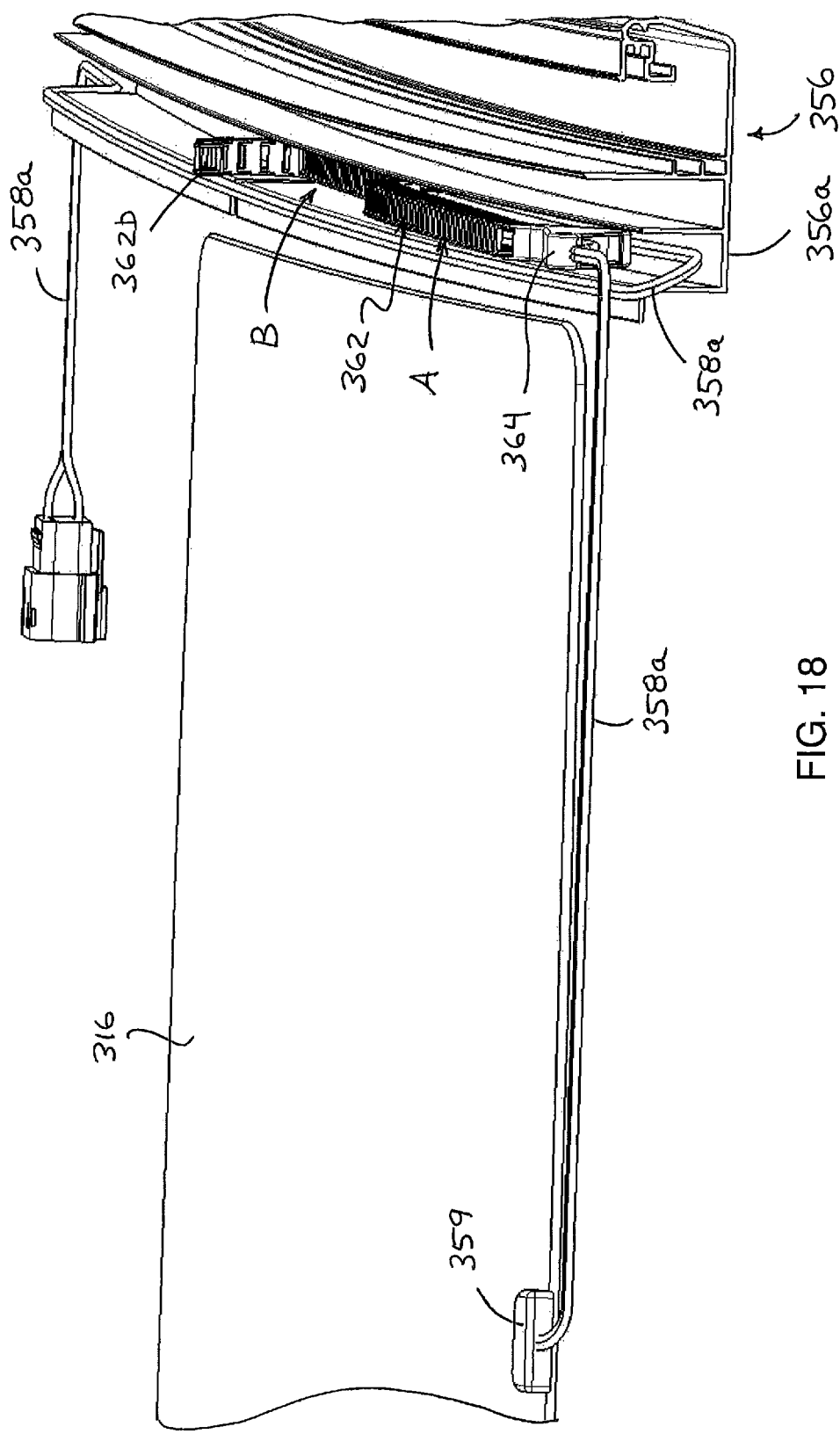
Figure 19A:
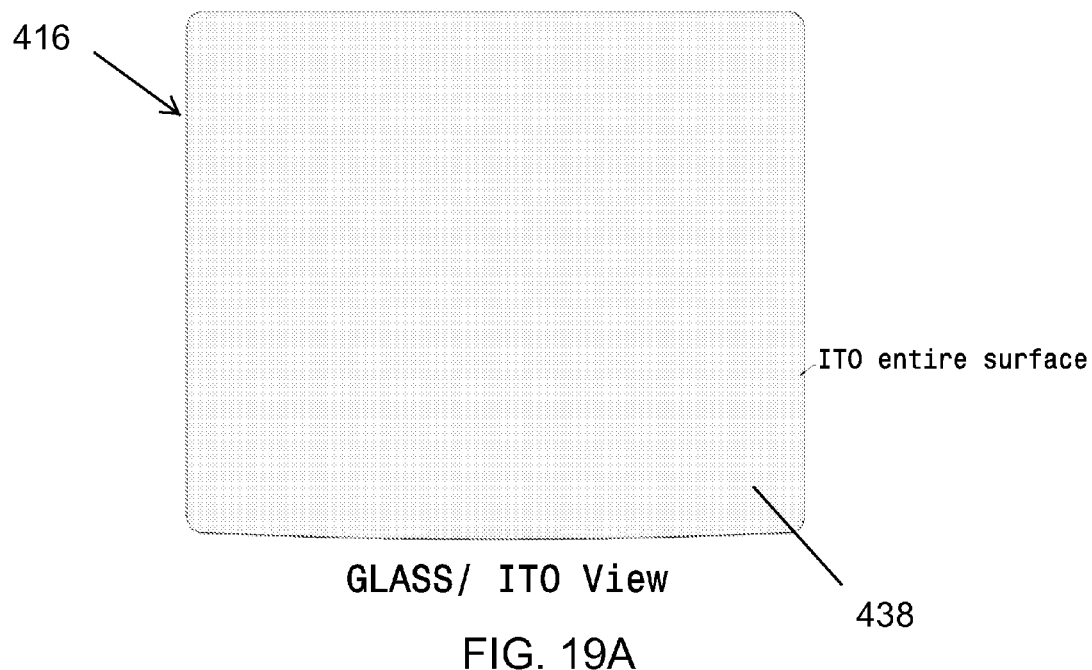
FIGS. 19A and 19B are plan views of a lower or inner window panel for a window and shade assembly of the present invention.
Figure 19B:
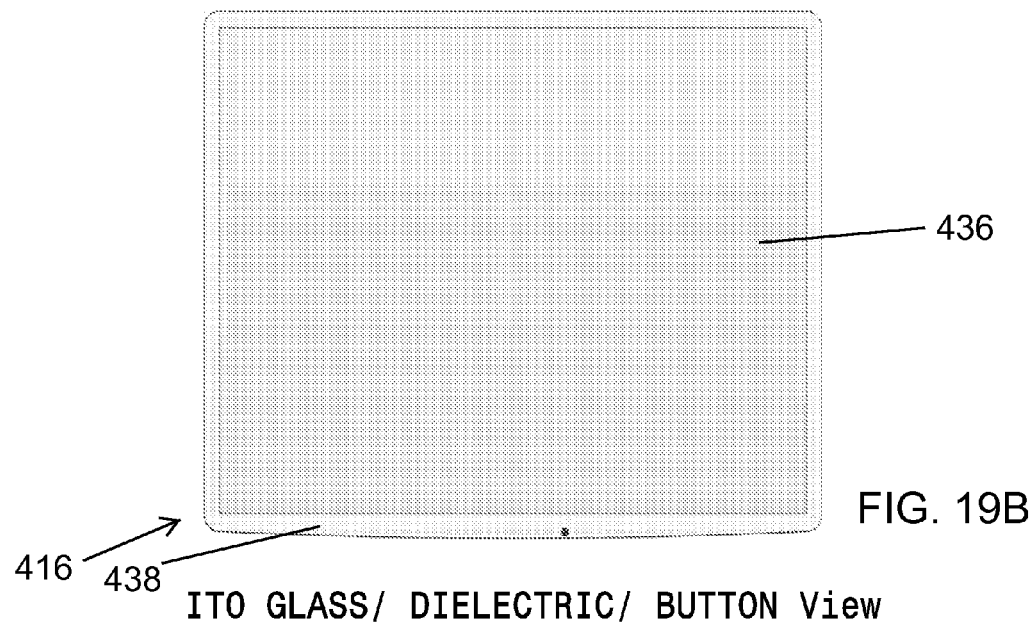
Figure 21A:
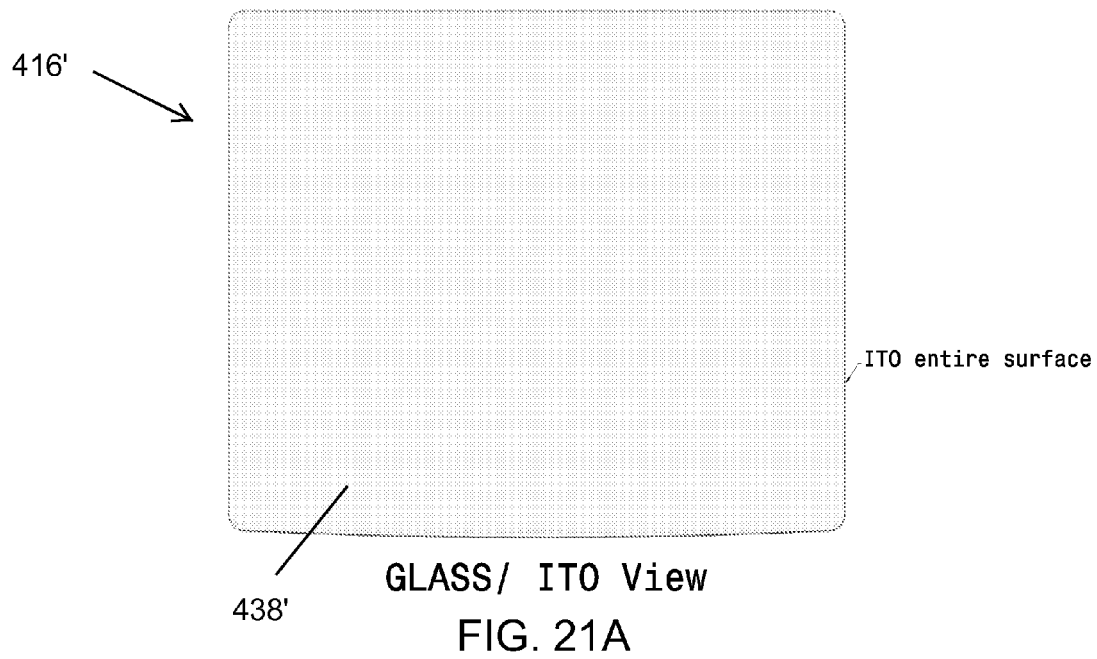
FIGS. 21A and 21B are plan views of another lower or inner window panel for a window and shade assembly of the present invention.
Figure 21B:
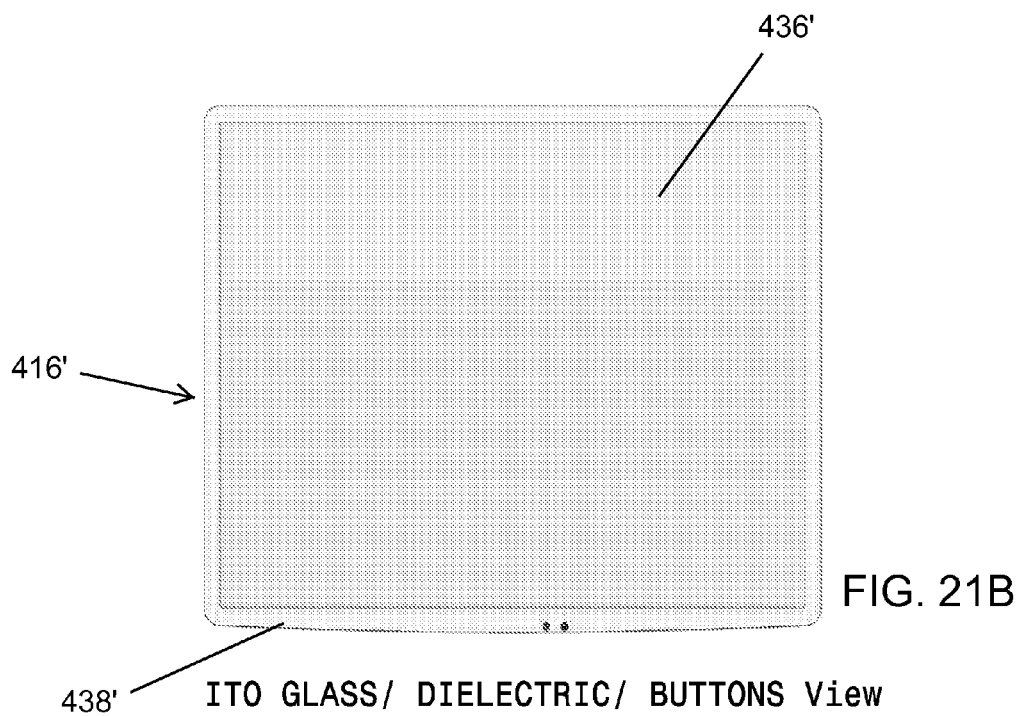
Figure 23A:
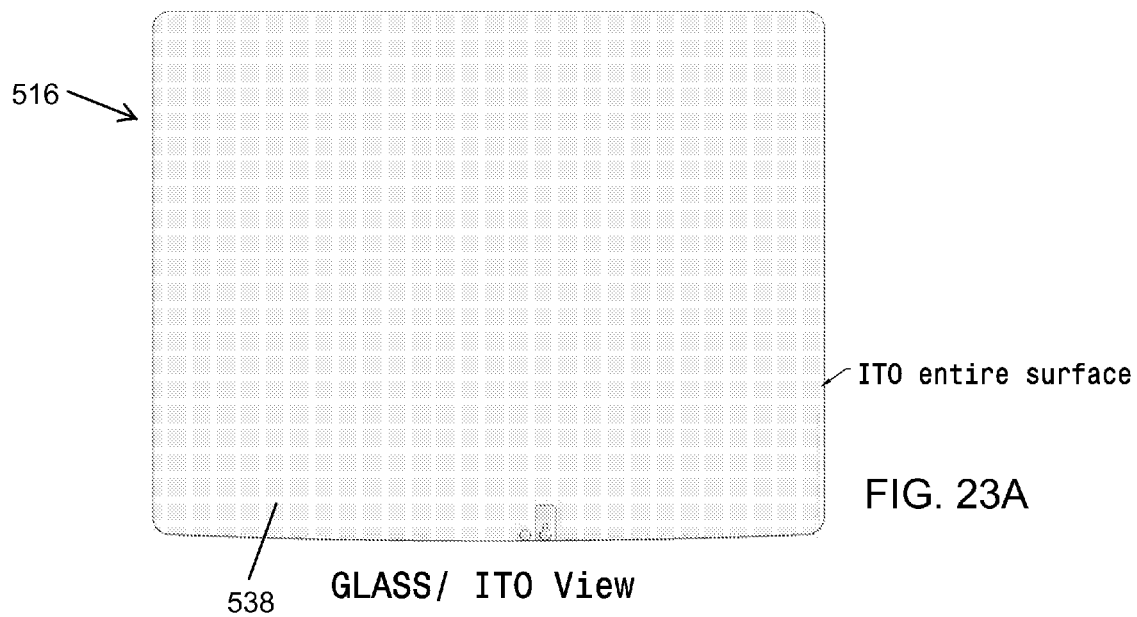
FIGS. 23A and 23B are plan views of another lower or inner window panel for a window and shade assembly of the present invention.
Figure 23B:
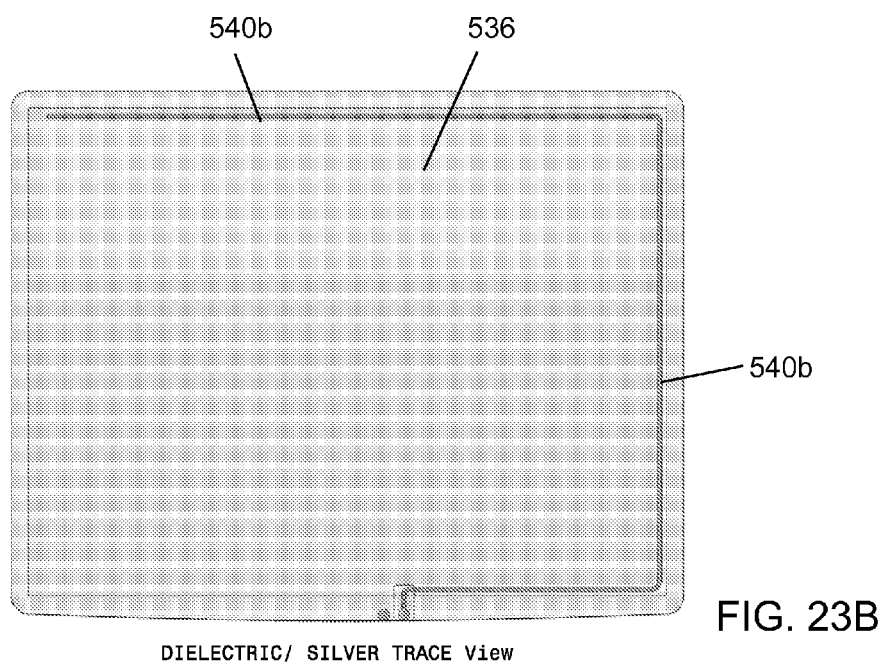
Figure 25A:
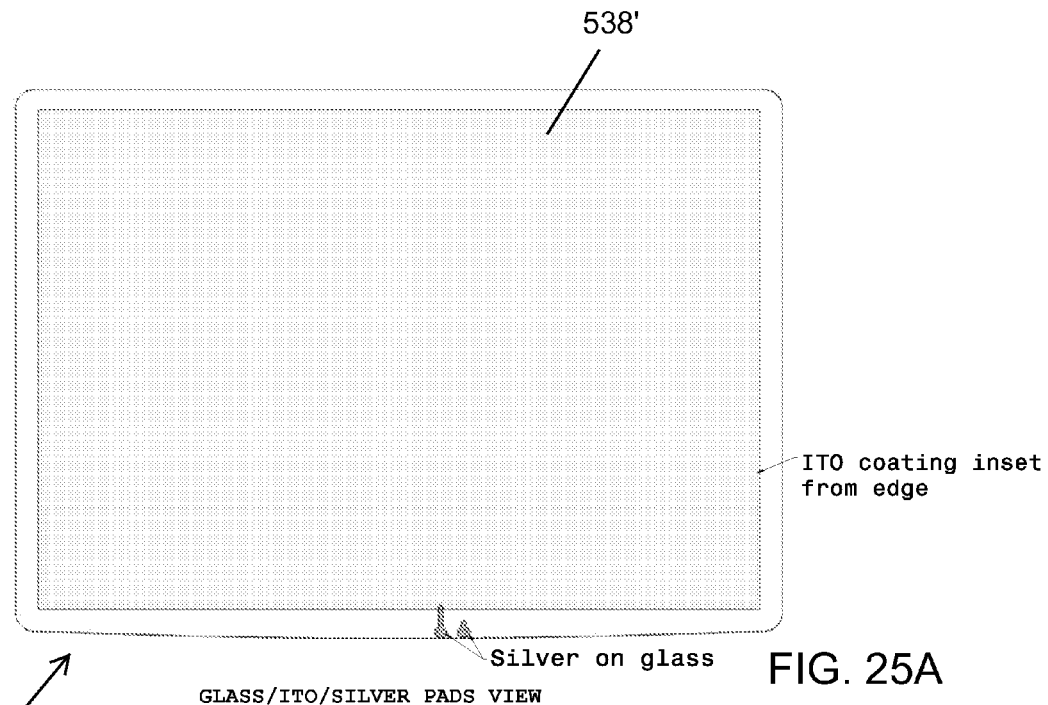
FIGS. 25A and 25B are plan views of another lower or inner window panel for a window and shade assembly of the present invention.
Figure 25B:
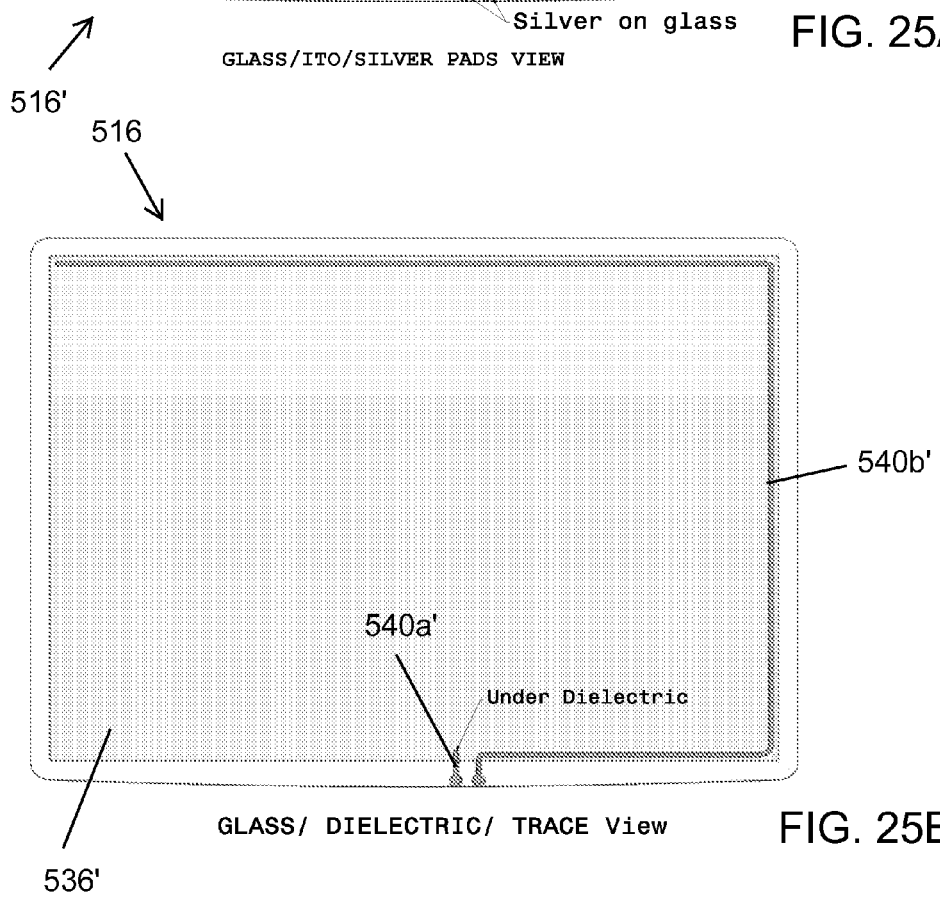
Figure 27A:
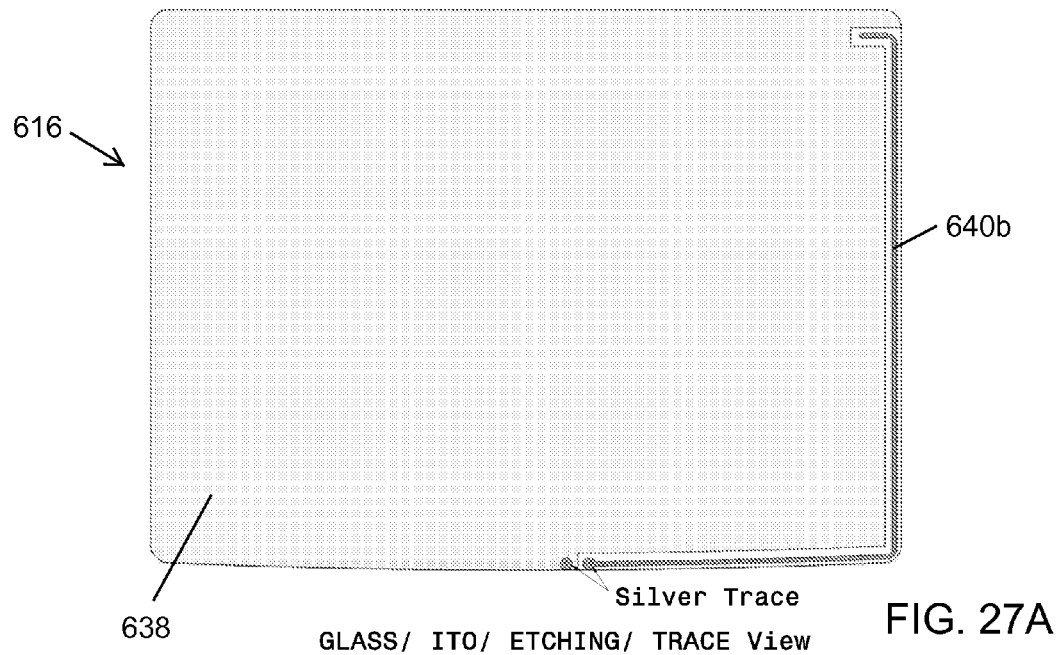
FIGS. 27A and 27B are plan views of another lower or inner window panel for a window and shade assembly of the present invention.
Figure 27B:
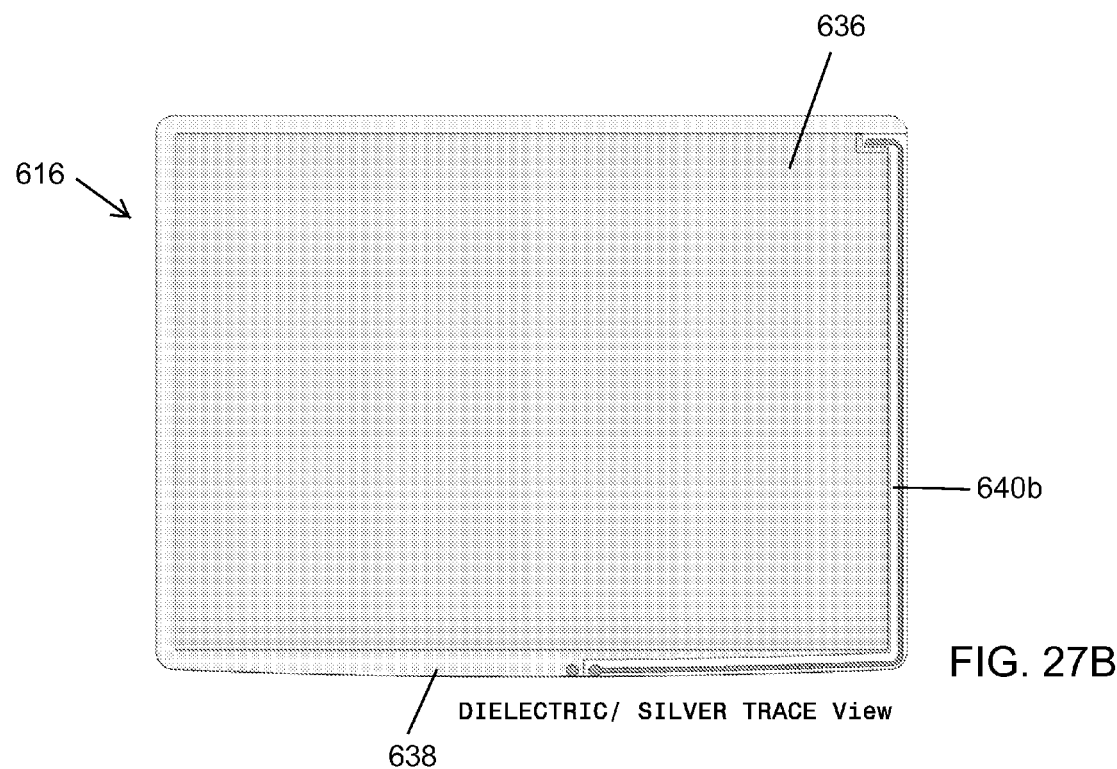
Figure 29A:
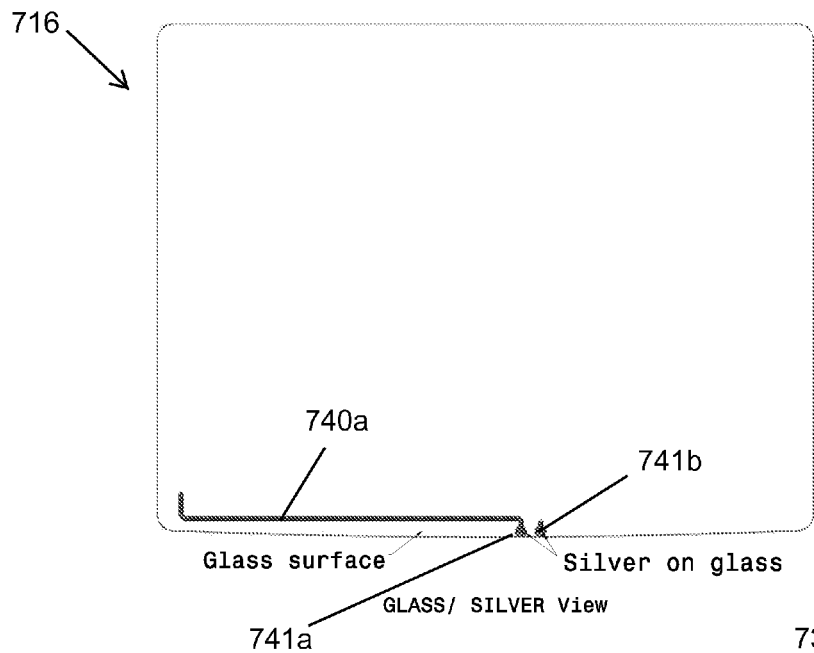
FIGS. 29A and 29B are plan views of another lower or inner window panel for a window and shade assembly of the present invention.
Figure 29B:
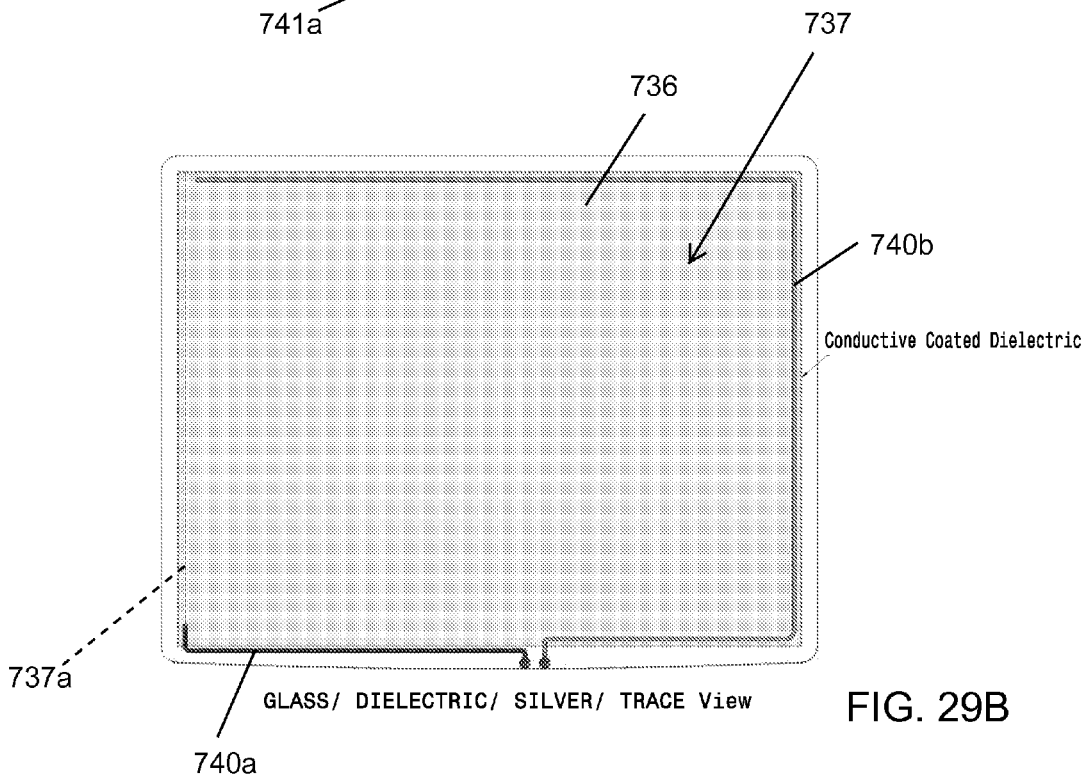
Figure 31A:
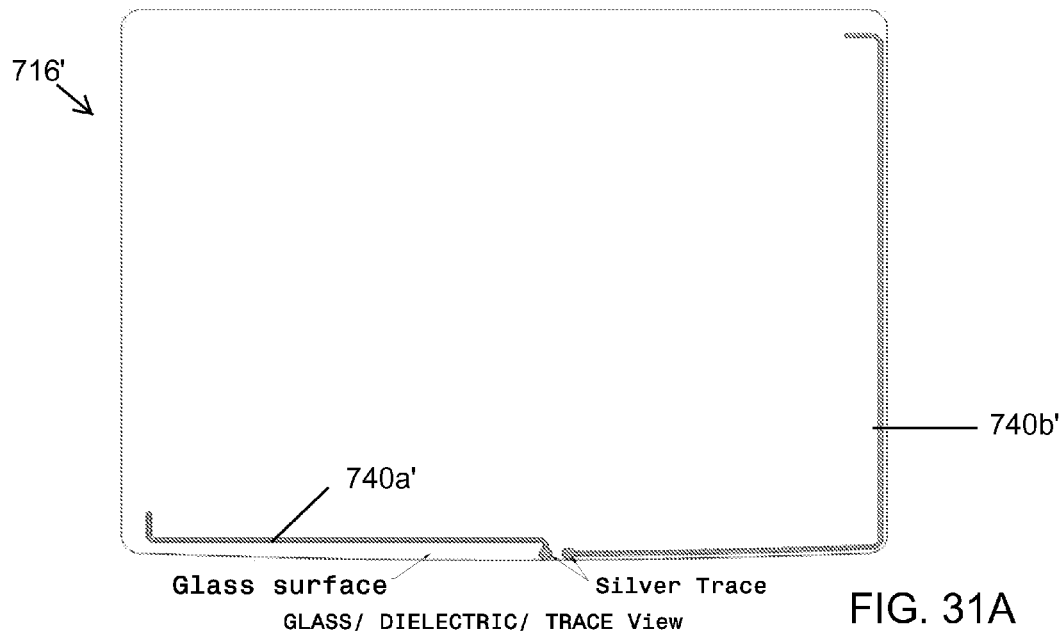
FIGS. 31A and 31B are plan views of another lower or inner window panel for a window and shade assembly of the present invention.
Figure 31B:
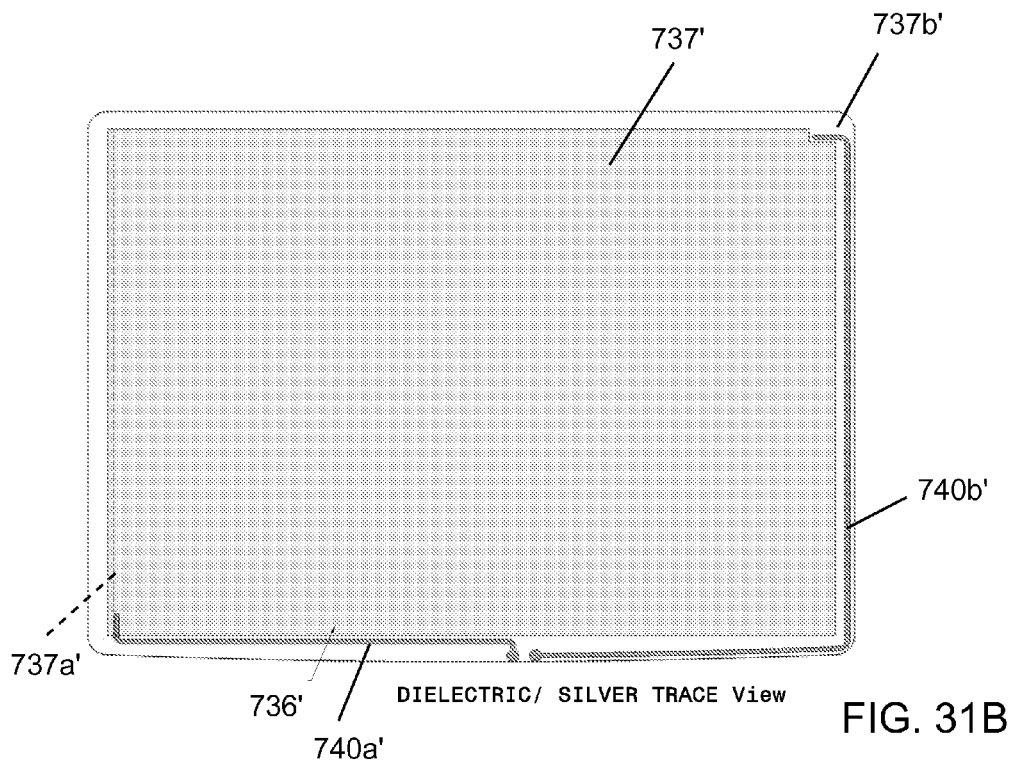
Figure 33A:
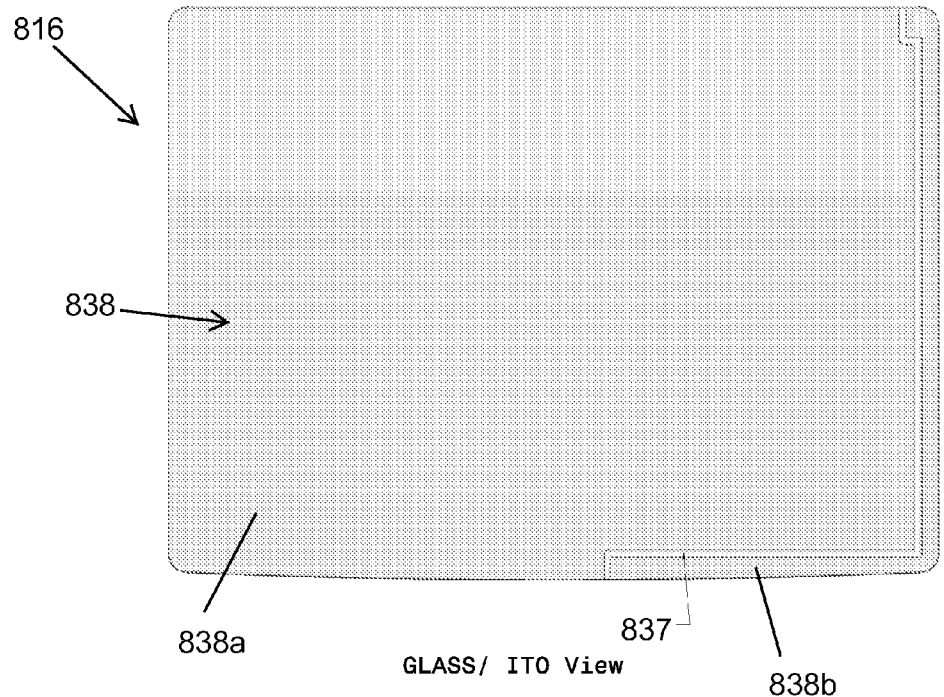
FIGS. 33A and 33B are plan views of another lower or inner window panel for a window and shade assembly of the present invention.
Figure 33B:
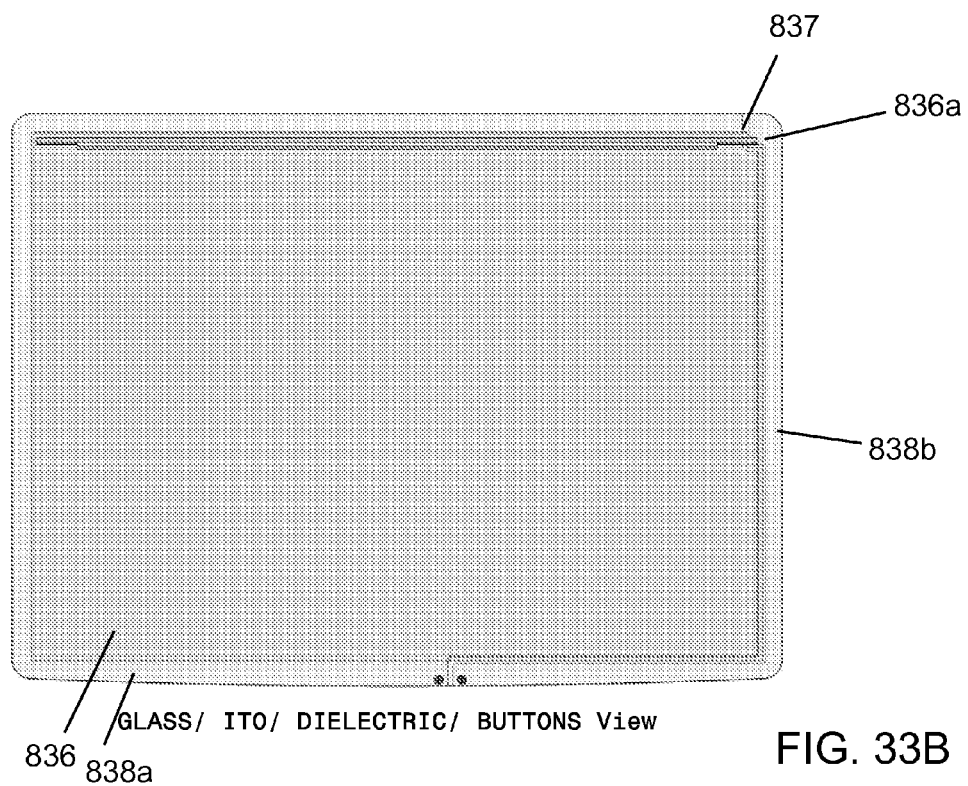

As best seen with reference to FIGS. 17 and 18 (shown with the upper window panel and spacing element removed), the electrical wiring 358*a* for the movable window assembly 311*a* is routed along the track or rail or frame 356 to the front end of the frame and then doubled back or reversed so as to extend back along the frame 356 to the fixed end 362*a* of the flexible mechanism 362. The wiring 358*a* may be retained at or fixedly attached at the frame up to where the wiring enters or joins the flexible mechanism 362 at its fixed end 362*a*. The wiring is routed along the flexible mechanism 362 and through a swivel attachment element 364 that is pivotally attached at the free end 362*b* of the flexible mechanism 362, and that is attached at a movable frame element (not shown) that moves with the movable window assembly 311*a* when it is moved along the frame 356 between its opened and closed positions. The swivel attachment element 364 is disposed generally at the front end region of the movable window assembly 311*a*, such that the wiring 358*a* is routed from the swivel attachment element to the terminal or connector 359 at the front end region of the movable window assembly 311*a*. Although only the wiring routing is shown and described above, the air line or hose 354*a* may be routed in a similar manner and may be routed along an opposite side of the window assembly (such as shown in FIG. 15) or may be routed along the same or common side of the window assembly as the wiring.

As best shown in FIG. 18, the track system or flexible mechanism 362 is disposed in a side channel 356*a* of the frame 356, with the end 362*a* of flexible mechanism 362 attached at the frame 356 generally at a midpoint or middle region of the range of travel of the movable window assembly 311*a* (as can be seen with reference to FIG. 17). Thus, when the window assembly 311*a* is in its forward or closed position, the flexible mechanism 362 flexes at or near its fixed end 362*a* and extends forwardly to be proximate the forward end of the window assembly (shown generally at "A" in FIG. 17). However, when the window assembly 311*a* is moved rearward towards its closed position, the swivel attachment element 364 (and the end 362*b* of the flexible mechanism at which it is attached) moves rearward, causing flexing of the flexible mechanism towards its opened state (shown generally at "B" in FIG. 17). Note that the swivel attachment element is not shown in the opened state B of flexible mechanism 362, but would be attached at the end 362*b* of the flexible mechanism 362. The swivel attachment element 364 and flexible mechanism 362 allow for movement of the window assembly between its opened and closed position and allow for fore/aft translational or sliding movement of the window assembly and raising (or lowering) of the window assembly 311*a* so as to move over (or under) the rear or fixed window assembly 311*b* when the movable window assembly 311*a* is at least partially opened, while routing the wiring 358*a* (and/or hose 354*a*) in a controlled manner.

Although not shown, the rear fixed sunroof or window assembly 311 b has an air and wire feed generally at its rear center region, similar to the front or movable sunroof or window assembly 311*a*. The wiring 358*b* and air hose 354*b* are routed along the frame or the like from the center region of the window assembly 311*b* to the electrical controller 360 and the bladder element 352. Because the fixed window assembly 311*b* does not move relative to the frame 356, there is no need for a flexible tracking mechanism or system for the wiring 358*b* and air hose 354*b*.

As discussed above, the electrical wiring or wire harness or connector of the vehicle may be electrically connected or conductively connected via any suitable means to the conductive layer and to the coiled film and/or anchor stop, in order to provide electrical power and control to the shade film. For example, and with reference to FIGS. 19A-20C, a glass panel 416 has its inner surface coated with a transparent conductive layer 438, and the dielectric layer 436 is disposed at the conductive layer 438. An electrical wire 440 has a wire or lead 440a that is connected to a pad or connector 441 a established at the conductive layer 438 and has a wire or lead 440b that is connected at the anchor bar 444 at which the film 418 is coiled. In the illustrated embodiment, the wire 440a is routed along a perimeter portion of the window panel 416 while the wire 440b is routed along another perimeter portion of the window panel. As shown in FIG. 20, a jumper wire 440c may be provided to electrically conductively connect the anchor bar 444 to the end stop 434. The wires 440a, 440b, 440c may comprise any suitable electrically conductive leads or elements, and optionally may comprise electrically conductive traces established at the conductive layer (for element 440a) and at the dielectric layer (for elements 440b, 440c), with the elements 440b, 440c being electrically isolated from the conductive layer and the element 440a.

Optionally, and as shown in FIGS. 21A-22D, the connector 441a' and another connector 441 b' may be established at the conductive layer 438', whereby the wire 440b' is attached at the window panel 416' (such as over the conductive layer 438' and over the dielectric layer 436') and between connector 441b' and anchor bar 444' (the wire may be attached at the window panel via any suitable attachment means, such as via an adhesive or the like). A wire harness (not shown in FIGS. 21A-22D) may then electrically conductively connect to the connectors or pads 441a', 441b' to electrically power the shade 418' and window assembly. The window panel and shade assembly of FIGS. 21A-22D may otherwise be similar to the window panel and shade assembly of FIGS. 19A-20C, discussed above, such that a detailed discussion of the assemblies need not be repeated herein.

The location of the connectors or pads 441a', 441b' thus may be more centrally located at the window panel, as shown in FIGS. 21A-22D. This location may be preferred because the gap between the upper and lower window panels of the completed window assembly may be greater towards the center of the window assembly, thereby providing additional clearance for connecting a wiring harness or electrical connector (such as shown in FIG. 24D, discussed below) at the connectors or pads. Also, in situations where the perimeter edge of the window panel at the connector region is curved or arcuately formed, there may be additional clearance or space between the perimeter glass edge and the perimeter frame or spacer at or near the central region of the window assembly.

Optionally, and with reference to FIGS. 23A-24D, an electrically conductive trace 540b may be established (such as via screen printing or ink printing or the like) at the window panel 516 and between an electrical connector or pad or button 541b and the anchor bar 544, with another electrical connector or pad or button 541a established at the conductive layer 538. In the illustrated embodiment, the electrical connector 541b is established at a masked area 538a that is devoid of the conductive layer 538 to electrically isolate the connector 541b from the conductive layer 538. After the dielectric layer 536 is disposed at and over the conductive layer 538 (as shown in FIG. 23B), the conductive trace 540b may be disposed at the masked area and over a perimeter portion of the dielectric layer 536 (and not in contact with the conductive layer 538) to electrically conductively connect between the connector 541 b and the anchor bar 544 (or optionally a portion of the conductive trace may be disposed at the dielectric layer so as to directly contact the underside conductive layer of the coiled shade or film 518) and the end stop 534. In the illustrated embodiment, the conductive trace 540b is disposed along a portion of the dielectric layer at which the end stop 534 is disposed, and the conductive trace extends along the panel and along another perimeter portion of the dielectric layer at which the anchor bar 544 is disposed, whereby the conductive trace makes electrical contact with the anchor bar and the end stop at least partially along the anchor bar and end stop. A wire harness or electrical connector 541 (FIG. 24D) may electrically connect at the connectors 541a, 541b to electrically connect to the conductive layer 538 and the anchor bar 544 and end stop 534.

Optionally, and as shown in FIGS. 25A-26D, the glass panel 516' may have its perimeter regions uncoated or devoid of the conductive layer 538' (which may be disposed at the glass panel with the perimeter regions of the glass panel masked or etched after the conductive layer is disposed thereat, so that the conductive layer is disposed only under the dielectric layer 536'). In the illustrated embodiment, the connectors 541a', 541b' are established at the window panel surface and a conductive trace 540a' is established over the perimeter uncoated surface of the window panel 516' and at least partially over or in contact with the conductive layer 538', while a silver trace or conductive trace 540b' is established over the perimeter uncoated surface of the window panel 516' and over the dielectric layer 536' to provide electrical connection to the anchor bar 544' (or optionally a portion of the conductive trace may be disposed at the dielectric layer so as to directly contact the underside conductive layer of the coiled shade or film 518') and the end stop 534', such as in a similar manner as discussed above. A wire harness or electrical connector 541' (FIG. 26D) may electrically connect at the connectors 541a', 541b'.

Optionally, and as shown in FIGS. 27A-28D, the glass panel 616 may have a portion of its perimeter regions uncoated or devoid of the conductive layer 638 (which may be disposed at the glass panel with the portion of the perimeter regions of the glass panel masked or etched after the conductive layer is disposed thereat). In the illustrated embodiment, the connector 641 a is established at the window panel surface where the conductive layer 638 is disposed (so as to provide an electrical connection to the conductive layer), and the connector 641 b is established at the window panel surface at the masked or uncoated perimeter region, whereby a conductive trace 640b is established over the uncoated perimeter region of the window panel 616 and to a location where the trace may electrically connect to the anchor bar 644 (and optionally to the end stop 634) and/or optionally a portion of the conductive trace may be disposed at the uncoated window surface so as to directly contact the underside conductive layer of the coiled shade or film 618. In the illustrated embodiment, the uncoated region of the panel may be formed or established to provide an inward extending portion at the end of the conductive trace so that the conductive trace may be disposed under and in contact with a portion of the anchor bar 644, while the conductive trace 640b is electrically isolated from the conductive layer 638. The dielectric layer 636 may also be notched or formed so as to not overlay the conductive trace 640b at the end where the anchor bar is disposed.

In the illustrated embodiment, the window panel may be first coated with the conductive layer (with the perimeter region masked or later etched or ablated to remove the conductive coating therefrom) and then the conductive trace may be disposed at the uncoated perimeter portion of the window panel, and then the dielectric layer (with the notch formed at a corner region thereof) may be disposed over the conductive layer and adjacent to the uncoated perimeter portion of the window panel. Although not shown in FIGS. 27A-28D, a jumper element or trace may also provide electrical connection between the trace 640b and the end stop 634. An electrical connector 641 (FIG. 28D) may electrically connect at the connectors 641a, 641b to electrically connect to the conductive layer 638 and the anchor bar 644 and end stop 634.

In the examples above, the lower or inner glass window panel may be provided to the manufacturer of the window assembly with its inner or upper glass surface already coated with the transparent conductive layer or coating (and optionally the perimeter region or regions may be etched to remove the conductive layer therefrom or the perimeter region or regions may be masked during the coating process, depending on the particular application of the window panel). Optionally, however, the window panel may be provided as an uncoated glass panel, whereby the manufacturer may coat the surface with a conductive layer or may apply a conductive layer—dielectric layer laminate sheet or construction at the glass surface. For example, a laminate sheet comprising a dielectric layer and an electrically conductive layer may be adhered or laminated to the glass panel, such as after an electrically conductive trace is disposed at the glass surface, whereby the trace may terminate at an appropriate or selected location for electrical connection or contact with the electrically conductive layer of the laminate sheet when the laminate sheet is adhered at the panel.

For example, and with reference to FIGS. 29A-30D, a window panel 716 may be provided with no transparent electrically conductive coating applied thereat. Connectors 741a, 741b may be established at a perimeter region of the panel and a silver or conductive trace 740a may be established along the perimeter region of the panel 716 and may be established partly along a side perimeter region as well. A laminate sheet 737 (comprising a dielectric layer on top of a conductive layer) is then adhered at or laminated at the glass surface, with the sheet partially covering the conductive trace 740a, whereby the conductive trace 740a makes electrical contact with the conductive layer of the laminate sheet 737 (such as at a portion of the laminate sheet where the adhesive may be removed to expose the conductive layer at the underside of the laminate sheet). After the laminate sheet 737 is adhered at the window panel 716, a silver or conductive trace 740b is established from connector 741b and over the dielectric layer 736 of the sheet 737 to a portion of the dielectric layer where the anchor bar 744 is attached (or optionally a portion of the conductive trace may be disposed at the dielectric layer so as to directly contact the underside conductive layer of the coiled shade or film 718) and to a portion of the dielectric layer where the end stop 734 is attached, so as to provide electrical conductivity to the anchor bar and end stop, with the electrical connection being electrically isolated from the conductive layer of the laminate sheet. A wire harness or electrical connector 741 (FIG. 30D) may electrically connect at the connectors 741a, 741b to electrically connect to the conductive layer 738 and the anchor bar 744 and end stop 734.

In the illustrated embodiment, the laminate sheet 737 has a strip 737a established along a side region of the sheet where the adhesive layer (at the bottom of the sheet and at the conductive layer of the sheet) is removed or not present, with the location of the strip 737a corresponding to the portion of the conductive trace that extends under the laminate sheet 737 when the sheet is applied at the panel 716. The strip 737a (where the laminate sheet 737 is devoid of adhesive) of the illustrated embodiment extends along the entire side region of the sheet 737 because the sheet may preferably be provided as a roll of the laminate material that is unrolled and cut to the appropriate length for individual window panels (with the width of the roll being selected for the particular window application so that the roll of laminate sheet may be unrolled along the window panel and cut at the desired or appropriate length for that window panel). Thus, by establishing the conductive trace 740a as shown in FIGS. 29A-30D, with an end portion that extends partially along a side region of the window panel, the laminate sheet 737 (with the strip that is devoid of adhesive so as to provide a strip of exposed conductive material or ITO or the like), when applied at the window panel 716, may be cut from a large coil of sheet material to the desired size and the exposed conductive material will be at and in contact with the portion of the conductive trace 740a to provide electrical contact to the conductive layer 738 of the laminate sheet. Optionally, a conductive epoxy or the like may be disposed at the strip and/or at the conductive trace portion to attach or adhere the laminate sheet at the conductive trace so that conductive continuity is enhanced or ensured between the conductive trace and the conductive layer of the laminate sheet.

Although shown as having the conductive trace 740b established over the dielectric layer 736 of the laminate sheet 737 (after the laminate sheet is disposed at the window panel), it is envisioned that both conductive traces may be disposed at the glass surface of the window panel before the dielectric layer is attached at the window panel. For example, and with reference to FIGS. 31A-32D, the window panel 716' may have electrical connectors 741a', 741b' and conductive trace 740a' similar to window panel 716, discussed above, but the conductive trace 740b' may be established on the glass surface of the window panel 716' and along a perimeter region of the panel, with a portion of the conductive trace 740b' extending inboard to contact or electrically connect to the anchor bar 744' when the anchor bar is established at the laminate sheet 737' (or optionally the portion of the conductive trace may directly contact the conductive layer of the coiled shade or film 718').

In the illustrated embodiment, the laminate sheet 737' (which includes strip 737a' that is devoid of adhesive) includes a cut out region or notch at the inboard portion of the conductive trace 740b' so that, after the laminate sheet 737' is attached at the window panel and when the anchor bar 744' is attached at the laminate sheet, the anchor bar is in electrically conductive contact with the conductive trace 740b'. Optionally, a similar cutout region or notch may be made at the opposite end of the laminate sheet and the conductive trace 740a' may include another inboard extending portion for electrically connecting to the end stop 734' when the laminate sheet 737' is attached at the window panel and when the end stop 734' is attached at the laminate sheet. A wire harness or electrical connector 741' (FIG. 32D) may electrically connect at the connectors 741a', 741b' to electrically connect to the conductive layer 738' and the anchor bar 744' and end stop 734'.

Optionally, instead of conductive traces established at the window panel separate from a transparent electrically conductive layer, the transparent electrically conductive layer may itself be used to provide electrical continuity or connection between the connectors and the anchor bar and end stop. For example, and with reference to FIGS. 33A-34D, a window panel 816 may be provided with a transparent electrically conductive layer or coating 838 disposed substantially over the entire surface of the window panel (in such an application, the window panel may be provided to the window assembly manufacturer already coated with the conductive layer or coating, or the manufacturer may receive an uncoated glass panel and may then coat or apply the conductive coating to the glass panel). An electrically isolating line or isolation line 837 may be established (such as via masking of a portion of the panel during the coating process or such as via etching or ablating a portion of the coated surface) to electrically isolate a first or main or primary portion or zone 838a of the conductive layer 838 from a second or busbar portion or zone 838b of the conductive layer 838. The dielectric layer 836 is disposed at or adhered at the conductive layer 838 and connectors 841a, 841b may be established at the conductive layer portions 838a, 838b, respectively. An electrical connector 841 (FIG. 34D) may electrically connect at the connectors 841a, 841b to electrically connect to the conductive layer primary portion 838a and the anchor bar 844.

In the illustrated embodiment, the dielectric layer 836 has a notch or cutout region 836a at an area where the isolation line extends inboard so that the second or busbar portion 838b of the conductive layer 838 is inboard, so that, when the anchor bar 844 is attached at the dielectric layer, a portion of the anchor bar is in electrical contact with an exposed portion of the conductive layer busbar portion 838b so as to provide electrical connection between the electrical connector 841b and the anchor bar 844 (optionally a similar cutout and busbar configuration may be provided for an end stop of the window assembly, if an end stop is included in the assembly). Optionally, the electrical connection may be made from the second or busbar portion or zone of the conductive layer to the anchor bar when the anchor bar is attached at the dielectric layer, or the electrical connection may be made from the second or busbar portion or zone of the conductive layer directly to the underside of an electrically conductive layer of the coiled film 818 at the corner region or notched region 836a of the dielectric layer 836.

The electrical connection from the second or busbar portion or zone of the conductive layer to the underside conductive layer of the shade or film can be made via any suitable means, and optionally providing a direct contact of the underside conductive layer of the film to the second or busbar portion or zone of the conductive layer allows the window assembly to avoid connection to the anchor bar. Thus, the window assembly of the present invention allows the electrically conductive elements to deliver power to the anchor bar, which then delivers power to the film as the film coils or curls up on the backside of the anchor, or the window assembly of the present invention may allow the electrically conductive element or conductive layer zone or portion to deliver power directly to the electrically conductive underside of the coiled film, thereby avoiding the intermediate connection to the anchor bar.

Thus, the present invention provides a variety of electrical connection options for electrically connecting a wiring harness or wire or lead of the vehicle to the transparent electrically conductive coating or layer at the window panel and the anchor bar and/or end stop and/or coiled film that is/are disposed at the dielectric layer and electrically isolated from the transparent electrically conductive coating or layer. In some applications, the window panel may be provided with a transparent electrically conductive coating over its inner or upper surface (whereby a portion of the coated surface may be etched or masked to provide electrically isolated portions of the coated surface) and the dielectric layer may be adhered to the coated window panel surface. In such applications, a layer of adhesive is disposed between the electrically conductive coating and the dielectric layer. Optionally, the dielectric layer and electrically conductive layer may be provided as a laminate sheet, whereby there is no adhesive layer disposed between the dielectric layer and electrically conductive layer. Such a configuration may require a reduced voltage for operation of the shade film and thus may allow for use of a lower powered and less costly controller, and may reduce static charge concerns.

Figure 35:
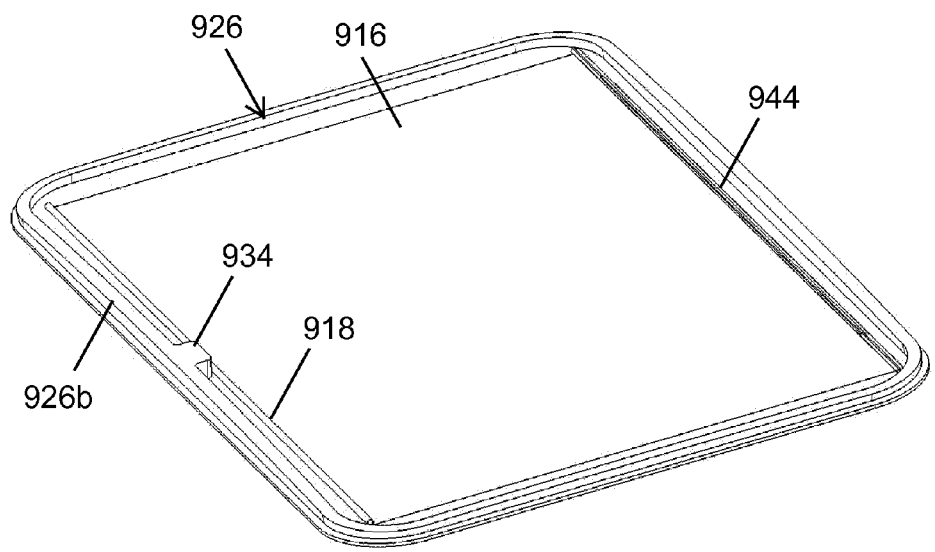
FIG. 35 is a perspective view of another lower or inner window panel and shade assembly, showing a stop element that is integrally formed with the perimeter frame or spacing element.
Figure 36:
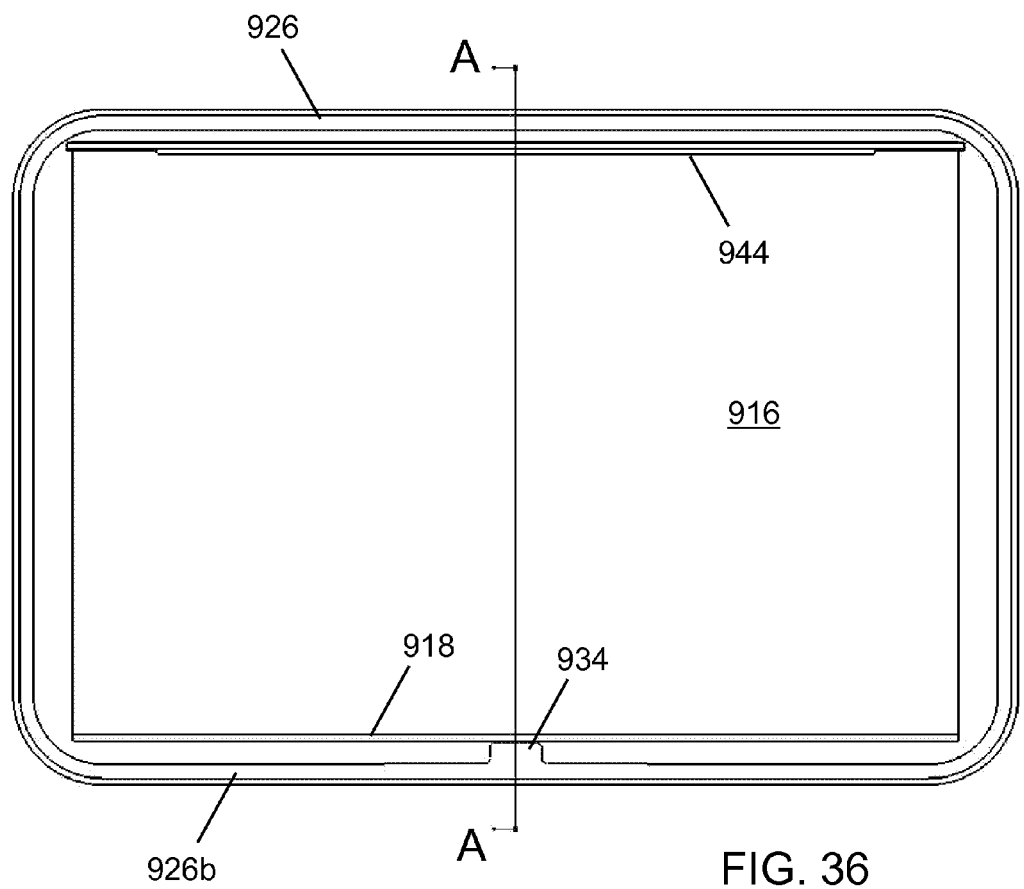
FIG. 36 is a plan view of the lower or inner window panel of FIG. 35.

Although shown and described as having a separate stop element or bar disposed along a portion of the lower or inner window panel opposite the anchor bar, such that uncoiling of the shade film is stopped when the film uncoils or rolls to the stop element, it is envisioned that the stop bar or element may be integrally formed with the spacing element or frame element along that portion of the window panel. For example, and with reference to FIGS. 35-36B, a window assembly or module 910 (such as a sunroof or moonroof or the like or such as a side or rear window or the like) of a vehicle includes an outer window panel 914 and an inner window panel 916 with a coiled shade film or element 918 disposed therebetween, with the roller shade extended or uncoiled between a curved or arcuate shaped anchor stop 944 and an end stop 934, which is integrally formed with a perimeter portion 926b of the perimeter frame or spacing element 926. The end stop 934 is integrally formed with the perimeter frame or frame portion, such as via an injection molding process that forms the frame itself, and provides a non-electrically charged end stop for the shade film 918 to contact when uncoiled to its fully closed or covering state (such as shown in FIGS. 35-36B). The window assembly 910 may otherwise be similar to or may incorporate aspects of any of the shades and/or window assemblies described herein, such that a detailed discussion of the shades and/or window assemblies need not be repeated herein. As shown in FIGS. 36A and 36B, the frame element or spacing element 926 includes a recess or channel 927 for receiving adhesive or tape or the like to adhere or bond the frame element at the surface of the window panel 16.

In the illustrated embodiment, the end stop 934 comprises a centrally located widened or thickened portion of the frame portion 926b. However, other configurations for the integrally formed frame and stop element are contemplated, such as two or more widened or thickened portions of the frame portion spaced along the frame portion, in order to provide two or more stops for the shade film to contact when deployed or extended or uncoiled. Optionally, it is envisioned that the frame portion 926b may comprise a thicker or wider region substantially or entirely therealong to provide a substantially uniform stop element along the shade film width, while remaining within the spirit and scope of the present invention.

Thus, the present invention provides a stop element for contacting and stopping the shade film that is integrally formed with the spacing element or frame portion. The integrally formed stop element provides for enhanced manufacturing of the window, since the integrally formed stop element and frame element obviates the need for a second or separate stop element to be attached or adhered at the window panel. The stop element and frame portion are integrally formed of any suitable material, and provide a non-electrically charged stop at and at least partially along a perimeter region of the window panel that is opposite the perimeter region of the window panel at which the anchor stop is disposed.

During operation of the window shade, electrical power is provided at the transparent conductive layer and at the anchor bar or coiled film, with opposite polarities between the conductive layer and the anchor bar. For example, when the shade is operated, a positive polarity current may be applied to the anchor bar and coiled film while a negative polarity current may be applied to the transparent conductive layer at the window panel. During operation of the window shade, such as when the shade is uncoiled or extended, the controller may be operable to swap or reverse the current polarities to limit or reduce charge build up at the dielectric layer. Optionally, and desirably, the system or controller may be operable to swap or reverse the current polarities right before the film is retracted. Thus, regardless of what the polarities are at the anchor bar and the conductive layer, the polarities are swapped or reversed when the coil is to be retracted. Such retraction is accomplished via a reduction in power at the anchor bar and conductive layer and may be performed in a controlled manner to control the retraction at a desired rate.

The window assembly of the present invention may be manufactured via any suitable manufacturing process. Preferably, the window assembly is assembled in a clean room environment to limit or substantially preclude particles, such as dust or dirt particles, from being drawn to the sheet or film material during the cutting process. For example, the inner and outer window panels may be provided or supplied at a clean room along with the other components (the anchor bar and end stop and the like). The components may be pre-cleaned before being moved into the clean room (such as via a detergent scrub or the like to the glass surfaces of the window panels). When in the clean room, the inner or lower glass panel (which may already be coated on its inner or upper surface with a transparent conductive layer or ITO layer) may be ground cleaned with isopropyl alcohol (with the panel being connected to ground during the cleaning process). For example, a wiping element or sponge or the like may be saturated with isopropyl alcohol and connected to a ground wire and wiped over the inner glass surface of the inner or lower glass panel to clean the inner or lower glass panel and to remove all stored pockets or charge that may be present on the glass surface.

The process of cleaning the lower glass panel with isopropyl alcohol helps to reduce or keep the charge off of the dielectric surface. Preferably, the cleaning process takes place on the glass before the dielectric layer is applied, and then may be repeated on top of the dielectric layer after the components (such as the anchor bar, roll stop bar, and shade coil) are placed, and then may be repeated again on top of the dielectric layer before the cover glass and perimeter frame are placed at the lower glass panel. The cleaning process may use a primer tip made of any suitable material, such as a felt material wrapped with a clean wipe or the like. Fluid may be dispensed through the felt tip, which may control the flow of the isopropyl alcohol. The clean wipe may limit or substantially preclude felt contaminates from getting onto the glass surface during the cleaning process. Optionally, and desirably, the glass panel and components may be robotically cleaned. For example, the felt tip may be disposed at the end of a robot arm or the like. Such robot arms may typically be used to dispense primer, but in this case the robot arm would dispense isopropyl alcohol or MEK, and would be wrapped with a cleanroom wipe to prevent felt particles from getting onto the lower glass and dielectric layer during the cleaning process.

Optionally, it is envisioned that one or more touch sensors (such as capacitive touch sensors) may be established at the glass surface, and one or more icons or indicia may be provided at the glass surface to indicate to a user what function the user input or touch sensor provides. Such touch sensors may comprise any suitable type of touch sensors, such as capacitive touch sensors, and may utilize aspects of the touch sensors (and indicators) described in International Publication Nos. WO 2013/071070 and/or WO 2012/051500 and/or WO 2011/044312 and/or WO 2004/058540, and/or U.S. patent applications, Ser. No. 09/946,228, filed Sep. 5, 2001 and published Mar. 14, 2002 as U.S. Pat. Publication No. US2002/0031622; and/or Ser. No. 10/744,522, filed Dec. 23, 2003 and published Jul. 15, 2004 as U.S. Pat. Publication No. US2004/0137240, and/or U.S. Pat. Nos. 3,798,370; 4,198,539; 4,661,655; 4,731,508; 4,822,957; 5,045,644; 5,594,222; 6,001,486; 6,087,012; 6,310,611; 6,320,282; 6,369,804; 6,437,258; 6,452,479; 6,492,980; 6,501,465; 6,504,531; 6,627,918; 6,787,240; 7,224,324; 7,249,860; 7,253,723; 7,255,541; 7,360,932; 7,446,924; and/or 8,154,418, which are all hereby incorporated herein by reference in their entireties.

Optionally, the window assembly, when configured for a vehicular sunroof or moonroof application, may include one or more electrical accessories disposed thereat or integrated thereat. For example, the window assembly may include a display device (such as a video display screen for displaying movies or DVDs or the like for viewing by a passenger in the rear seat of the vehicle), which may be mounted at a cross member or support bar or divider bar or the like that extends laterally across the window panel between the side frame portions. The display device may flip up so as to be generally along the lower window panel when not in use and may flip down to a generally vertical use position when in use. Optionally, the display device may comprise an OLED display that is operable to display video images when powered but is substantially transparent when unpowered (or other similar or suitable type of display device or display screen that is operable to display video images when powered but is substantially transparent when unpowered). The display device thus may flip down and may be activated to display video images when it is desired to display the video images, and the display device may flip up when not in use, whereby the display device or screen is generally or substantially transparent so that it is rendered at least partially covert when disposed along the lower surface of the lower window panel. Thus, when the display screen is not in use, the display screen does not substantially block the window.

Changes and modifications to the specifically described embodiments may be carried out without departing from the principles of the present invention, which is intended to be limited only by the scope of the appended claims, as interpreted according to the principles of patent law.

The invention claimed is:
1. A window assembly comprising:
an outer window panel;
an inner window panel;
a conductive layer disposed at an inner surface of said inner window panel;
a spacer element disposed between said inner and outer window panels to establish an interpane cavity between said inner and outer window panels;

a roller shade disposed within said interpane cavity, wherein said roller shade has an end fixedly attached at an anchor stop along a perimeter portion of said spacer element;

a dielectric layer disposed between said roller shade and said conductive layer;

wherein said roller shade is electrically deployable to coil and uncoil between a coiled light transmitting condition, where said roller shade is coiled along said perimeter portion of said spacer element and functions to substantially allow light transmission through said window assembly, and an at least partially uncoiled light attenuating condition, where said roller shade is uncoiled to at least partially cover a surface of said inner window panel and functions to at least partially attenuate light transmission through said window assembly;

wherein said roller shade is electrically operable via applying a voltage at said transparent conductive layer and at said anchor stop to uncoil said roller shade from said coiled light transmitting condition to said at least partially uncoiled light attenuating condition, and wherein an electrical connection is made between said roller shade and a power source to provide electrical power to said roller shade;

wherein said roller shade comprises a laminate material comprising a shade dielectric layer, a conductive layer and an opaque layer, and wherein said conductive layer is disposed at a lower portion of said shade dielectric layer and said opaque layer is disposed at a lower surface of said conductive layer; and wherein said anchor stop comprises a curved receiving portion that is curved to generally correspond with the curvature of said roller shade when it is coiled at said curved receiving portion of said anchor stop.

2. The window assembly of claim 1, wherein said shade dielectric layer comprises a layer of Polyethylene Naphthalate.

3. The window assembly of claim 1, wherein said conductive layer comprises a transparent conductive layer.

4. The window assembly of claim 3, wherein said transparent conductive layer comprises a layer of indium tin oxide.

5. The window assembly of claim 1, wherein said opaque layer comprises an opaque ink layer.

6. The window assembly of claim 1, wherein said opaque layer comprises a conductive ink layer.

7. The window assembly of claim 1, wherein said opaque layer comprises a non-conductive ink layer.

8. The window assembly of claim 1, comprising at least one sensor disposed in said interpane cavity and at a surface of one of said inner and outer window panels, wherein said sensor is operable to sense at least one of (i) temperature, (ii) humidity and (iii) glass failure.

9. The window assembly of claim 8, wherein electrically conductive traces are established on said dielectric layer for electrically connecting said at least one sensor to a power source.

10. The window assembly of claim 1, wherein said curved receiving portion is curved so as to at least partially encompass an upper portion of said roller shade when said roller shade is coiled at said curved receiving portion of said anchor stop.

11. The window assembly of claim 1, wherein said anchor stop includes a cover portion that extends from an upper region of said curved receiving portion so as to extend at least partially over said roller shade when said roller shade is coiled at said anchor stop.

12. The window assembly of claim 1, wherein said window assembly comprises a movable window assembly that is movable along a frame between an opened position and a closed position.

13. The window assembly of claim 12, wherein wiring to said window assembly is routed along a flexible track mechanism to control flexing of said wiring when said movable window assembly is moved between its opened and closed positions.

14. The window assembly of claim 1, wherein said spacer element comprises a stop element integrally formed therewith, and wherein said stop element is configured to engage said roller shade when said roller shade is uncoiled.

15. The window assembly of claim 1, wherein electrical connection is made to first and second electrical connectors established at a connecting region of said inner surface of said inner window panel, and wherein said first electrical connector is electrically conductively connected to said transparent conductive layer and said second electrical connector is electrically conductively connected to said anchor stop.

16. The window assembly of claim 15, wherein said connecting region of said inner surface is devoid of said transparent conductive layer.

17. The window assembly of claim 16, wherein said first electrical connector is electrically conductively connected to said transparent conductive layer via a first conductive trace established at said inner surface of said inner window panel between said first electrical connector and said transparent conductive layer.

18. The window assembly of claim 16, wherein said second electrical connector is electrically conductively connected to said anchor stop via a second conductive trace established along said inner surface of said inner window panel between said second electrical connector and said anchor stop.

19. The window assembly of claim 18, wherein said second conductive trace is established at a perimeter portion of said dielectric layer such that said dielectric layer is between said second conductive trace and said transparent conductive layer.

20. The window assembly of claim 18, wherein said second conductive trace is established along a perimeter portion of said inner window panel that spans at least a portion of two sides of the periphery of said inner window panel.

* * * * *